(12) United States Patent
Foley et al.

(10) Patent No.: US 6,471,745 B1
(45) Date of Patent: Oct. 29, 2002

(54) NANOPOROUS CARBON CATALYTIC MEMBRANES AND METHOD FOR MAKING THE SAME

(75) Inventors: Henry C. Foley, Hockessin; Michael Strano, Wilmington; Madhav Acharya, New Castle, all of DE (US); Brenda A. Raich, Houston, TX (US)

(73) Assignee: University of Delaware, Newark, DE (US)

( * ) Notice: Subject to any disclaimer, the term of this patent is extended or adjusted under 35 U.S.C. 154(b) by 0 days.

(21) Appl. No.: 09/428,069

(22) Filed: Oct. 26, 1999

Related U.S. Application Data

(63) Continuation-in-part of application No. 08/671,698, filed on Jun. 28, 1996, now Pat. No. 5,972,079.

(51) Int. Cl.$^7$ .......................... B01D 69/12; B01D 71/02
(52) U.S. Cl. .................. 95/54; 96/11; 55/524; 55/DIG. 5; 502/182; 502/427
(58) Field of Search ............ 95/54; 96/4, 11; 55/524, DIG. 5; 502/182–185, 423, 427

(56) References Cited

U.S. PATENT DOCUMENTS

| | | | | |
|---|---|---|---|---|
| 3,604,246 A | * | 9/1971 | Toren | 96/4 X |
| 4,888,114 A | * | 12/1989 | Gaddis et al. | 55/524 X |
| 4,970,189 A | * | 11/1990 | Tachibana | 502/183 |
| 5,069,794 A | * | 12/1991 | Haag et al. | 95/54 X |
| 5,104,425 A | * | 4/1992 | Rao et al. | 96/11 X |

(List continued on next page.)

FOREIGN PATENT DOCUMENTS

| | | | | |
|---|---|---|---|---|
| EP | 0102902 | * | 3/1984 | 96/4 |
| EP | 0575945 | * | 12/1993 | 96/11 |
| JP | 59-043889 | * | 3/1984 | 96/4 |
| JP | 60-129119 | * | 7/1985 | 96/11 |

OTHER PUBLICATIONS

Foley, H.C., Carbogenic Molecular Sieves: Synthesis, Properties and Applications; Microporous Materials 4; 1995; pp. 407–433.*
Koresh, J.E., et al., Molecular Sieve Carbon Perm–selective Membrane Part 1. Presentation of a New Device for Gas Mixture Separation Science and Technology, 18(8); pp. 723–734; 1983.*
Bird, A.J., et al., Carbon Molecular Sieves Used in Gas Separation Membranes; Carbon; vol. 21; No. 3; pp. 177–180, 1983.*
Rao, M.B. et al., Nanoporous Carbon Membranes for Separation of Gas Mixtures by Selective Surface Flow; Journal of Membrane Science, 85; pp. 253–264 (1993).*
Chen, J.D., et al., Preparation of Carbon Molecular Sieve Membrane and Diffusion of Binary Mixtures in the Membrane; Industrial and Engineering Chemistry Research, 33; pp. 3146–3153 (1994).*
Mariwala, R.K., et al., Evolution of Ultramicroporous Adsorptive Structure in Poly(furfuly alcohol)–Derived Carbogenic Molecular Sieves; Industrial and Engineering Chemistry Research, 33; pp. 607–615 (1994).*
Knudsen, M., The laws of molecular flow and of inner friction flow of gases through tubes; Journal of Membrane Science 100; pp. 23–25 (1995).*
Uhlhorn, R.J.R., et al., New Ceramic Membrane Materials for Use in Gas Separation Applications; Science of Ceramics 14; pp. 551–552 (1987).*

*Primary Examiner*—Robert H. Spitzer
(74) *Attorney, Agent, or Firm*—Connolly Bove Lodge & Hutz LLP

(57) ABSTRACT

Catalytic membranes comprising highly-dispersed, catalytically-active metals in nanoporous carbon membranes and a novel single-phase process to produce the membranes.

17 Claims, 39 Drawing Sheets

U.S. PATENT DOCUMENTS

| | | | | |
|---|---|---|---|---|
| 5,108,465 A | * | 4/1992 | Bauer et al. | 95/54 |
| 5,127,925 A | * | 7/1992 | Kulprathipanja et al. | 95/54 |
| 5,160,713 A | * | 11/1992 | Mazanec et al. | 95/54 X |
| 5,240,480 A | * | 8/1993 | Thorogood et al. | 95/54 X |
| 5,261,948 A | * | 11/1993 | Foley et al. | 95/903 X |
| 5,271,842 A | * | 12/1993 | Degen et al. | 96/4 X |
| 5,342,431 A | * | 8/1994 | Anderson et al. | 96/4 X |
| 5,350,443 A | * | 9/1994 | Von Blucher et al. | 55/524 X |
| 5,429,743 A | * | 7/1995 | Geus et al. | 96/11 X |
| 5,431,864 A | * | 7/1995 | Rao et al. | 96/11 X |
| 5,447,557 A | * | 9/1995 | Golden et al. | 95/903 X |
| 5,536,302 A | * | 7/1996 | Golden et al. | 55/524 X |
| 5,800,796 A | * | 9/1998 | Webb et al. | 96/11 X |
| 5,810,912 A | * | 9/1998 | Akiyama et al. | 96/11 |
| 5,972,079 A | * | 10/1999 | Foley et al. | 96/11 |
| 5,989,319 A | * | 11/1999 | Kawae et al. | 55/524 X |
| 6,066,591 A | * | 5/2000 | Murphy et al. | 55/524 X |
| 6,155,432 A | * | 12/2000 | Wilson et al. | 55/524 X |

* cited by examiner

Gas - SF$_6$
● 293 K
■ 328 K
◆ 353 K

NANOPOROUS CARBON CATALYTIC MEMBRANES AND METHOD FOR MAKING THE SAME

CROSS REFERENCE TO RELATED APPLICATION

This application is a continuation-in-part of prior application Ser. No. 08/671,698 (U.S. Pat. No. 5,972,079) filed Jun. 28, 1996 and incorporates by reference said prior application in its entirety, including all diagrams and figures for all purposes herein. The disclosures of the prior application are hereby incorporated by reference for all purposes.

This invention was made with the financial support of the United States Government under DOE contract or grant no. DE-FG02-97ER14802 managed by the U.S. Department of Energy. The U.S. Government may have certain rights in this invention.

BACKGROUND OF THE INVENTION

The preparation of nanoporous carbon membranes, previously called carbogenic molecular sieves (CMS) by those skilled in the art, which possess high mechanical strength, simple fabrication procedure and are readily assembled into modules is described by Foley et al. in U.S. patent application Ser. No. 08/671,698 (U.S. Pat. No. 5,972,079) which is incorporated in its entirety by reference.

Membranes have gained considerable importance as an inexpensive, low energy alternative to distillation for separation of gases. In particular, sieving of molecules based purely on size differences has emerged as a mechanism for obtaining extremely high selectivities of a particular component.

Currently, inorganic membranes constitute the bulk of separation materials, mostly for their stability at high temperatures. Other potential candidates for use as membrane materials include zeolites, polymers, ceramics and Carbogenic Molecular Sieve materials (hereinafter sometimes referred to as "CMS" or "CMS materials"). CMS materials have the advantage of being relatively inexpensive compared to zeolites, more temperature resistant than polymers and less brittle than ceramics. Numerous studies have shown that a relatively narrow pore size distribution of 4–6 Å can be obtained by controlled pyrolysis of CMS precursor materials. Thus, it would be advantageous to utilize CMS in the form of a membrane to perform molecular sieving.

CMS materials can be derived from natural sources such as wood and coconut shells, as well as synthetic polymer precursors. The basis for their sieving action arises from the complex microstructure, which has been described as consisting of a network of aromatic domains and amorphous carbon. Disclinations between the various domains result in predominantly slit-shaped pores than can exclude certain molecules on the basis of size and shape. However, unlike zeolites, which have a unique pore size, CMS typically has a distribution of pore sizes that can range from 3 to 10 Å. One application of CMS is in the separation of nitrogen and oxygen using the pressure swing adsorption method. The kinetic diameters of the two molecules differ by a mere 0.2 Å—but careful control of the pore size results in very high selectivities for oxygen. This example also demonstrates the difference between a CMS, which performs true molecular sieving, and an activated carbon, whose performance is based on the difference in the adsorption equilibrium of gases. As nitrogen is more strongly adsorbed on activated carbon than oxygen, it would be held back and would have to be desorbed when the separation was complete. In a CMS, however, the equilibrium uptakes of both gases are the same—hence, the time of sieving becomes important to obtain a high selectivity.

CMS materials have been synthesized using a variety of different polymeric precursors. The controlled deposition of pyrolyzed carbon to narrow pores in activated carbons and other supports has also been studied extensively. Established synthesis methods involve pyrolyzing the precursor at a high temperature in an inert gas flow. However, not all polymers can be utilized for CMS production—this depends on whether they undergo cross-linking at high temperatures or not. The thermodynamically preferred structure for carbon at high temperatures is graphite. In the case of "graphitizing" polymers like PVC, graphite-like layers are formed at around 1000° C., which results in a considerable decrease in microporosity of the material. Hence, the resulting carbon is not suitable for gas separations. On the other hand, PAN, PVDC and PFA cross-link at high temperatures to stabilize the structure and prevent the formation of graphite layers. This "non-graphitizing" character of the polymers is due to the presence of heteroatoms such as oxygen and nitrogen, as well as excess hydrogen. The pore sizes obtained are between 4–6 Å, which make them ideal for use as molecular sieves.

CMS materials are globally amorphous and do not exhibit any long range order as evident in zeolites. X-ray diffraction studies, which can resolve features on a length scale of 25 Å, do not reveal a distinct diffraction pattern for the microstructure. HRTEM studies of the structure combined with FFT analysis, can be used to determine the spacing between the graphite layers. The structure of CMS is thought to consist of a tangled network of ribbon-like aromatic regions. The evolution of the microstructure depends on the polymer precursor as well as the pyrolysis parameters of soak time and temperature. Investigations have shown that for most precursors, high temperature sintering leads to shrinkage of pores. There is, however, a collapse of the structure above a certain temperature, leading to a loss in the sieving property. A comprehensive review of CMS materials has been carried out by Foley (see Foley, H. C., *Carbogenic Molecular Sieves: Synthesis, Properties and Applications*; Microporous Materials, 1995;4; pp. 407–433).

Nanoporous membranes—porous membranes generally having a porosity below 1 nm—have attracted the attention of many researchers because of their potential for technological advances in gas separations and shape selective catalysis. (Saracco et al. 1994, infra.). Permeation experiments often constitute a significant contribution to the characterization of these membranes. As the dimensions of a pore approach that of the molecule, transport generally becomes extremely sensitive to the molecular dimensions of the probe gas and very high separation factors have been reported for ceramic, see Vercauteren, S., Keizer, K., Vansant, E. F., Lutyten, J., and R. Leysen, (1998), *Porous Ceramic Membranes: Preparation, Transport Properties and Applications*, J. of Porous Materials 5, 241, and zeolite, see Bai C, Jia M, Falconer J, et al. (1995), *Preparation and Separation Properties Silicalite Composite Membranes*, J. Membrane Science, 105, 79, and nanoporous carbon membranes of this type described herein.

There are two forms of CMS membranes—the unsupported "hollow fiber" form, and the supported form. The hollow fiber membrane was developed by Koresh and Soffer (see Koresh, J. E. and A. Soffer, *Molecular Sieve Carbon Permselective Membrane Part I. Presentation of a New Device for Gas Mixture Separation*; Separation Science and Technology, 1983; 18(8); pp. 723–734) by pyrolysis of polyacrylonitrile (PAN) fibers. Despite their good sieving properties, the membranes lacked the requisite mechanical strength for use in various applications. A hollow fiber also cannot be converted easily into a module form that would be suitable for industry.

Supported CMS membranes can be synthesized using numerous techniques such as dip coating, spin coating, vapor deposition and sputtering. The ideal structure of such a membrane is shown in FIG. 4. It consists of a thin CMS layer 5 on top of a macroporous, non-selective support 7. The support provides mechanical strength to the membrane, which is a considerable improvement over the hollow fiber configuration. It also has the advantage of being available in various geometries such as flat plates, tubes and disks, which can be used depending on the requirements of the particular application. The support should be an inexpensive material and the pores in the support should be much larger than those in the CMS layer. For example, the pores in the support should be at least twice as large as the pores in the CMS material. In a preferred embodiment of the present invention, the pores in the support are from 5–500,000 times as large as the pores in the CMS material. In the most preferred embodiment of the present invention, the pores in the support are from 10 to 2,000 times as large as the pores in the CMS material.

Although the actual size of the pores in the various support materials can be widely varied, the nominal diameter of the pores in the support material should be greater than 100 Å (e.g., typical pore sizes in the support material are from 0.1 to 100 $\mu$m in diameter). The size of the pores in the CMS material can also vary, but over a much narrower range. For example, the nominal diameter of the pores in the CMS material is generally from 3–100 Å. Preferably, the nominal diameter of the pores in the CMS material is from 3–20 Å. In the most preferred embodiment of the present invention, the nominal diameter of the pores in the CMS material is from 3–10 Å.

CMS membranes have been successfully prepared on porous graphite and ceramic supports. These supports overcome the disadvantage of the hollow fiber configuration by providing durability to the membrane. However, neither of these materials is a good choice for process unit construction compared to metals and alloys. Further, the issue of forming a workable module of the composite membrane needs to be addressed. To successfully use the membrane, it must be put into a module that creates two zones for gas flow separated by the membrane. The critical parts of the module are the points of contact between the membrane and the module wall. These contact points are called end fittings or edge fittings in the case of a planar membrane. The fittings (seals) must provide complete isolation of the two sides of the membrane and should be devoid of any leaks that can create transport through a route other than the CMS layer. It is nearly impossible to fabricate leak free end fittings and modules for graphite and ceramic supported membranes. In the event that modules have been constructed, special end fittings were required, which would increase the cost if the process were commercialized. Thus, graphite and ceramic supports, while a definite improvement over hollow fiber membranes, are not able to meet the requirements of an industrial scale separation process.

One of the first attempts at making supported CMS membranes was by Bird and Trimm (see Bird, A. J. and D. L. Trimm, *Carbon Molecular Sieves Used in Gas Separation Membranes*; Carbon, 1983; 21; p.177). They pyrolyzed polyfurfuryl alcohol (PFA) on various support materials including silica frits, sintered bronze and copper and iron gauzes. Experiments were carried out to measure the diffusivities of various gases as a function of temperature. The researchers encountered the problem of being unable to create a uniform, defect free layer on any support surface, with the exception of silica frits. The control of the CMS microstructure was also very poor—membranes synthesized under similar conditions exhibited widely varying behavior in terms of gas diffusivities. However, there was some degree of separation obtained between gases, and this was attributed to flow through cracks as well as surface diffusion on the carbon. There was some evidence of activated diffusion as well, and activation energies were obtained for different gas-support material pairs.

Rao and Sircar (see Rao, M. B. and S. Sircar, *Nanoporous Carbon Membranes for Separation of Gas Mixtures by Surface Selective Flow*; Journal of Membrane Science, 1993; 85; pp. 253–264) developed the "Surface Selective Flow" (SSF™) membrane, in which the primary mechanism for gas separation was the difference in surface flow of various gases on carbon. The membranes were synthesized by coating a layer of poly(vinylidene chloride)-acrylate terpolymer latex on a macroporous graphite disk with a pore size of 0.7 $\mu$m. The samples were pyrolyzed at 1000° C. in a nitrogen stream, and the coating procedure was repeated to increase the carbon layer thickness. SEM analysis revealed a crack-free membrane with a layer thickness of approximately 2.5 $\mu$m. As compared to other separation mechanisms like Knudsen and molecular sieving, surface flow by selective adsorption was found to have several advantages. Components present in low concentrations could be separated, which eliminated the need for a large pressure drop across the membrane. Also, since surface adsorption increased at lower temperatures, ambient operating conditions improved the selectivity. The membrane was used to separate hydrocarbons from hydrogen and hydrocarbon mixtures and provided high selectivities for the former. Graphite supports were also used by Chen and Yang (see Chen, Y. D. and R. T. Yang, *Preparation of Carbon Molecular Sieve Membrane and Diffusion of Binary Mixtures in the Membrane*; Industrial and Engineering Chemistry Research, 1994; 33; pp. 3146–3153) to synthesize membranes from polyfurfuryl alcohol (PFA). Again, the carbon layer was found to be crack free and its thickness was 15 $\mu$m. Diffusivities of gases in the membrane were found to be concentration dependent. The experimental data was explained quite well by the binary diffusivity theory developed by the authors.

Membrane reactors have generated a great deal of interest for use in the selective catalytic reaction of industrial chemicals. There have been several reviews that point to the potential advantages of these novel reactor designs in the form of operational savings that can be realized by increasing conversion efficiencies and product selectivity. Armor, J. N. (1989). *Catalysis With Permselective Inorganic Membranes*. Applied Catalysis 49(1): 1–25; Armor, J. N. (1992). *Challenges in Membrane Catalysis*, Chemtech 22(9): 557–563; Armor, J. N. (1998). *Applications of catalytic inorganic membrane reactors to refinery products*, Journal of Membrane Science 147(2): 217–233; Saracco, G., H. Neomagus, et al. (1999). *High-temperature membrane reactors: potential and problems*, Chemical Engineering Science 54(13–14): 1997–2017; Saracco, G. and V. Specchia (1994). *Catalytic Inorganic-Membrane Reactors—Present Experience and Future Opportunities*, Catalysis Reviews-Science and Engineering 36(2): 305–384; Saracco, G., G. F. Versteeg, et al. (1994) *Current Hurdles to the Success of High-Temperature Membrane Reactors*, Journal of Membrane Science 95(2): 105–123. Among other advantages, membrane reactors have the potential to exceed equilibrium conversions by selectively removing species from the reaction zone, see Raich, B. A. and H. C. Foley (1995), *Supra-Equilibrium Conversion in Palladium Membrane Reactors—Kinetic Sensitivity and Time-Dependence*, Applied Catalysis a-General 129(2): 167–188, or by eliminating undesired reaction pathways in certain reaction networks, see Harold, M. P., V. T. Zaspalis, et al. (1993) *Intermediate Product Yield Enhancement With a Catalytic Inorganic Membrane .1. Analytical Model For the Case of Isothermal and Differential Operation*, Chemical Engineering Science 48(15): 2705–2725.

Armor points towards the development of highly selective nanoporous membranes for use as membrane reactors observing that membranes with larger pores and lower selectivities require additional downstream separation to recover the product of value. To this end, there have been a number of recent studies exploiting the molecular sieving properties of nanoporous membranes for use in catalytic reactors. See Lafyatis et al. Alfonso and co-workers studied the effects of various feed configurations for propane oxidative dehydrogenation over a V/Al$_2$O$_3$ catalytic membrane/zeolite film composite among other types of hybrid membranes. See Alfonso, M. J., A. Julbe, et al. (1999), *Oxidative dehydrogenation of propane on V/Al$_2$O$_3$ catalytic membranes. Effect of the type of membrane and reactant feed configuration*, Chemical Engineering Science 54: 1265–272. However, in this case, the intrinsic activity of the zeolite membrane itself suppressed the catalytic selectivity by increasing the overall conversion. Using a supported, silicite-1 membrane, van de Graaf and co-workers were able to demonstrate supra-equilibrium conversion in the metathesis of propene. See van de Graaf, J. M., M. Zwiep, et al. (1999), *Application of a silicalite-1 membrane reactor in metathesis reactions*, Applied Catalysis a-General 178(2): 225–241; and van de Graaf, J. M., M. Zwiep, et al. (1999), *Application of a zeolite membrane reactor in the metathesis of propene*, Chemical Engineering Science 54(10): 1441–1445. The membrane selectively transported trans-2-butene over the other species in the reaction zone thereby augmenting the thermodynamic conversion of the reaction from 34% to 38.4%.

Nanoporous carbon (NPC) is a promising material for use as a catalytic membrane in that it is chemically inert under most reaction conditions and thermally stable at temperatures well above 200° C. where most industrially relevant reactions occur. See e.g., Foley, H. C. (1995) *Carbogenic Molecular-Sieves—Synthesis, Properties and Applications*, Microporous Materials 4(6): 407–433; and Kane, M. S., J. F. Goellner, et al. (1996). *Symmetry breaking in nanostructure development of carbogenic molecular sieves: Effects of morphological pattern formation on oxygen and nitrogen transport*, Chemistry of Materials 8(8): 2159–2171. Formed from the pyrolysis of non-carbonizing natural synthetic polymeric precursors, NPC is a disordered material having a porosity approaching molecular dimensions and has been shown to posses highly shape selective transport properties. Poly-furfuryl (PFA) derived nanoporous carbons have a mode in the pore size distribution of about 0.5 nm as measured from N$_2$ and methyl chloride adsorption isotherms. See Mariwala, R. K. and H. C. Foley (1994), *Calculation of Micropore Sizes in Carbogenic Materials From the Methyl-Chloride Adsorption-Itsotherm*, Industrial & Engineering Chemistry Research 33(10): 2314–2321. Attempts to use this material in the synthesis of defect free, micron scale film on a structurally stable macroporous support have been highly successful. Membranes have been fabricated using NPC which are selective for the separation of small molecular species. See Acharya, M. and H. C. Foley (1999), *Spray-coating of nanoporous carbon membranes for air separation*, Journal of Membrane Science 161: 1–5; and Acharya, M., B. A. Raich, et al. (1997), *Metal-supported carbogenic molecular sieve membranes: Synthesis and applications*, Industrial & Engineering Chemistry Research 36(8): 2924–2930. To the inventor's knowledge, there have not been any studies appearing in the literature using nanoporous carbon in a catalytic membrane reactor to date.

The selective hydrogenation of olefins has been used by several researchers to characterize the shape selective behavior of metal on nanoporous carbon catalysts. Trimm and Cooper polymerized furfuryl alcohol in the presence of H$_2$PtCl$_6$ and subsequently pyrolyzed the resulting mixture creating a Pt/NPC catalyst. See Trimm, D. L. and B. J. Cooper (1973), *Propylene Hydrogenation over Platinum/Carbon Molecular Sieve Catalysts*, Journal of Catalysis 31: 287–292; and Trimm, D. L. and C. B. J. (1970), *Preparation of Selective Carbon Molecular Sieve Catalysts*, Chemical Communications: 477–478. The nanoporosity of the catalyst support was shown to contribute to the selective hydrogenation of propene and 1-butene over isobutene, 3-methylbutene and 3,3-dimethylbutene. Schmitt and Walker fabricated a similar catalyst and demonstrated shape selectivity between 1-butene and isobutane. See Schmitt, J. L. and P. L. Walker (1971), *Carbon Molecular Sieve Supports for Metal Catalysts—I. Preparation of the System—Platinum Supported on Polyfurfuryl Alcohol Carbon*, Carbon 9: 791–796; and Schmitt, J. L. and P. L. Walker (1971), *Carbon Molecular Sieve Supports for Metal Catalysts—II. Selective Hydrogenation of Hydrocarbons Over Platinum Supported on Polyfurfuryl Alcohol Carbon*, Carbon 10: 87–92. Lafyatis used the conversion ratio of propylene to isobutylene over various NPC derived metal supported catalysts to characterize the reactant shape selectivity. See Lafyatis, D. S. (1992), *The Design and Synthesis of Carbon Molecular Sieve Catalysts for Shape Selective Catalysis*, Ph.D. Thesis, Department of Chemical Engineering, University of Delaware: 113–141. These ratios were reported to exceed 14 (propylene/isobutylene) at about 30% conversion of propylene. Miura and co-workers have argued for transition state selectivity using a 0.4 nm pore size Ni on NPC catalyst in the decomposition of methanol by producing only CO and H$_2$. See Miura, K., J. Hayashi, et al. (1993), *A shape-selective catalyst utilizing a molecular sieving carbon with sharp pore distribution*, Carbon 31(5): 667–674. This result was attributed to a shape selectivity of the carbon/metal interface that hindered the formation of a transition state yielding methane in the product distribution.

The incorporation or dispersion of catalytic materials at a molecular level in nanoporous carbon (NPC) has proven to be especially difficult. Previous researchers have traditionally only investigated aqueous-based sources of inorganic metal salts. Several researchers have created platinum (Pt) on NPC catalysts using chloroplatinic acid (H$_2$CL$_6$Pt•H$_2$O) by pyrolyzing a suspension containing the acid and hydrophobic polymer. See Trimm, D. L., Cooper, B. J., *The Preparation of Carbon Molecular Sieve Catalysts*, Chem. Commun. pp. 477–478 (1970); Trimm, D. L., Cooper, B. J., *Propylene Hydrogenation over Platinum/Carbon Molecular Sieve Catalysts*, J. Catal., V31, pp. 287–292 (1973); Schmitt, J. L., Jr., Walker, P. L., Jr., *Carbon Molecular Sieve Supports for Metal Catalysts—I. Preparation of the System— Platinum Supported on Polyfurfuryl Alcohol Carbon*, Carbon, V9, pp. 791–796 (1971); Schmitt, J. L., Jr., Walker, P. L., Jr., *Carbon Molecular Sieve Supports for Metal*

Catalysts—II. Selective Hydrogenation over Platinum Supported on Polyfurfuryl Alcohol Carbon, Carbon, V10, pp. 87–92 (1972); and Lafyatis, D. S., Mariwala, R. K., Lowenthal, E. E., and Foley, H. C., *Design and Synthesis of Carbon Molecular Sieves for Separation and Catalysis. Synthesis of Microporous Materials: Expanded Clays and Other Microporous Solids*, M. L. Occelli and H. Robinson, eds., Van Nostrand Rienhold, New York, pp. 318–332 (1992). Aqueous acid-based catalytic precursors inhibit thin film formulation because the polymerization of furfuryl alcohol is known to be acid catalyzed. Hence, the viscosity and other properties of the membrane precursor are unstable. Furthermore, the prior art aqueous-based multiphase system tends to lead to low dispersions of the metal in the catalyst.

To circumvent the disadvantages of the prior art, the present invention embodies a new approach to creating NPC catalytic membranes by using a non-polar organometallic catalytic precursor. The precursor is soluble in both PFA and acetone. This allows for efficient introduction into the spray coating methodology that is known in the art and is described by Acharya, M., Foley, H. C, *Spray Coating of Nanoporous Carbon Membranes for Air Separations*, J. Membrane Science, V161 pp. 1–5 (1999). The application of the single-phase nanoporous carbon polymer precursor creates a catalytically active NPC membrane with the catalyst being dispersed in the membrane close to the molecular level. This degree of dispersion is a dramatic improvement over the prior art, such as that disclosed by Lafyatis et al. The invention allows for the creation of a metal-on-carbon catalyst that has significantly higher intrinsic activity over prior catalytic membranes due to an increase in the available surface area of the catalyst.

SUMMARY OF THE INVENTION

The present invention provides for a synthesis method to disperse catalytic materials in nanoporous carbon membranes and the unique catalytically-active membranes so produced. Nanoporous carbon membranes on metal supports, previously referred to by those skilled in the art as carbogenic molecular sieves (CMS), are disclosed in prior U.S. patent application Ser. No. 08/671,698, (now U.S. Pat. No. 5,972,079) which is incorporated herein by reference. The invention presented uses a non-polar organometallic precursor of a catalyst in solution with a non-polar solvent. A nanoporous carbon polymeric precursor, such as polyfurfuryl alcohol, is added to the solution forming a viscous but single-phase nanoporous carbon (NPC) precursor. The non-polar solvent is flashed off slowly at a heating rate no greater than 5° C./min and held at 70° C. until the original viscosity of the carbon polymeric precursor is restored. Subsequent pyrolysis of the nanoporous carbon precursor at elevated temperatures produces the catalytic material with excellent (i.e., highly dispersed) distribution of the metal catalyst in the nanoporous carbon membrane.

In addition to the inherent properties of NPC membranes, the catalytically-active NPC membranes described herein have a very high degree of catalytic metal dispersion. Additionally, the membranes have excellent shape-selectivity properties and can be tailored to suit different applications by varying pore sizes.

The present invention is a new application of carbogenic molecular sieve (CMS) membranes which possess catalytic properties, high mechanical strength, simple fabrication procedure and are readily assembled into modules. These composite membranes, which comprise CMS on a porous support material, can be used for small molecule separations or for combined separation and chemical reaction, especially catalytic reactions. In the first application, these membranes are used strictly for separation of molecules, while in the second instance, a catalyst can be incorporated within the module to convert it into a reactor.

The membrane is a composite that has the mechanical strength of the support and molecular sieving properties of the CMS material—characteristics that are not available in either material separately. This is the major advantage of the invention disclosed herein.

DETAILED DESCRIPTION OF THE INVENTION

Figure 1:
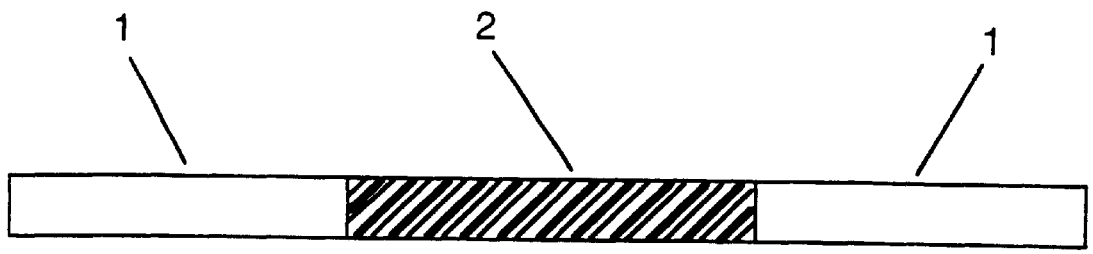
FIG. 1 shows the setup formed in Examples 1 and 6.

The nanoporous carbon membrane or CMS membrane is prepared on the surface of a support material, for example, a prefabricated, porous, stainless steel plate or tube. This is done by coating the surface of the support material with a suitable polymer precursor. Some amount of the polymer impregnates the pores of the support material as a result of the capillary pressure exerted by the pore walls. The support can have pore sizes ranging from 0.1 to 100 μm in diameter. After pyrolysis, a layer of carbon is formed on the support, with some carbon reducing the effective diameter of the pores in the support. It is desirable to repeat this procedure several times to build up a thin layer of CMS of uniform resistance on the surface. This configuration is better than narrowing down pores as the problem of some pores being left open, thus providing a leak through the membrane, does not arise. The resulting membrane is a series of micromembranes stacked on the surface of the porous support. The pore walls of the support create the boundaries of the carbon membrane and give the composite, carbon/metal membrane much greater strength than graphite or ceramic.

In a preferred embodiment of the present invention, the problem of end fittings or edge fittings, is solved by the use of a metal support. The metal support can be prefabricated to very small tolerances and does not require the use of expensive custom-made fittings to ensure the complete isolation of the two sides of the membrane. In a preferred embodiment of the present invention, which will be discussed in more detail later, the support is a porous metal (e.g., porous stainless steel) tube. After the membrane is formed by building up a layer of CMS material on the outer surface of the porous tube, the membrane can be incorporated into a shell (i.e., to form a tube in shell device) to create two zones for gas flow that are separated by the membrane. The porous metal tube can be attached (e.g., by welding) at both ends to two lengths of non-porous tubes, for example, non-porous stainless steel. This attachment is crucial, but requires no special expertise beyond that which one trained in the art of connecting pieces of metal would be required to have. The shell is then easily attached to the inner tube to create the module using standard compression or vacuum fittings. The membrane module can be used individually, or with several identical units, to provide low energy molecular sieving separations for industry. The module can be assembled and disassembled very quickly, which would facilitate inspection and replacement of the membrane in commercial practice.

To summarize, the novel features of the CMS membrane described herein are its high degree of mechanical strength and ease in forming a working module. It also has high temperature stability that sets it apart from zeolites and polymers. Coupled with the inherent molecular sieving nature of CMS, these characteristics make the supported CMS membrane eminently suitable for gas separations.

The immediate use of the supported CMS membranes to gas separations has been demonstrated in the experiments described below. The membranes are very robust and convenient to utilize, for example, in the form of a shell and tube module. Separation of nitrogen and oxygen is currently carried out using CMS in powder form. This could be easily replaced by the tubular or disk membranes of the form described in the instant application. The easy disassembly of the module would be helpful in membrane replacement. The membranes can also be "tailor-made" to carry out virtually any gas separation based on molecular size difference, simply by adjusting the synthesis conditions.

The application of the membrane to catalytic reactions is also a topic of great interest. Membranes of inorganic materials such as palladium have been shown to improve the yields of dehydrogenation reactions by selective removal of hydrogen from the reaction mixture. One might envisage the same application using CMS membranes, wherein the module could be packed with a catalyst converting it into a reaction cum separation unit. CMS is an inert material and thus would not be affected by or poison catalytic reactions which inorganic materials might do. The synthesis of a catalytic CMS membrane reactor is also a possibility. Catalytic sites could be introduced into the carbon microstructure, opening up the possibility of carrying out shape selective catalysis in the module form to obtain certain desirable products.

In a preferred embodiment of the present invention, the support is made of metal. Metal supports for CMS, in addition to providing high mechanical strength, also have good heat transfer characteristics and temperature stability. This makes them ideal for use in high temperature applications, where polymeric membranes and zeolites would degrade.

The membranes produced in the following Examples (i.e., Examples 1–3) were tested to determine their permeability to various gases. Schematic diagrams of the apparatus used in the tests are shown in FIGS. 5, 6, 15 and 16.

In Example 1, the probe gas permeabilities were measured by connecting a pressure gauge to $S_2$ and closing $T_2$. $S_1$ was closed during the experiment. The pressure on the shell side ($P_{SS}$) was monitored as a function of time (t) while the gas was flowing through the membrane. The tube side pressure ($P_{TS}$) was constant and there were no leaks in the apparatus. Both sides of the membrane were initially at atmospheric pressure. Writing a mass balance for the shell side, we have:

$$\frac{dm}{dt} = J \cdot M_w$$

where m=mass of gas, J=molar flux across membrane and $M_w$=molecular weight.
The flux across the membrane can be expressed as $$J = \frac{P_o}{L}(P_{TS} - P_{SS})$$

$P_o$ gas permeability, L=membrane thickness.
Using the ideal gas law, the mass of gas can be expressed in terms of $P_{SS}$ and the final expression is $$\frac{dP_{ss}}{dt} = \frac{ART}{V_{ss}}\left[\frac{P_o}{L}(P_{TS} - P_{SS})\right]$$

where $V_{SS}$=shell side volume and A=membrane surface area, $$R = 82.059 \frac{cm^3 atm}{mol\, K\, (proportionally\, constant)}$$

and T=temperature K.
Integrating from t=0 ($P_{SS}$=0 psig), we get $$\ln\frac{P_{TS}}{P_{TS} - P_{SS}} = \frac{ART}{V_{ss}}\frac{P_o t}{L}$$

Thus, a plot of the left hand side expression versus t gives the permeability of the gas. A typical plot is shown for a sample prepared with polyvinyl alcohol (PVA) as the polymeric carbon precursor at a synthesis (soak) temperature of 600° C. in FIG. 7, where helium was used as the probe gas. The units of permeability are mol/cm²s atm. Experiments were carried out at ambient temperature and a pressure range of 30 to 70 psig (3 to 6 atm).

Steady state experiments to determine the primary transport mechanism(s) through the membrane were also performed. During the runs, $S_2$ was connected to a pressure gauge followed by a rotameter and finally a soap bubble flowmeter. Again, $S_1$ and $T_2$ were kept closed. The rotameter was used to control the flowrate of the gas through the membrane and hence maintain a desired pressure gradient across the CMS layer. The upstream tube pressure was varied and readings were taken for flowrate at different pressure gradient values. The permeability was defined as the volumetric flowrate divided by the pressure gradient and had units of cm³/minute (min) psig.

Experiments were also performed at elevated temperatures and permeabilities were measured using the pressure rise technique described in the previous section. As described in Example 1, the shell and tube unit was wrapped in heating tape connected to a variac. A J-type thermocouple inserted through $T_1$ monitored the temperature at the center of the membrane. Runs were performed at intervals of 1–2 hours to allow the system temperature to stabilize. The highest temperature of any run was 172° C., well below the pyrolysis temperature of the membrane.

SEM analysis of the membranes was also carried out. The samples were cut into sections and mounted in an epoxy mold. The surface was sputtered with gold and the cross section was observed.

Figure 8:
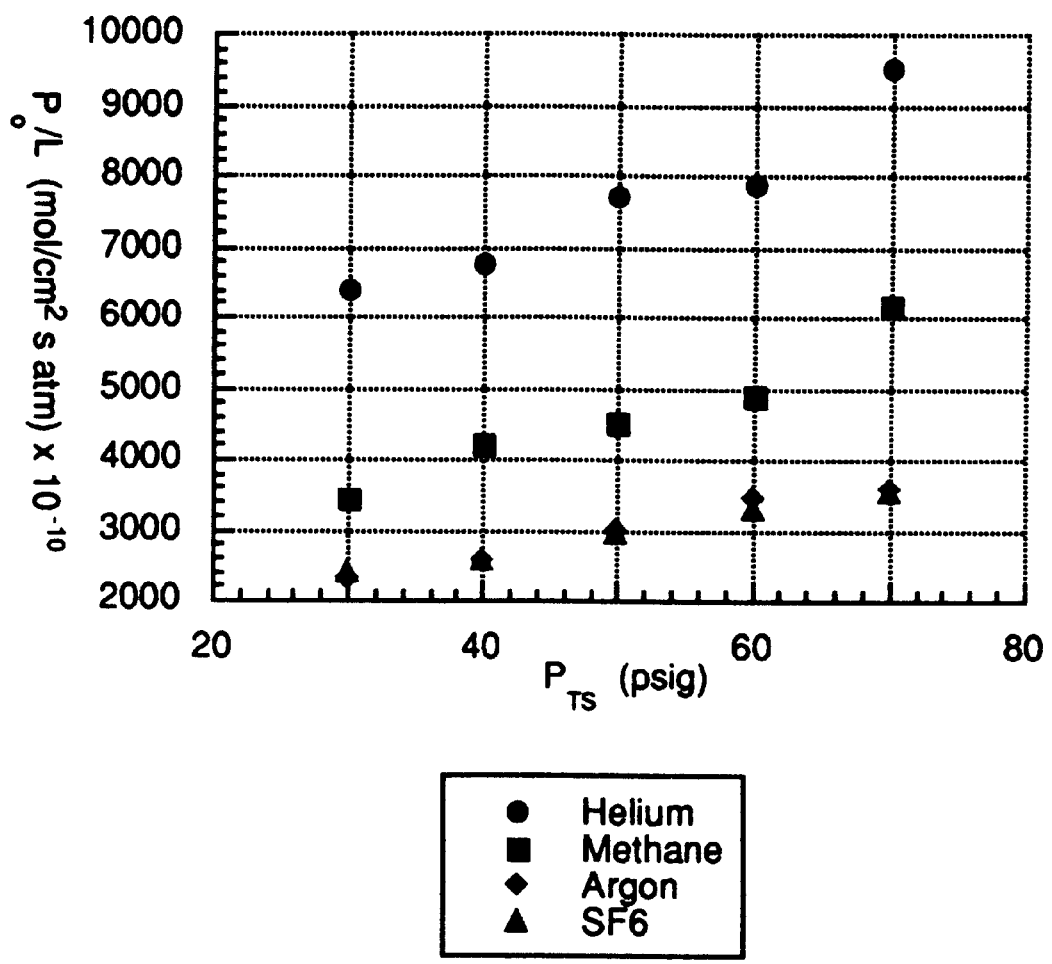
FIG. 8 is a plot of $P_o/L$ vs. $P_{TS}$ for various gases using the shell and tube membrane formed at 600° C. in Example 1.

The permeability of the probe gases were obtained from the pressure rise method. FIG. 8 shows the experimental data for permeability as a function of upstream tube pressure for a 600° C. sample. The data points lie more or less in a straight line, the slope of which changes for different gases. There is a decrease in the slope from helium, a light molecule, to argon, a heavier molecule. The permeability of the gases was seen to have an inverse relationship with their molecular weights (with the exception of $SF_6$). This suggests a transport mechanism similar to Knudsen flow, in which the permeability is inversely proportional to the square root of the molecular weight of the gas. Similar results were also seen for samples prepared at other temperatures. However, the presence of pore size distribution in the carbon layer implies there are several different mechanisms that can account for gas flow. Indeed, the overall transport could have contributions from molecular sieving, Knudsen flow and surface diffusion in micro and mesopores, and convective flow behavior in the macroporous regime. Thus, the rather high permeability of $SF_6$ as seen in FIG. 8 is probably due to a large surface diffusion contribution to the flow. The dominant mechanism would depend on the size and nature of the diffusing molecule.

Figure 9:
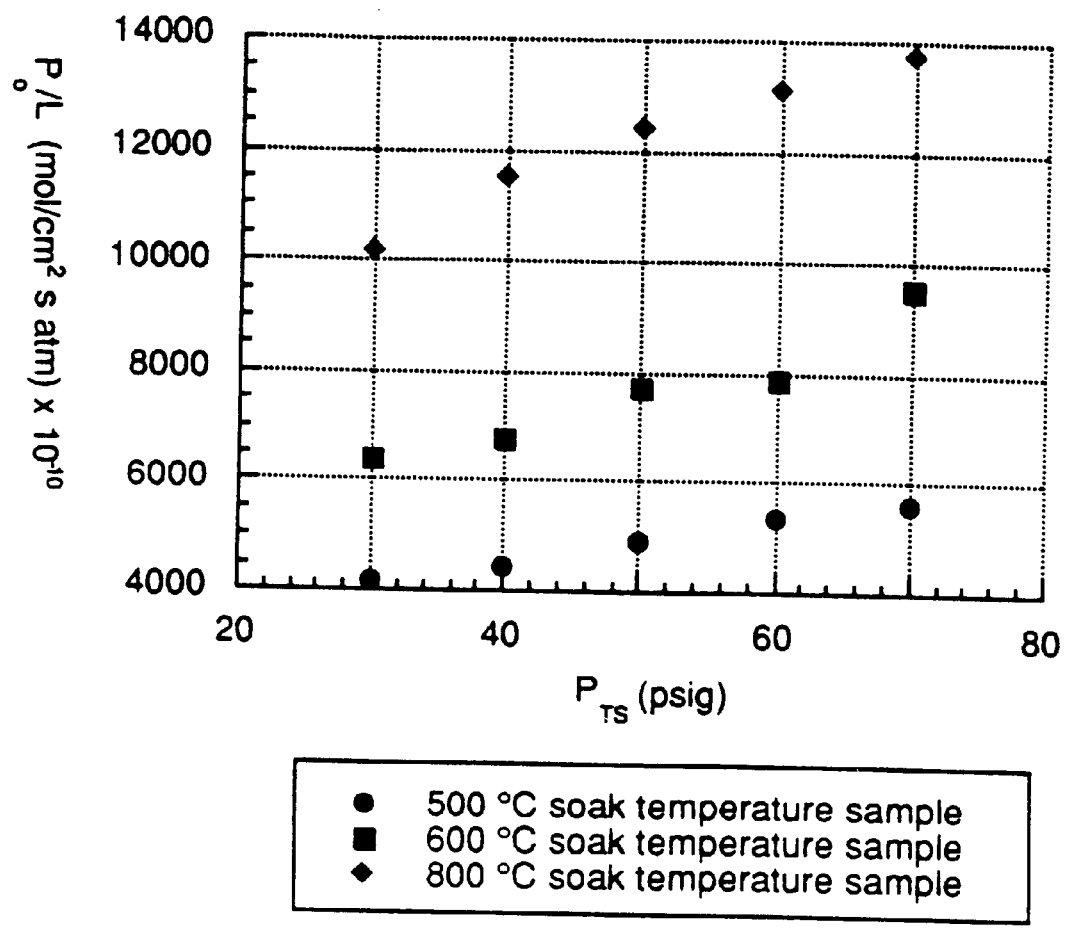
FIG. 9 is a plot of $P_o/L$ vs. $P_{TS}$ for helium using the shell and tube membranes formed at 500° C., 600° C. and 800° C. in Example 1.

FIG. 9 shows the data for permeability of helium as a function of upstream tube pressure for the three different membrane samples. The permeability of different gases under identical conditions was found to increase with increasing preparation temperature of the samples. This behavior is consistent with the current understanding of the evolution of the microstructure in CMS. At low temperatures, CMS has very little porosity and pores are virtually non-existent. Increasing the temperature leads to pore formation and a sudden rise in diffusivity of various molecules. At some temperature, the microdomain alignment increases and pores begin to shrink once again. Similarly, the overall pore volume of the CMS (observed from equilibrium uptake measurements) increases up to a certain temperature, above which the microstructure collapses.

Diffusivity of a gas is not affected by changes in pore volume-hence, measurements of diffusivity would only reflect a varying pore size. Pseudo-equilibrium uptake experiments (see Mariwala, R. K. and H. C. Foley, *Evolution of Utramicroporous Adsorptive Structure in Poly(furfuryl alcohol)-Derived Carbogenic Molecular Sieves*; Industrial and Engineering Chemistry Research, 1994; 33; pp. 607–615) indicated an increase in diffusivity for small molecules like $O_2$, $N_2$ and $CO_2$ with increasing synthesis temperature, followed by a decrease above 600° C. This agrees with the hypothesis of a microstructure in which pore sizes first increase and subsequently decrease. On the other hand, permeability is dependent on both the pore size and pore volume of the medium. Hence, even though pores might be shrinking, an increasing pore volume could lead to higher permeabilities. This observation allows us to explain the permeability characteristics of the membranes of the present invention. The membrane derived from PFA at 500° C. can be regarded as having an "underdeveloped" microstructure, with few pores of large size. Gases exhibit moderately high values of permeability through the membrane. In membrane derived from PFA at 600° C., pore sizes are smaller (see Mariwala, R. K. and H. C. Foley, *Evolution of Ultramicroporous Adsorptive Structure in Poly(furfuryl alcohol)-Derived Carbogenic Molecular Sieves*; Industrial and Engineering Chemistry Research, 1994; 33, pp. 607–615) and this would suggest lower permeabilities—but the increased pore volume or "openness" of the microstructure overrides this effect. The pores are not small enough to offer shape selectivity—hence, the decrease in pore size is not as significant for overall membrane transport as an increasing pore volume. For the case of the membrane derived from PFA at 800° C., the pore volume increases still further and permeabilities also rise. We would expect that a membrane synthesized at 1000° C. would have very low permeability due to the microstructure collapse observed for powdered PFA derived CMS.

Figure 10:
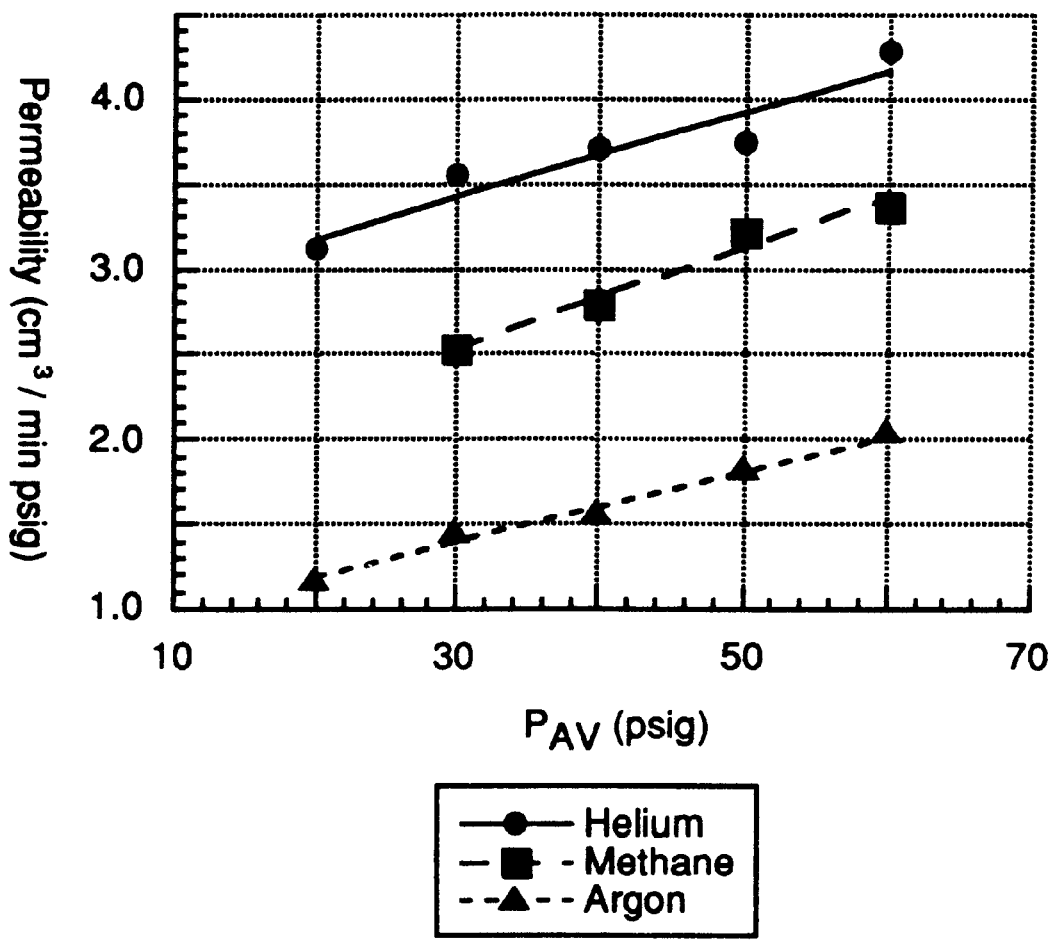
FIG. 10 is a plot of permeability vs. $P_{AV}$ for various gases using the shell and tube membrane formed at 600° C. in Example 1.

In a preferred embodiment of the present invention, where the CMS membrane is derived from PFA, the pyrolysis temperature is from 400–800° C. In another preferred embodiment of the present invention, the pyrolysis temperature is from 500–800° C. In another preferred embodiment of the present invention, the pyrolysis temperature (PFA→CMS) is from 550–750° C. In the most preferred embodiment of the present invention, the pyrolysis temperature (PFA→CMS) is from 600–700° C. Membrane permeabilities were also measured in the steady state experiments. FIG. 10 is a plot of gas permeability as a function of the average pressure across the membrane prepared at 600° C. The average pressure was defined as half the sum of the shell and tube side pressures during a run. The data was taken for a constant gradient of 20 psig across the membrane. The permeability is seen to vary almost linearly with average pressure over a wide range of upstream pressures. This behavior can be explained by the analysis of gas flow in a porous medium proposed by Knudsen (see Knudsen, M., *Die Gesetze der Molekularstromung und der inneren Reibungsstromung der Gase durch Rohren*: Annalen Der Physik, 1909; 28; pp.75–130). He examined the transition region from convective flow to molecular streaming and proposed that the permeability of a gas could be expressed as $$P_m = aP_{av} + b \; \frac{1 + c_1 P_{av}}{1 + c_2 P_{av}}$$

where $P_{av}$=average pressure across membrane.

The first term represents convective flow and is dominant at high pressure, while the second term denotes Knudsen flow under conditions of low pressure. The constants a, b, $c_1$ and $c_2$ are related to physical properties of the system like density and viscosity of the gas and effective pore radius. The data for the membranes of the present invention, therefore, would seem to indicate that gases are transported by convection across the membrane, with possible contributions from Knudson flow at the lower pressures of operation. There is also the possibility that cracks in the membrane could lead to viscous flow (see Uhlhorn, R. J. R., et al., *New Ceramic Membrane Materials for Use in Gas Separation Applications*; Science of Ceramics; p. 552).

Figure 11:
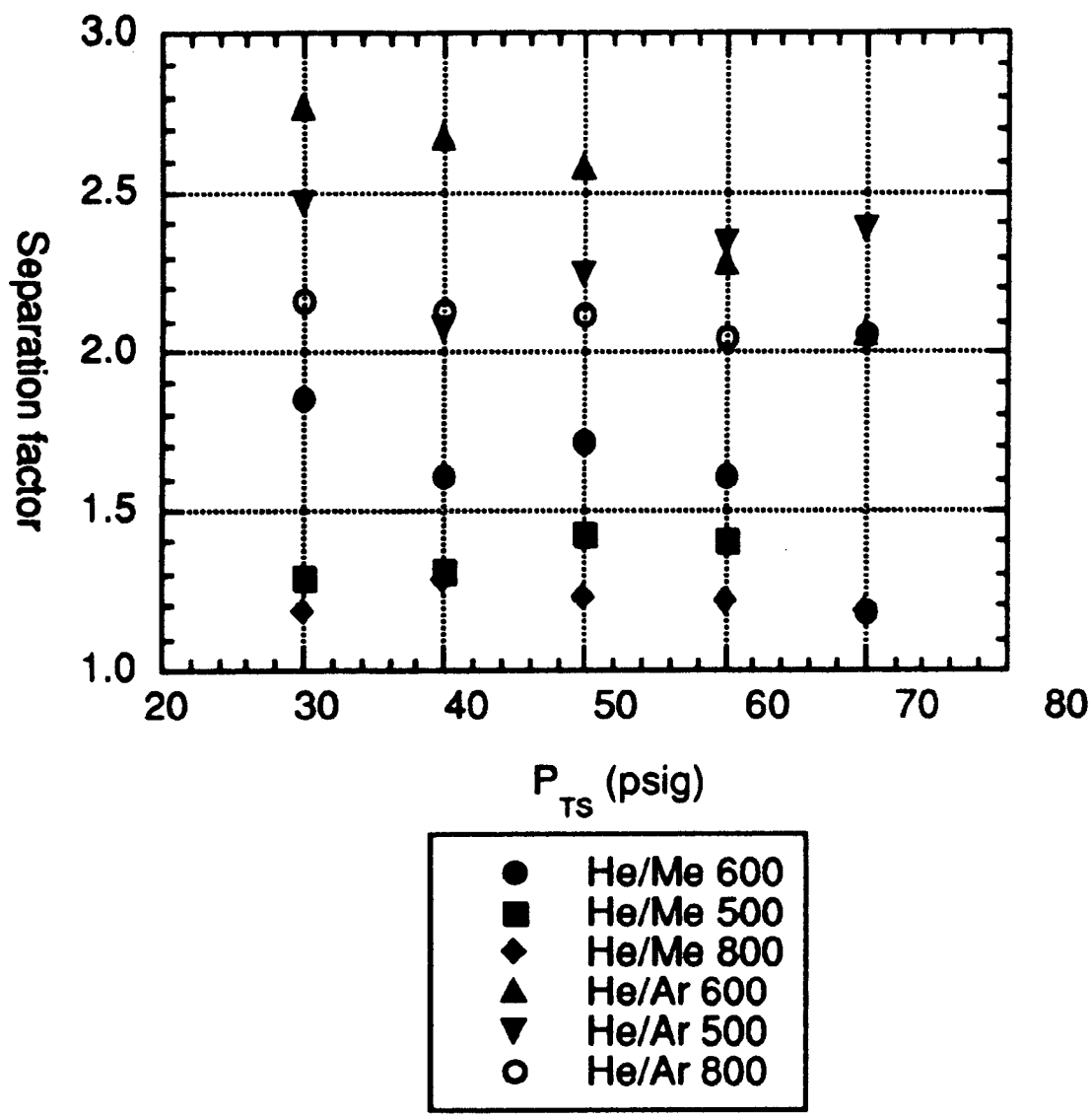
FIG. 11 is a plot of the separation factor vs. $P_{TS}$ for various gas mixtures using the shell and tube membranes formed at 500° C., 600° C. and 800° C. in Example 1.

The separation factor for a pair of gases was defined as the ratio of permeabilities of the gases at a given operating condition. A plot of separation factor versus upstream tube pressure is shown in FIG. 11 for the three samples prepared at different soak temperatures. The separation factor was found to decrease monotonically with increasing pressure for the 600° C. sample. If the data is extrapolated back to a zero upstream pressure, the Knudsen limit of separation is approached, defined as the ratio of the inverse square root of the molecular weights of the two gases. The tendency toward Knudsen flow at low pressures is consistent with the analysis of the steady state data. The highest achievable separation, therefore, is the Knudsen limit, and convective flow leads to lower selectivities through the membrane. The dependence of separation factor on pressure was not as evident for the other two membranes—in fact, it was almost a constant for the 800° C. sample. This illustrates the difference in CMS microstructure synthesized at different temperatures.

We also noted a maximization of the separation factor in the 600° C. membrane, which can be explained based on the evolving pore size distribution of the CMS. As the pyrolysis temperature is increased, the average pore size decreases. In the 500° C. membrane, the pore sizes are large enough to allow all gases to flow through easily, hence separation factors are low. The 600° C. membrane, however, contains a significant fraction of smaller pores, which hinder the transport of methane and argon to a larger extent than helium (based on size and molecular weight considerations). When the pores are further reduced in size in the 800° C. sample, even helium flow is restricted. Thus, the separation factor is lowered once again. The separation factor depends on the interaction between a molecule and the pore size distribution of the CMS microstructure.

The desirable property of any membrane is a high perm-selectivity toward a particular component. This does not imply the highest possible selectivity, as the permeability might be very low (as would be the case if the 600° C. membrane were operated at low pressure). Based on our experiments, the 800° C. membrane exhibits the best perm-selectivity, though the 600° C. membrane has the highest selectivity under all conditions. The operating conditions can also be varied to change the perm-selectivity.

Figure 12:
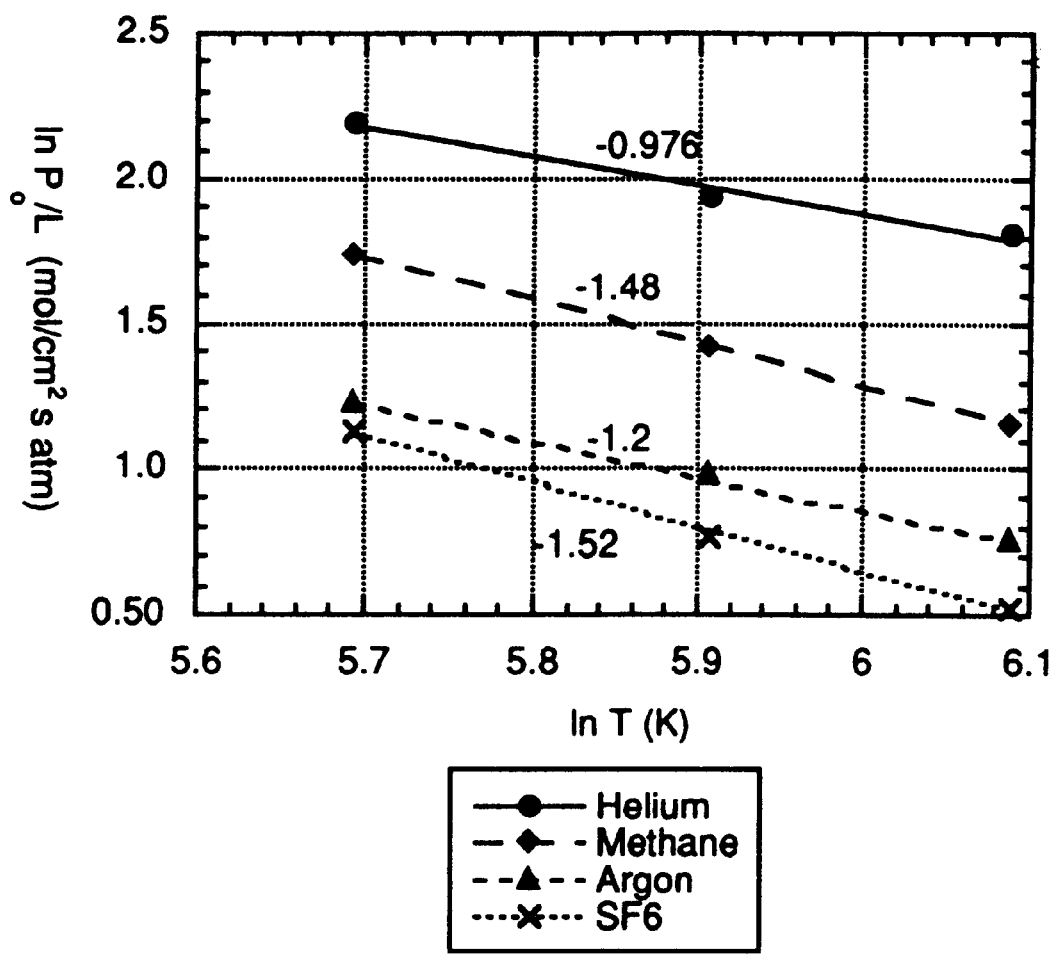
FIG. 12 is a plot of ln $P_o/L$ vs. ln T for various gases using the shell and tube membrane formed at 600° C. in Example 1.

The permeability of all gases (upstream pressure=30 psig) was found to decrease as a function of increasing temperature when the membrane produced at 600° C. was used, as shown in FIG. 12. The data points were fitted well by straight lines on a log-log plot and the temperature dependence (slope of the line) was larger for the heavier gases. Again, a combination of convective and Knudsen flow can explain this behavior. For purely Knudsen transport, the permeability of a gas is inversely proportional to the square root of the temperature (a slope of −0.5). On the other hand, for convective flow, we have $$P_m \sim \frac{1}{\mu T}$$

where $\mu$=gas viscosity.

Since $\mu$ varies as $T^{0.5}$, the convective permeability should have a temperature dependence of $T^{-1.5}$. The slopes of the various lines in FIG. 12 are bounded by the regimes of purely Knudsen and convective flow, with dominance of the latter mechanism. There is also the possibility of surface flow for the adsorbing gases argon and $SF_6$. At high temperatures, the adsorption of these gases on carbon decreases drastically. Hence, the component of surface transport is diminished, leading to the decrease in permeability. The unequal permeability decrease for different gases leads to higher separation factors at elevated temperatures.

Figure 13:
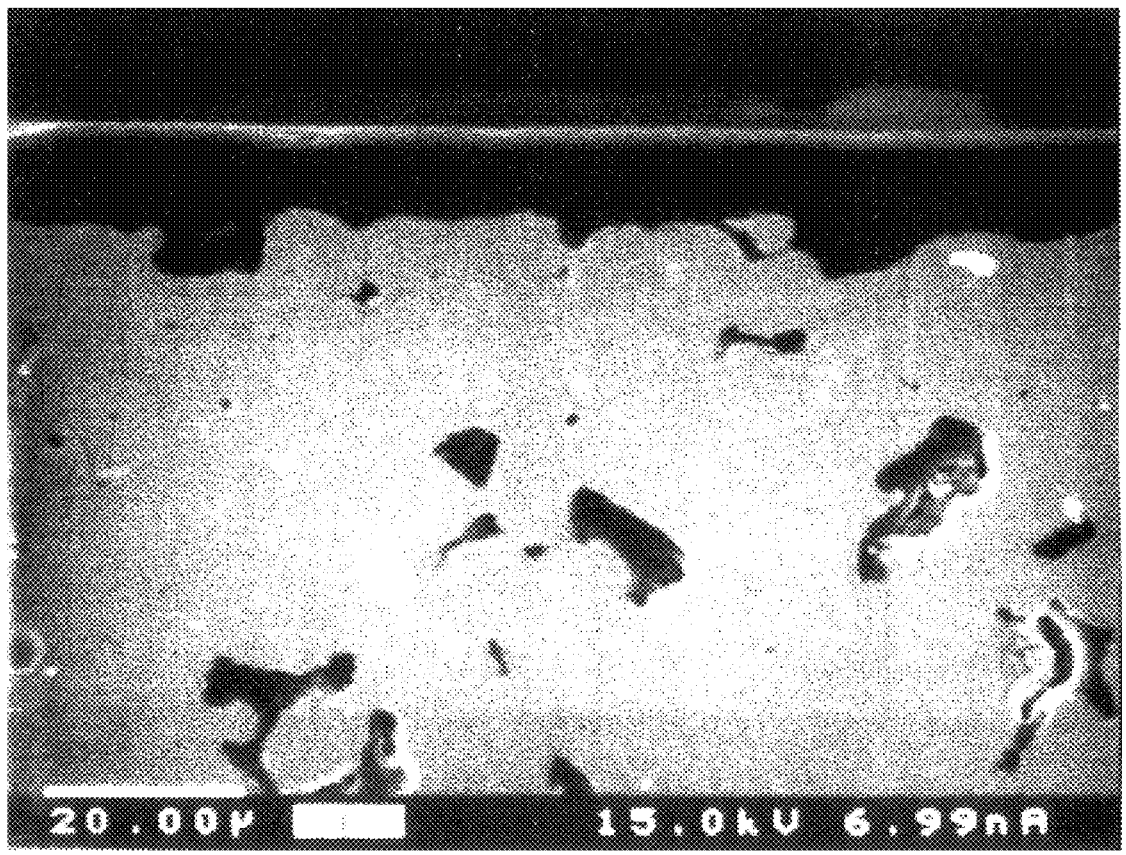
FIG. 13 is an SEM micrograph at 4,000×magnification of a CMS membrane formed on a flat metal plate.

An SEM micrograph of a flat plate membrane is shown in FIG. 13. The micrograph was recorded on a JEOL JSM-840 scanning microscope at a scanning voltage of 15.0 kV and 4,000×magnification. The sample was coated 10 times with 60 wt % PFA in acetone solution (i.e., a weight ratio of PFA to acetone of 60:40) and pyrolyzed at 600° C. The macroporous support had a pore size of 0.2 $\mu$m. The micrograph clearly reveals a layer of pyrolyzed carbon of average thickness 10 $\mu$m on the support surface. Samples prepared on larger pore supports had thinner layers under the same synthesis conditions, due to penetration of the precursor into the matrix.

Figure 14:
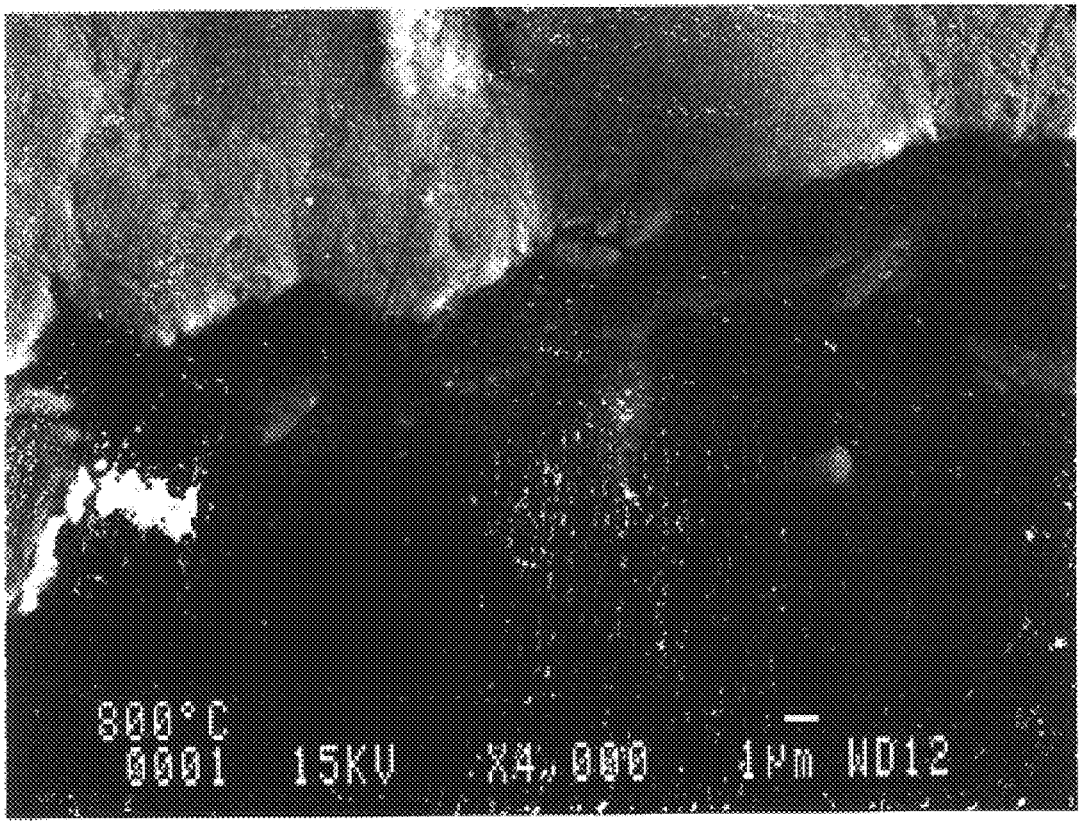
FIG. 14 is an SEM micrograph at 1,000×magnification of a cross-section of a CMS membrane formed on a tubular metal substrate.

FIG. 14 shows an SEM micrograph of a tubular membrane with 5 coats of precursor solution (i.e., a solution of PFA and acetone in a weight ratio of 60:40) pyrolyzed at 800° C. The micrograph was obtained on a JEOL JSM-840 scanning microscope at a voltage of 15 kV and 1,000× magnification. The support had a pore size of 0.5 $\mu$m. There does not appear to be a CMS layer on the surface as seen in the flat plate. This was probably due to a fragmentation of the layer while the sample was being cut prior to SEM analysis. It is also possible that the membrane is not truly asymmetric but consists of pyrolytic carbon dispersed inside the macroporous support. This could also explain the dominant convective flow behavior of all the membranes. If the carbon has not narrowed down all pores evenly, there would be cracks and defects in the structure, which would act as low resistance pathways and allow gases to flow with no selectivity at all. A uniform layer on the support is essential to ensure consistent sieving action by the membrane.

In the following Examples, various supported CMS membranes are derived from a PFA precursor material at pyrolysis temperatures from 500° C. to 800° C. While the use of the PFA precursor material to form the CMS membranes is a preferred embodiment of the present invention, the scope of the invention should not be limited to the use of PFA as the precursor material or to the use of pyrolysis temperatures of from 500° C. to 800° C. The use of other precursor materials, such as PAN and PVDC, and other similar polymers, is considered to be within the scope of the present invention. Generally, suitable pyrolysis temperatures for these materials will be between 500–1200° C. However, for each of these polymeric precursor materials, a person skilled in the art would either know or be able to easily determine the most desirable pyrolysis temperature for forming the CMS material.

The catalytically active NPC membrane is prepared from a non-polar organometallic precursor of a catalyst in solution with a non-polar solvent. A nanoporous carbon polymeric precursor, such as poly-furfuryl alcohol, is added to the solution forming a viscous but single-phase nanoporous carbon (NPC) precursor. The non-polar solvent is flashed off slowly at a heating rate of up to about 5° C./min and held at about 70° C. until the original viscosity of the carbon polymeric precursor is restored. Subsequent pyrolysis of the nanoporous carbon precursor at elevated temperatures produces the catalytic material with a very high degree of catalytic metal dispersion in the membrane.

Figure 40:
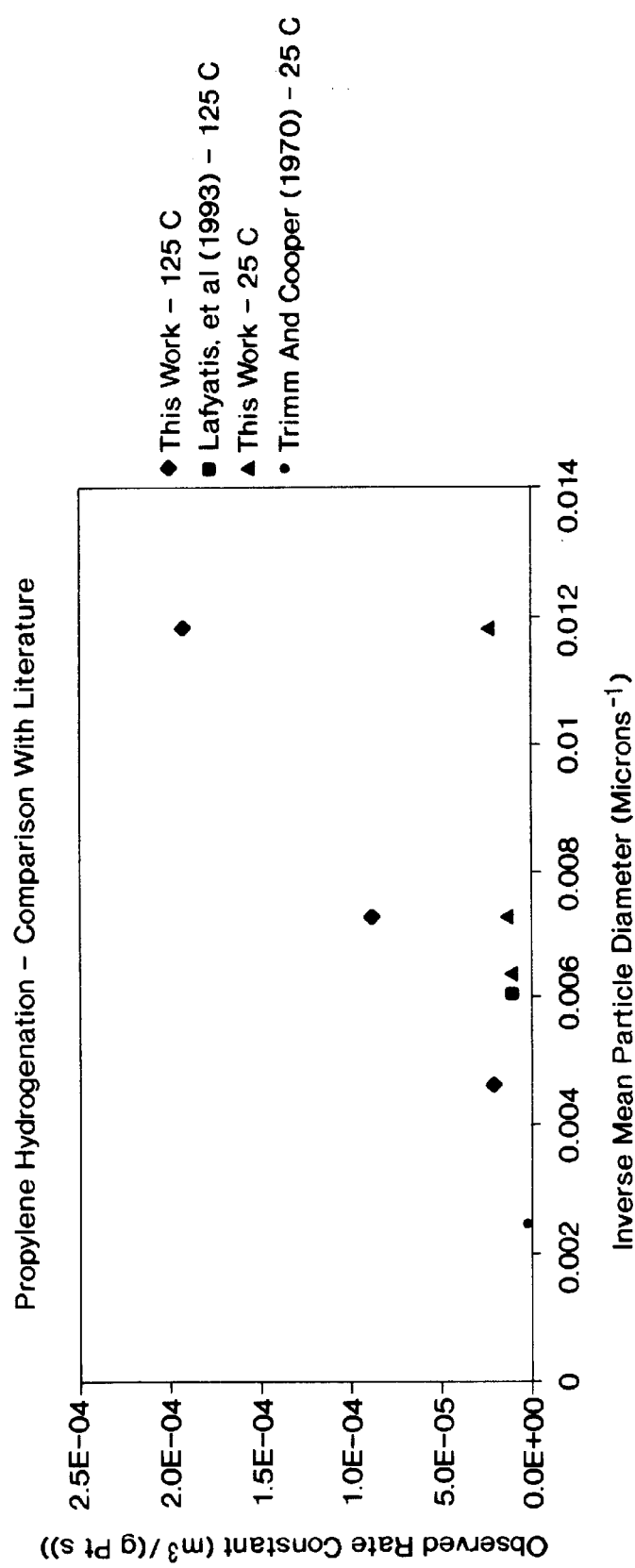
FIG. 40 is a plot of the propylene hydrogenation rates of the present invention in comparison to the rates in the literature.

The increase in metal dispersion increases the effective surface area of the NPC catalyst for reaction and hence, the intrinsic activity of the NPC catalyst. FIG. 40 displays the hydrogenation rate for propylene hydrogenated to propane for several different platinum nanoporous carbon catalysts. The figure shows an order of magnitude increase in the intrinsic reaction rate, indicating the invention produces a substantially more active NPC catalyst.

The increased dispersion of the catalytic metal also increases the shape selective behavior of the catalyst. Because the average domain size of the metal is decreased, there are fewer active sites available to molecular reactants that exhibit increased diffusional resistance within the catalyst support. In materials having larger domain sizes, selectivity is lost by large clusters of the catalytic metal agglomerating at the external surface of the particle. Using the invention, the NPC catalyst does not exhibit such agglomeration. The NPC catalyst produced according to the invention demonstrates a higher degree of shape selectivity. The enhanced selectivity has been observed in using the membrane for the selective hydrogenation of mono-olefins. Conversion ratios of propylene to isobutylene have been measured to be greater than 90. This is an improvement to the values of about 10 appearing in the literature.

The NPC catalyst, having a smaller domain size, is inherently resistant to deactivation due to coking. Coke formation at the surface of the catalytic metal is a strong function of the local surface area of an active site, with larger domain sizes causing coke formation more easily. Samples have undergone reactions in the laboratory with no evidence of deactivation or passivation of the catalyst for a time scale on the order of several days.

The process for making the catalytically-active NPC membranes does not alter the properties of the polymeric precursor. The viscosity and density of the polymeric precursor are unchanged for moderate metal loading. This allows metals to be incorporated into precursors for nanoporous carbon membranes with no detrimental impact on the synthesis conditions. In contrast, the prior art, such as aqueous-acid based metal sources initiate polymerization of the polymer and dramatically change its properties. Additionally, direct incorporation of metal oxides into the precursor changes the flow properties of the polymer and inhibits certain applications.

The invention has been verified for use with platinum on nanoporous carbon and ruthenium on nanoporous carbon. The invention is expected to successfully utilize the following metals which have non-polar organometallic precursors readily available: Cadmium, Copper, Cerium, Chromium, Cobalt, Gallium, Gold, Indium, Iridium, Iron, Lanthanum, Lutetium, Magnesium, Molybdenum, Nickel, Palladium, Platinum, Potassium, Rhodium, Rubidium, Ruthenium, Scandium, Selenium, Silver, Tin, Thallium, Vanadium, Zinc, Ytterbium and Yttrium. However, this list of catalytic metals should not be read to limit the invention to only organometallic precursors of these metals, but rather should include all organometallic precursors known to those skilled in the art to be applicable for this application.

The catalytically active NPC membrane is prepared in a similar manner to the NPC or CMS membranes described above. The membrane is prepared on the surface of a support material or substrate, for example, a prefabricated stainless steel tube or plate. A catalytically active NPC polymer precursor mixture is prepared by combining a suitable NPC polymer precursor, such as polyfurfuryl alcohol, and a catalytically active organometallic polymer with the addition of a non-polar solvent such as acetone. The catalytically active NPC polymer precursor mixture (also referred to herein as the nanoporous carbon precursor) is a single phase system. The support material is coated with the catalytically active NPC polymer precursor mixture using a means known by those skilled in the art, such as ultrasonic deposition or spray coating. When coating the support, some of the polymer impregnates the pores of the support as a result of the capillary pressure exerted by the pore walls. The support can have pore sizes ranging from 0.1 to 100 $\mu$m in diameter.

Once the support is sufficiently coated with the catalytically-active NPC polymer precursor mixture, the mixture is pyrolyzed to form a layer of carbon on the support. The carbon reduces the effective pore diameter of the pores in the support in a similar manner as in the CMS described above. Dispersed within the carbon is the catalytic metal from the organometallic polymer precursor. Repetition of the procedure results in increased thickness of the membrane on the support material. It is desired to build up a thin layer of the carbon/catalyst material on the support to obtain a uniform catalytically active NPC membrane. The completed membrane should be of sufficient thickness to prevent any leaks through relatively large pores in the membrane. With sufficient coatings, the membrane is essentially defect-free. The pore walls of the support create the boundaries of the membrane and give the entire catalytic system greater strength than graphite or ceramic membranes.

Additionally, the use of metallic supports for the catalytically active NPC membrane provides the same advantages for fabrication and incorporation into a reactor system as disclosed above relating to CMS membranes. It is a preferred embodiment of the invention to use metal supports for the catalytically active NPC membrane. It is also preferred that the support be in either tube or disk form.

As with the CMS membranes described above, the pore size of the catalytically-active NPC membranes can be tailored to meet the demands of a desired application.

Another advantage of the invention is the fact that the introduction of the catalyst into the NPC membrane does not negatively affect the transport through the membrane. The separation factors for the membrane systems indicate that the membranes are defect-free and have transport dominated by the configurational or nanopore diffusive regime. The linearity of steady state flux with pressure indicates that viscous flow through the membrane is negligible. The permeances of the membranes is in accord with the molecular sieving NPC membranes discussed above.

It is a preferred embodiment of the present invention that the catalytically active organometallic precursor be selected from the group of known non-polar organometallic precursors readily available. These include organometallic compounds containing at least one of the following metals: Cadmium, Copper, Cerium, Chromium, Cobalt, Gallium, Gold, Indium, Iridium, Iron, Lanthanum, Lutetium, Magnesium, Molybdenum, Nickel, Palladium, Platinum, Potassium, Rhodium, Rubidium, Ruthenium, Scandium, Selenium, Silver, Tin, Thallium, Vanadium, Zinc, Ytterbium, and Yttrium. In a further preferred embodiment of the invention, the catalytic organometallic polymer precursor contains Platinum or Ruthenium. In a highly preferred embodiment of the present invention, the catalytic metal in the organometallic compound is Platinum.

The dispersion of metallic active sites within the membranous carbon matrix of the invention is a novel reactor design. Traditional membrane reactors have been used as permselective barriers to shift equilibrium-limited reactions occurring at their boundaries. The advantages of incorporating the catalysts into the membrane itself eliminates external mass transfer resistance to and from the catalyst site, increases the effectiveness factor of the support material, and increases the net conversion observed through the permeate boundary. Selective mono-olefin hydrogenation is of interest because several researchers have used this model reaction and separation to characterize the catalytic performance of various nanoporous carbon-based catalysts.

Figure 15:
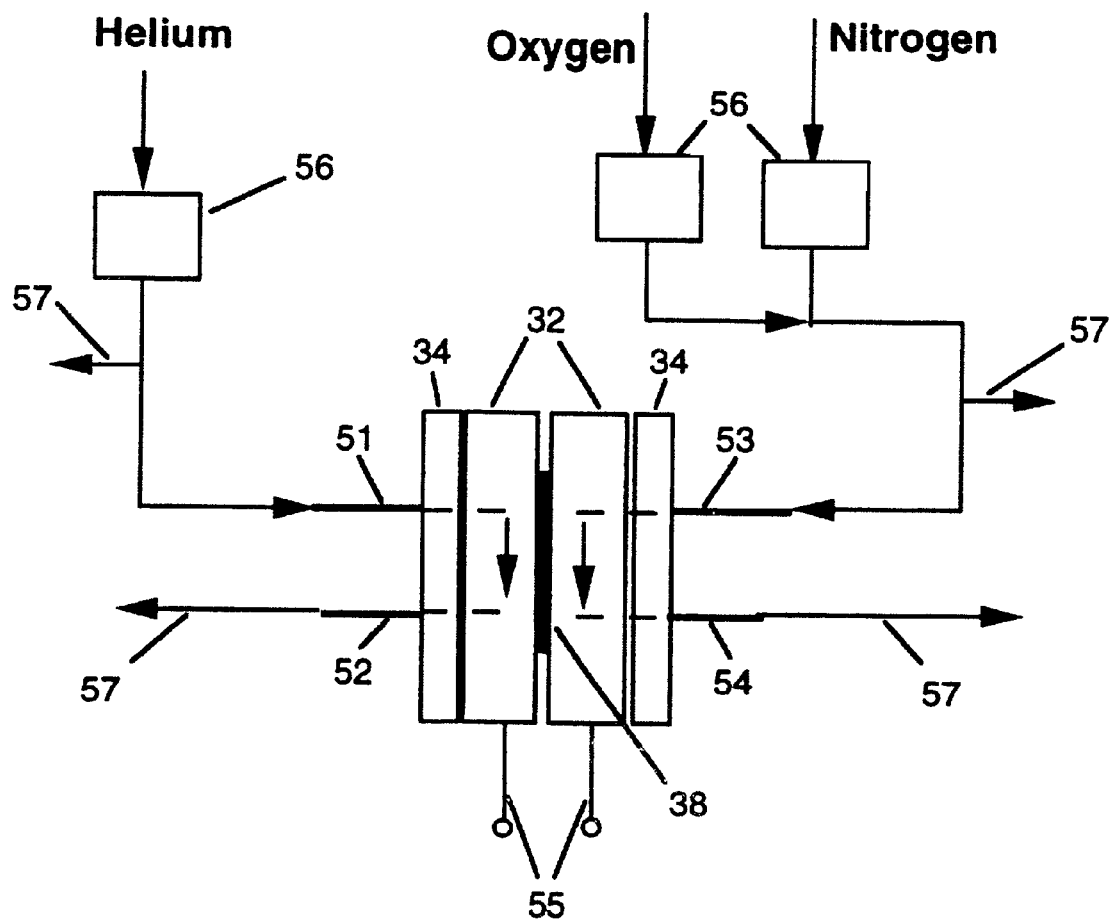
FIG. 15 is a schematic of a setup used to test the permeability of the disk membrane module formed in Examples 3, 4, and 5.

FIG. 15 shows the experimental setup used to obtain single and competitive hydrogenation rates through catalytic NPC membranes. The mono-olefin/hydrogen feed stream enters the reactor on the high-pressure side of the membrane while a helium sweep gas enters the permeate volume and carries the reaction products out of the reactor. The conversion and selectivity of the reactor is based upon all streams entering and exiting the reactor, hence the depicted setup in FIG. 15 allows for the measurement of concentrations and flow rates of all four reactor streams.

The reactor module itself is depicted in FIG. 15. The catalytic membrane 38 is loaded between two graphite or Viton™ gaskets and sealed in a stainless steel flange assembly 32 and 34 using copper gaskets. Temperature and pressure measurements are made at the membrane surface in both the high pressure and permeate volumes. The method of sealing the membrane—a critical issue for membrane reactors—allows for testing and reaction up to 175° C. depending on the type of gaskets used. The reactor is modeled using the assumption of continuously back-mixing in the volumes bounding the membrane. The consequence of this is that each chamber is then taken to contain a homogenous gas concentration similar to the "unit cell" assumptions of Khang, Soon-Jai and Yi Ming Sun, *A Catalytic Membrane Reactor: Its Performance in Comparison with Other Types of Reactors*, Ins. Eng. Chem. Res. V29, pp. 232–238 (1990).

To summarize, the unique features of the catalytically-active NPC membranes described herein are: (1) a very high degree of catalytic metal dispersion within the NPC membrane; (2) very high effective surface area of the catalytic metal, therefore, very high intrinsic activity of the membrane; (3) very high shape selective behavior of the membrane allowing the membrane to be tailored to various applications by varying the pore size of the substrate to limit or promote the reaction of materials based on their diffusional resistance; (4) resistance to coking of the catalytic sites due to the small domain size; (5) production of the catalytically active NPC membranes is simplified by the fact that the organometallic precursor does not alter the physical properties of the NPC polymeric precursor; (6) the high-degree of mechanical strength of the membrane; and (7) the use of the metal support allows for economical applications of the membrane into reactors without the need of custom fabricating connections, as described above.

EXAMPLE 1

Production of Tubular Membranes

A support consisting of a six inch (15 cm) long porous sintered stainless steel 316 tube of 0.25 inch outer diameter, 0.125 inch inner diameter and average pore size of 0.5 micron (Mott Catalog Number 2304-604-06-604-0.5-AB) was welded at each end to a nine inch long non-porous stainless steel 316 tube to form the setup shown in FIG. 1, where the support is shown as 2. Each of the two nine inch long non-porous stainless steel tubes 1 had an outer diameter of 0.25 inch and an inner diameter of 0.125 inch. Furfuryl alcohol resin (PFA) obtained from Monomer-Polymer and Dajac Laboratories (Feasterville, Pa., Lot A-1-143) was applied by hand painting the outer surface of the porous tube evenly with an ordinary paint brush using a precursor solution consisting of the PFA resin dissolved in acetone. The precursor solution contained about 60% by weight of PFA in the acetone (i.e., a 60:40 weight ratio of PFA to acetone). The acetone was not observed to react with the polymer and hence was merely used as a thinner to allow easier coating on the support.

Prior to the coating operation, the support was cleaned with chloroform and allowed to dry in air.

The application of the precursor solution to the surface of the support was performed as follows. The precursor solution was applied with a paint brush to the outer surface of the support, taking care to ensure an even coating. Any excess solution was wiped off the outer surface of the support with laboratory gloves.

After the application of the first coat of the precursor solution, the coated tube was allowed to dry in air for a period of about 6–12 hours to allow complete evaporation of the acetone. After this drying step, the setup was placed on a glass boat in a quartz tubular reactor and the quartz reactor was then inserted into a Lindberg single zone furnace. The temperature in the furnace was controlled by using an OMEGA CN2401 temperature controller with a J-type thermocouple to monitor the temperature. The coating of the precursor solution on the outer surface of the support was then pyrolyzed by the following procedure. An inert gas (helium) was flowed through the quartz tubular reactor to prevent oxidation of the PFA coating during the pyrolysis. The temperature inside the furnace was then ramped at a rate of 10° C./min to the pyrolysis temperature (i.e., 500, 600 or 800° C.) and held at that temperature for a period of two hours to form the CMS layer. The temperature inside the firnace was then cooled down to ambient temperature with the inert gas still flowing through the reactor.

Figure 2:
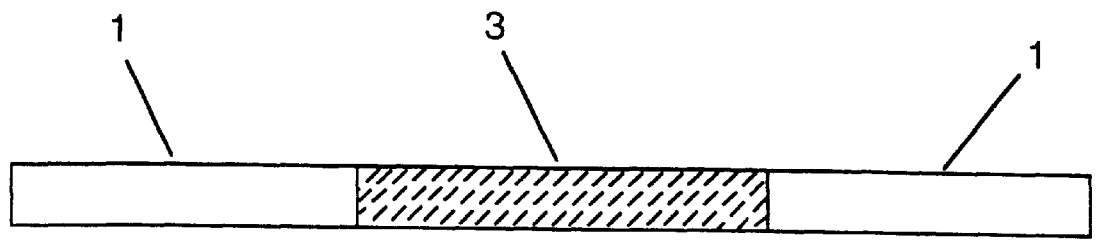
FIG. 2 shows the supported membrane formed in Examples 1 and 6.

After cooling, the setup was removed from the furnace and the coating operation was carried out four more times to give a support that is covered with five coatings. The setup with a support having five coatings thereon constitutes the final supported membrane that is shown in FIG. 2, where the coated support is shown as 3.

The above procedure was performed on three setups. Although the steps of the procedure were the same for each setup, the pyrolysis temperature was changed. The first setup was held at 500° C. for two hours. The second setup was held at 600° C. for two hours and the third setup was held at 800° C. for two hours. Three different membranes were produced by these three procedures.

Production of Shell and Tube Modules

Figure 3:
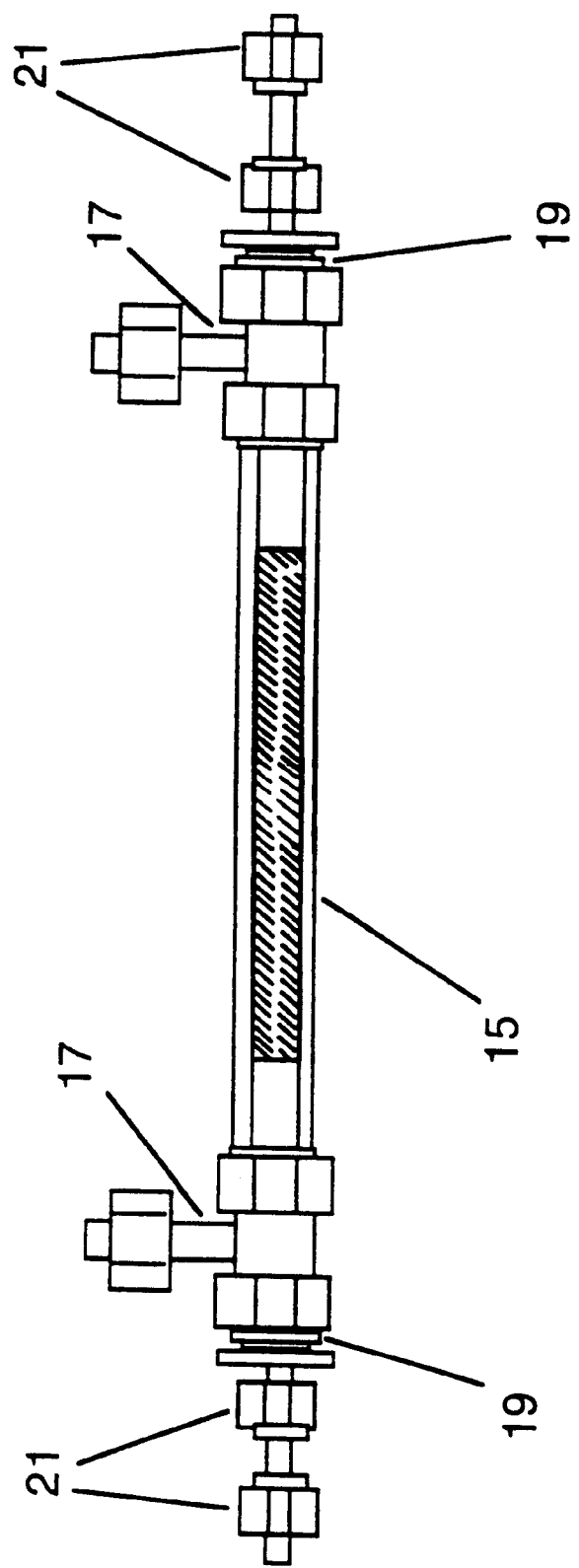
FIG. 3 shows the shell and tube module formed in Examples 1 and 6.
Figure 4:
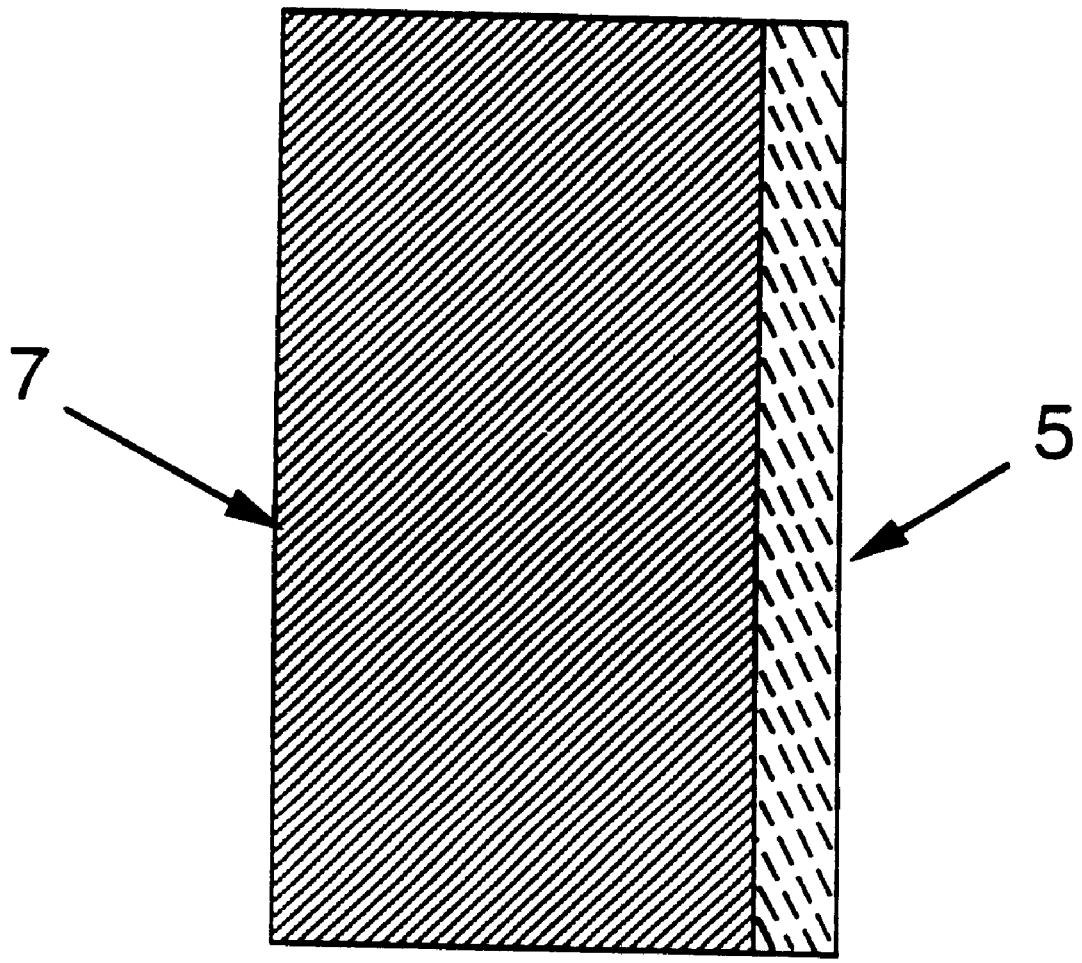
FIG. 4 is a cross-sectional view of a supported CMS membrane.

A shell and tube module is constructed by placing the supported tubular membrane in a stainless steel shell. A diagram of the completed module is shown in FIG. 3. The shell 15 was a stainless steel tube having an outer diameter of 0.5 inches, an inner diameter of 0.43 inches and a length of 11 inches. The ends of the shell are fitted with 0.5 inch stainless steel Swagelok™ Union Tees 17 which provide one port on the shell and tube side. A bored through Swagelok™ reducer 19 of 0.5 inch to 0.25 inch is fitted to the end of each of the tees and the tubular membrane is then slid into the shell. Two stainless steel nuts 21 with nylon ferrules are used to fasten the tube to the reducers (i.e., the non-coated ends of the tubular membrane were fastened to the stainless steel nuts with nylon ferrules). The module is thus made leak free and feed and outlet stream tubes and valves can be connected (i.e., there are two ports on both the shell and tube sides—see FIG. 3).

Testing Shell and Tube Modules—Unsteady State Permeability Test

Figure 5:
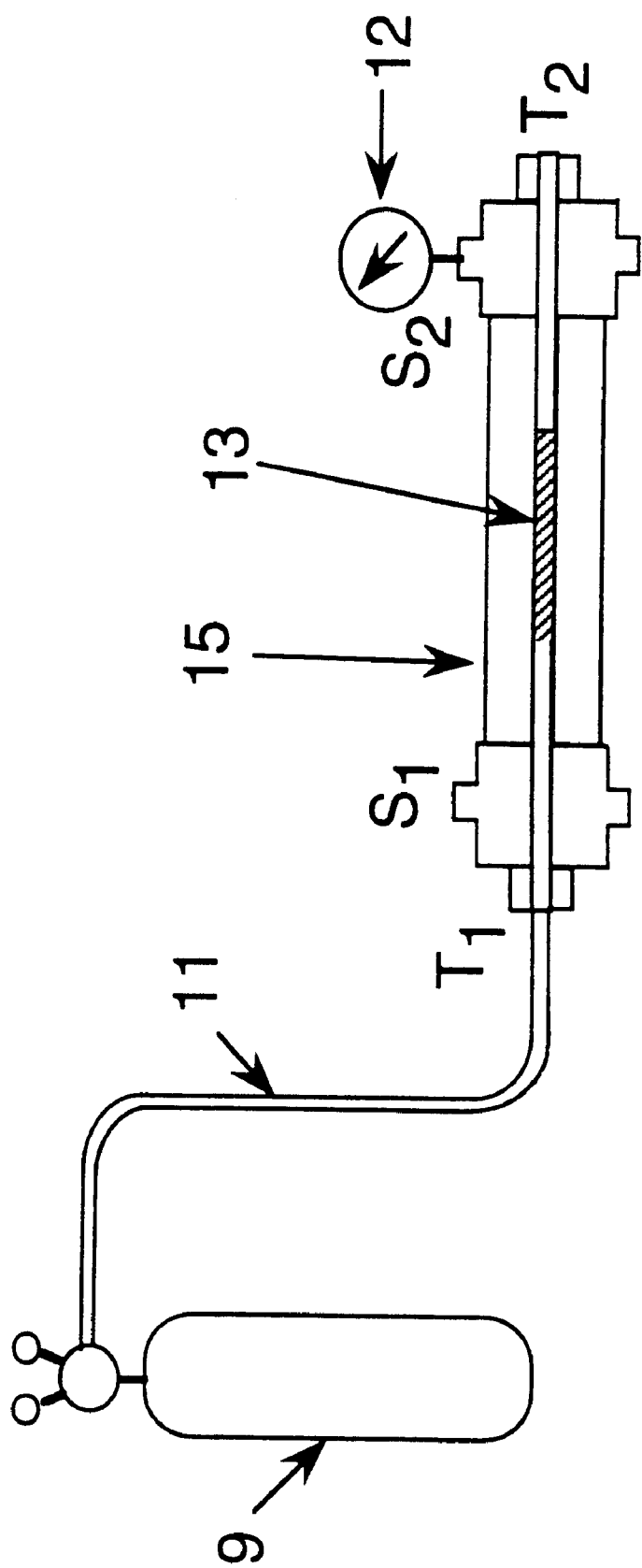
FIG. 5 is a schematic of an apparatus used to test the unsteady state permeability of the shell and tube membrane formed in Examples 1 and 6.
Figure 7:
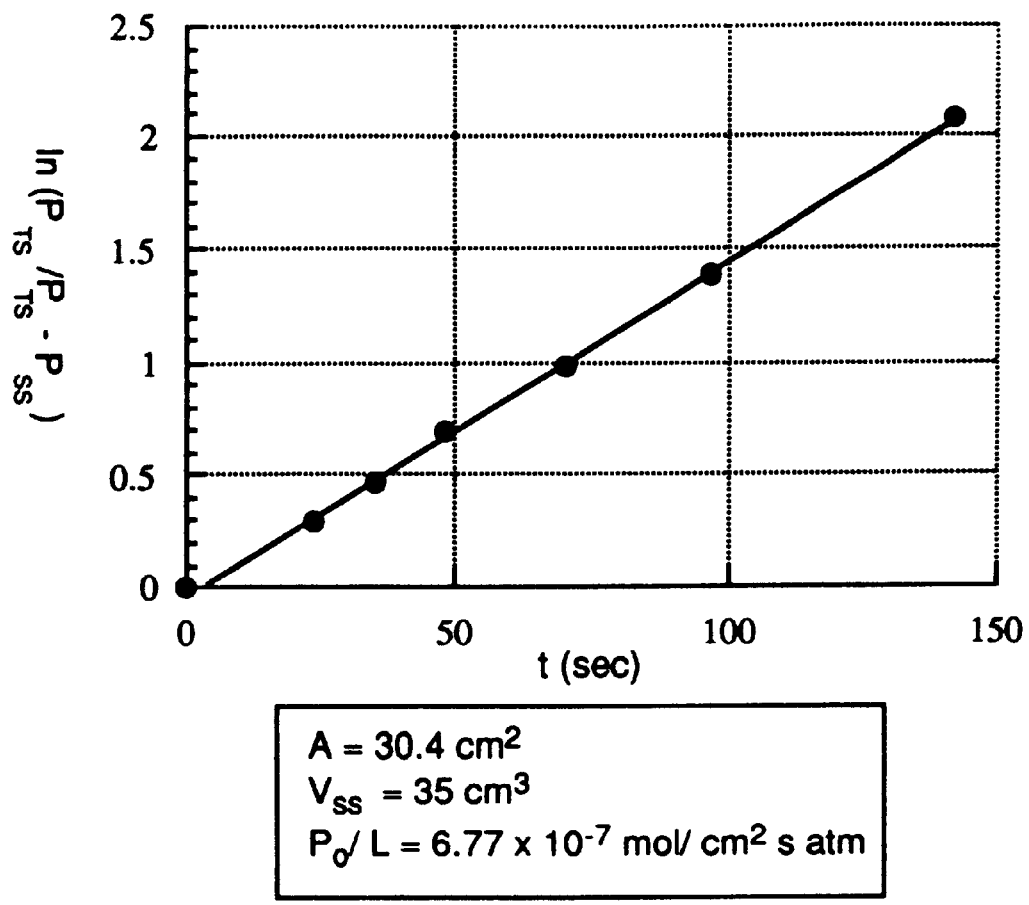
FIG. 7 is a plot which shows the permeability of the shell and tube module produced at 600° C. in Example 1.

The three supported tubular membranes formed in the first section of this Example were used to prepare three shell and tube modules as described above. Each module was then fitted on a stand and connected to feed and outlet stream tubes as shown in FIG. 5. Specifically, there are two ports on the shell side (denoted by $S_1$ and $S_2$) and the membrane 13 was fitted within the shell 15 to form a tube with two ports ($T_1$ and $T_2$). The inlet of the tube side $T_1$ was connected to a gas cylinder 9 by a length of stainless steel tubing 11 (¼" outer diameter) and the outlet of the shell side S2 was connected to a pressure gauge 12. $S_1$ and $T_2$ were sealed at all times. Several probe gases were then passed through each of the membranes over a range of pressures and temperatures to determine the permeability of different gases and their relative separation factors through the membranes. The gases were helium, methane, argon and sulfur hexafluoride, which have widely varying molecular weights. Argon and sulfur hexafluoride were known to adsorb onto the surface of carbon. For each gas, a constant static pressure of the gas was maintained on the tube side of the membrane and the rise in pressure was measured on the shell side of the membrane as a function of time. Data was collected for all of the probe gases and the permeabilities of the different molecules were regressed from the data (sample regression for the membrane formed at 600° C. and a tube side pressure $P_{TS}$=40 psig is shown in FIG. 7). The separation factor was defined as the ratio of permeabilities of two gases under the same experimental conditions. The tests were performed at ambient temperature and at tube side pressures ranging from 20 to 70 psig. Results for the various gases using the membrane formed at 600° C. are shown in FIG. 8. The permeability of helium alone through the different membrane samples is shown in FIG. 9. Separation factors as a function of tube side pressure are shown in FIG. 11. The dependence of permeability on temperature for the membrane produced at 600° C. is shown in FIG. 12.

Testing Shell and Tube Modules—Steady State Permeability Test

Figure 6:
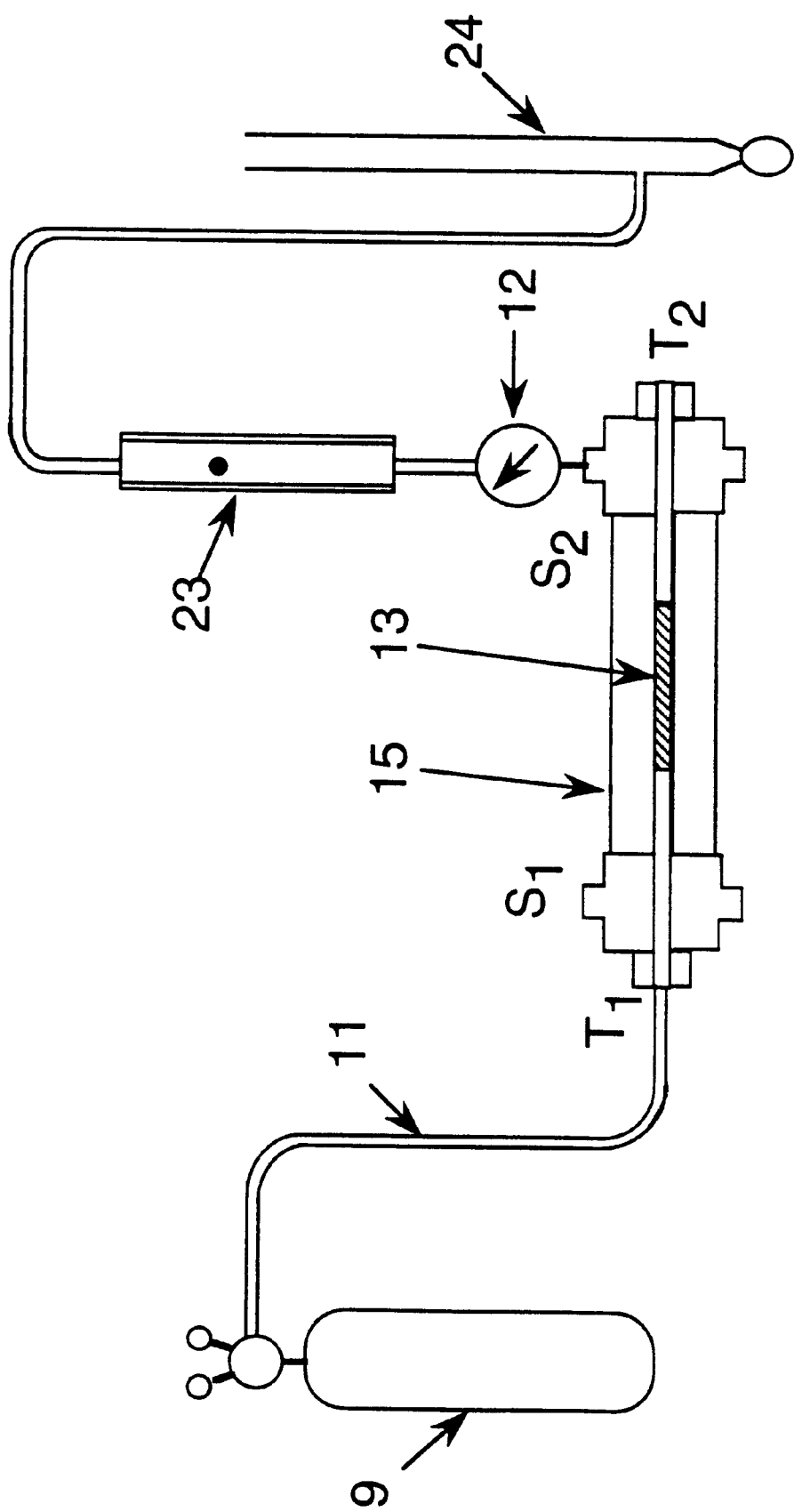
FIG. 6 is a schematic of an apparatus used to test the steady state permeability of the shell and tube membrane formed in Example 1.

The modules used were the same as in the unsteady state tests except that the outlet of the shell side $S_2$ was sent through a rotameter 23 and a bubble flowmeter 24 to measure the flowrate as a function of the pressure difference existing across the membrane under steady state conditions (see FIG. 6). A pressure head of gas was created on the tube side of the membrane and the rotameter on the shell side was used to vary the pressure drop. A plot of flowrate vs. pressure drop was used to determine a "volumetric permeability" of gas through the membrane.

The aim of this experiment was to identify the nature of the flow regime in the membrane based on variation in permeability with average pressure across the membrane. The Warburg-Knudsen equation was used to determine whether the permeability varied for the same pressure drop but different total pressures on either side of the membrane. It was found that there was an increase in the permeability with average pressure across the membrane, which was considerably larger for lighter molecules such as helium and methane (FIG. 10). This implied convective flow of gases through cracks in the membrane of the size 100 Å or more.

Testing Shell and Tube Modules—Temperature Dependent Permeability Experiments

The modules used were the same as in the unsteady state tests except that a J-type thermocouple was inserted into the tube of the module to measure the temperature at the center of the membrane. The shell was wrapped in heating tape and then in insulating tape to maintain isothermal conditions. The temperature of the system was controlled by connecting the heating tape to a variac (i.e., a transformer which is used to control the temperature of the heating tape by varying the amount of current supplied to the heating tape).

The unsteady state test method (described above) was used to analyze the permeability of gases under high temperature conditions. It was found that the permeability of all gases decreased with temperature. This decrease was more pronounced for heavier molecules such as $SF_6$ and argon (see FIG. 12). This again suggests convective flow through the membranes.

EXAMPLE 2

Production of Disk Membranes

In order to characterize the membranes more easily, flat stainless steel disks were used as the support material for the CMS membrane. The disks had a diameter of 1.875 inches, a thickness of 0.039 inches and a pore size of 0.2 micron (Mott Metallurgical Corp., Mott Catalog Number 11005-1.875-0.039-0.2). The coating procedure was similar to that of the tubular membranes. The furfuryl alcohol/acetone solution was applied by hand brushing and the surface excess was wiped off with a rubber laboratory glove. The disks were weighed before and after coating and then once again after pyrolysis. It was observed that pyrolysis led to a loss of around 65–70 wt % of the fresh coat, thus resulting in a 30–35 wt % yield of carbon molecular sieve on the support. Two disk supported membranes were produced, one with five coatings produced at a pyrolysis temperature of 600° C. and one with 3 coatings produced at a pyrolysis temperature of 800° C.

Production of Disk Membrane Modules

Figure 16:
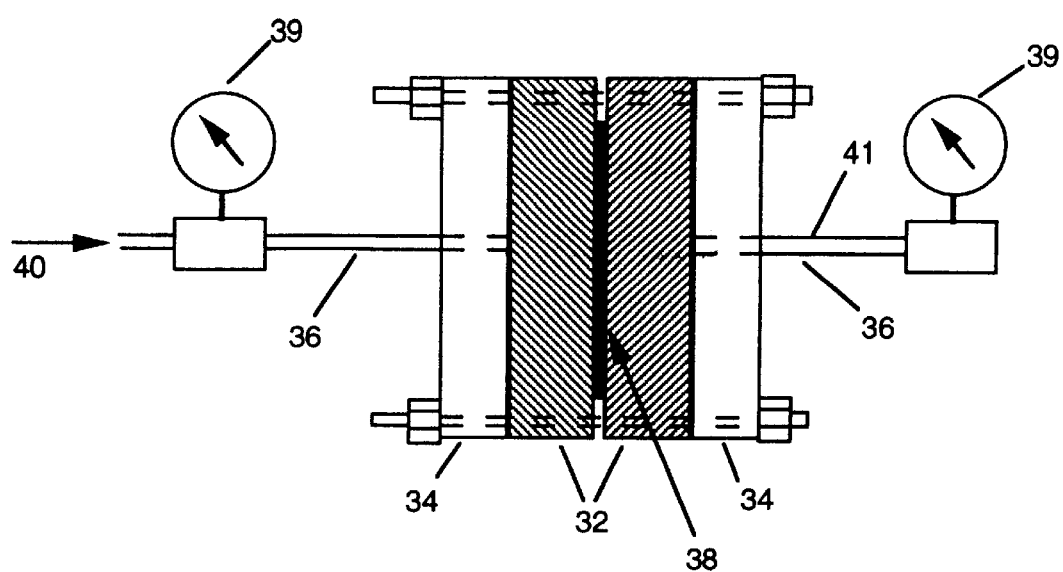
FIG. 16 is a substrate of the disk membrane module formed in Example 2.

As shown in FIG. 16, The disk membranes were formed into leak free modules by using two double sided flanges 32(MDC P/N 275150D; MDC Vacuum Products Corp., Hayward, Calif.). The knife edge on one side of each flange was machined off to allow a Viton™ gasket (MDC P/N 191005; MDC Vacuum Products Corp., Hayward, Calif.) to be placed between each side of the disk 38 and the side of each flange that faced the disk. The disk-supported membrane was then sealed between the two Viton™ gaskets. An inlet 40 and outlet 41 for the module was also provided by sealing (with copper gaskets) and outer flange 34 with tubing 36 on either side of the double sided flanges. The tubing was ¼ inch outer diameter stainless steel and was welded to the center of each of the outer flanges.

Testing the Disk Membrane Modules—Unsteady State Permeability Test

Figure 17:
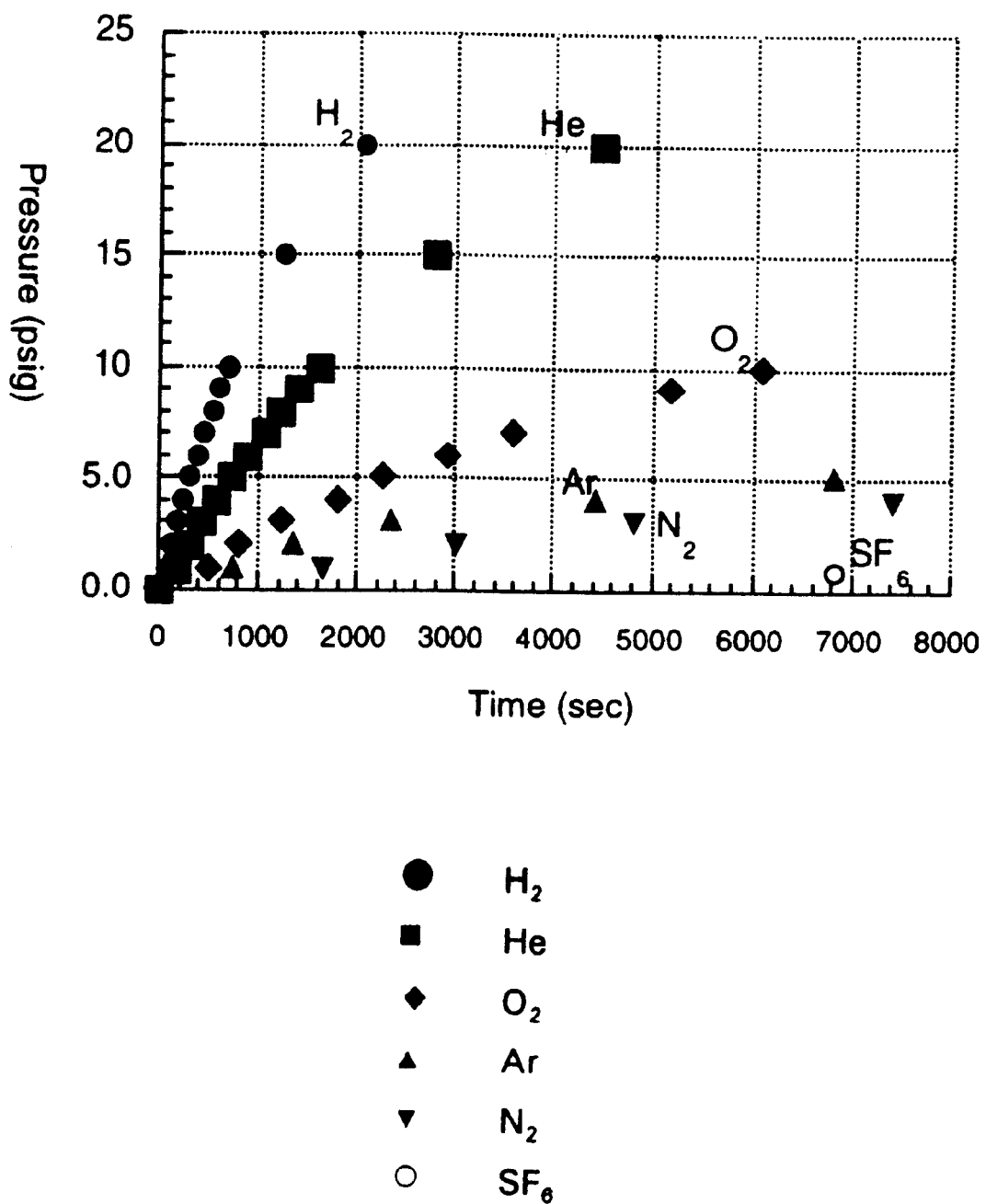
FIG. 17 is a plot of pressure vs. time for various gases at 293 K using the disk membrane module formed at 600° C. in Example 2.
Figure 18:
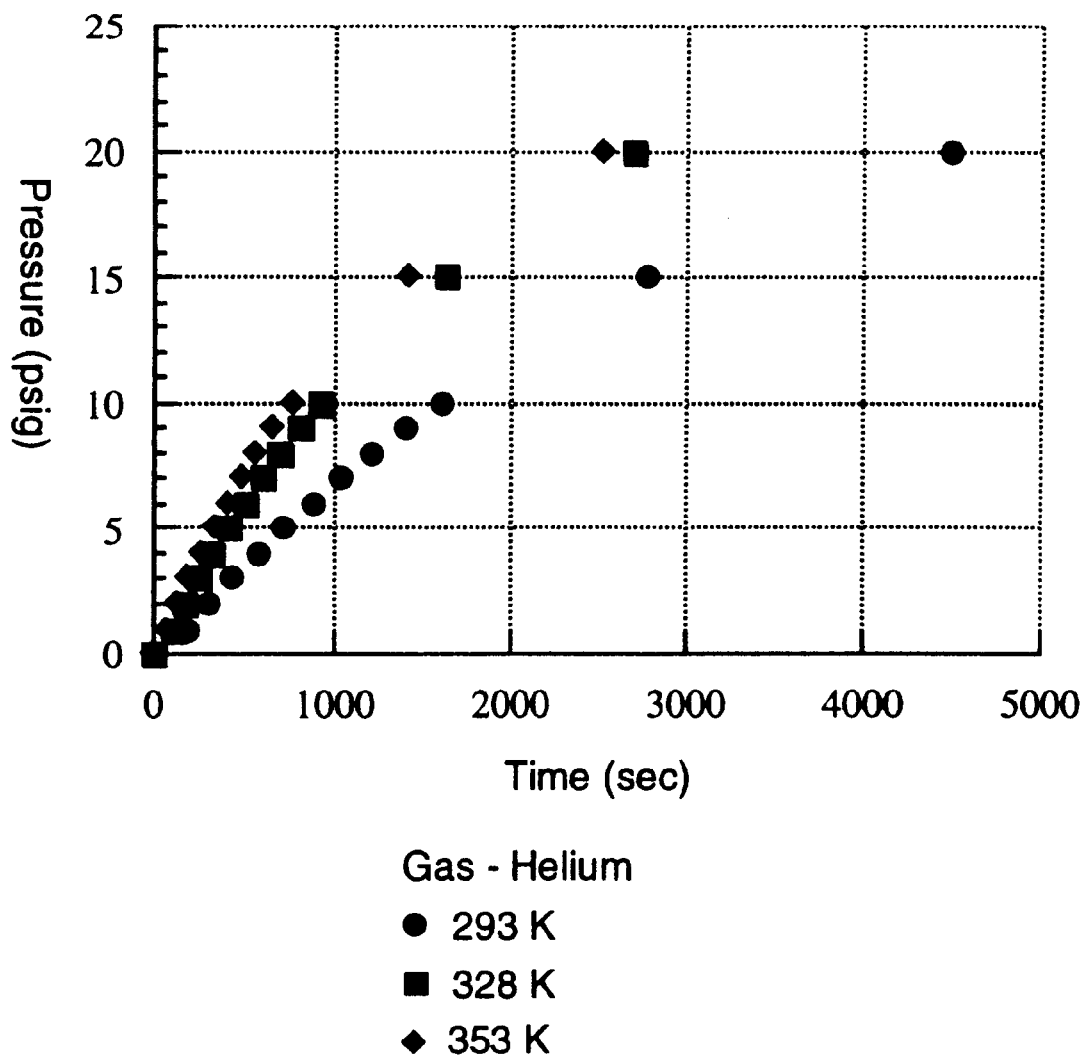
FIG. 18 is a plot of pressure vs. time for helium at various temperatures using the disk membrane module formed at 600° C. in Example 2.
Figure 19:
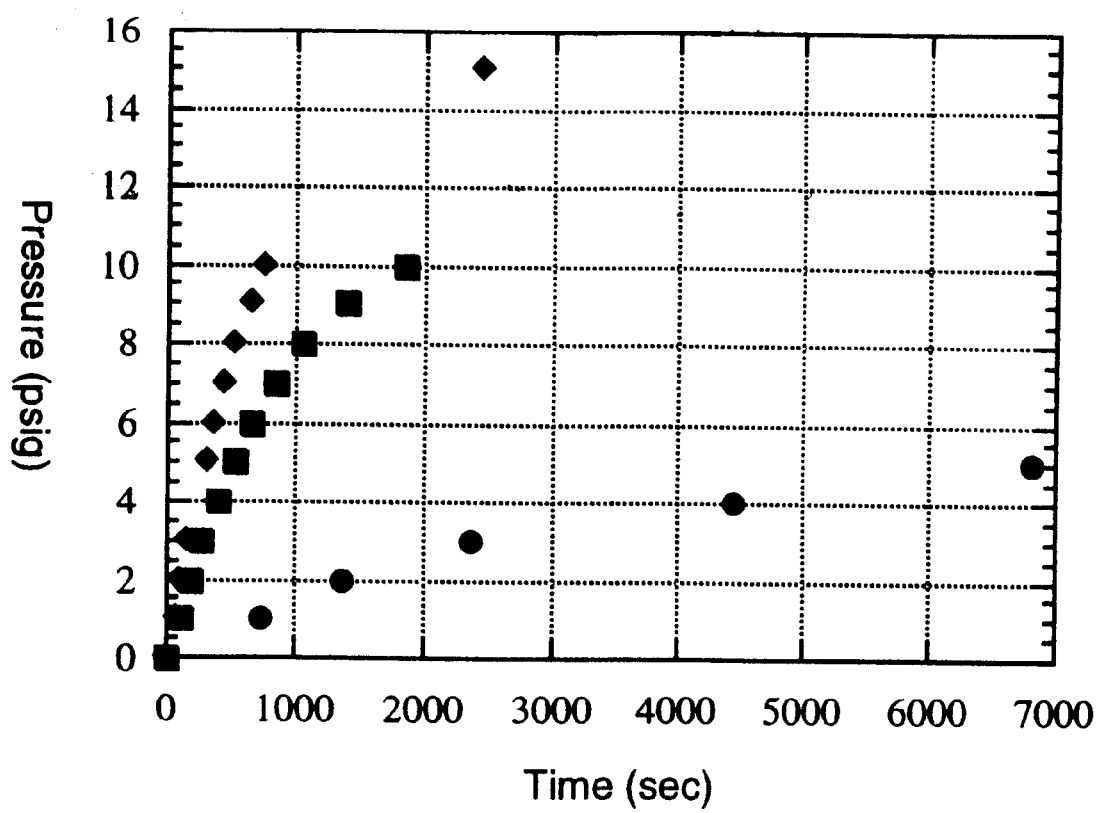
FIG. 19 is a plot of pressure vs. time for argon at various temperatures using the disk membrane module formed at 600° C. in Example 2.
Figure 20:
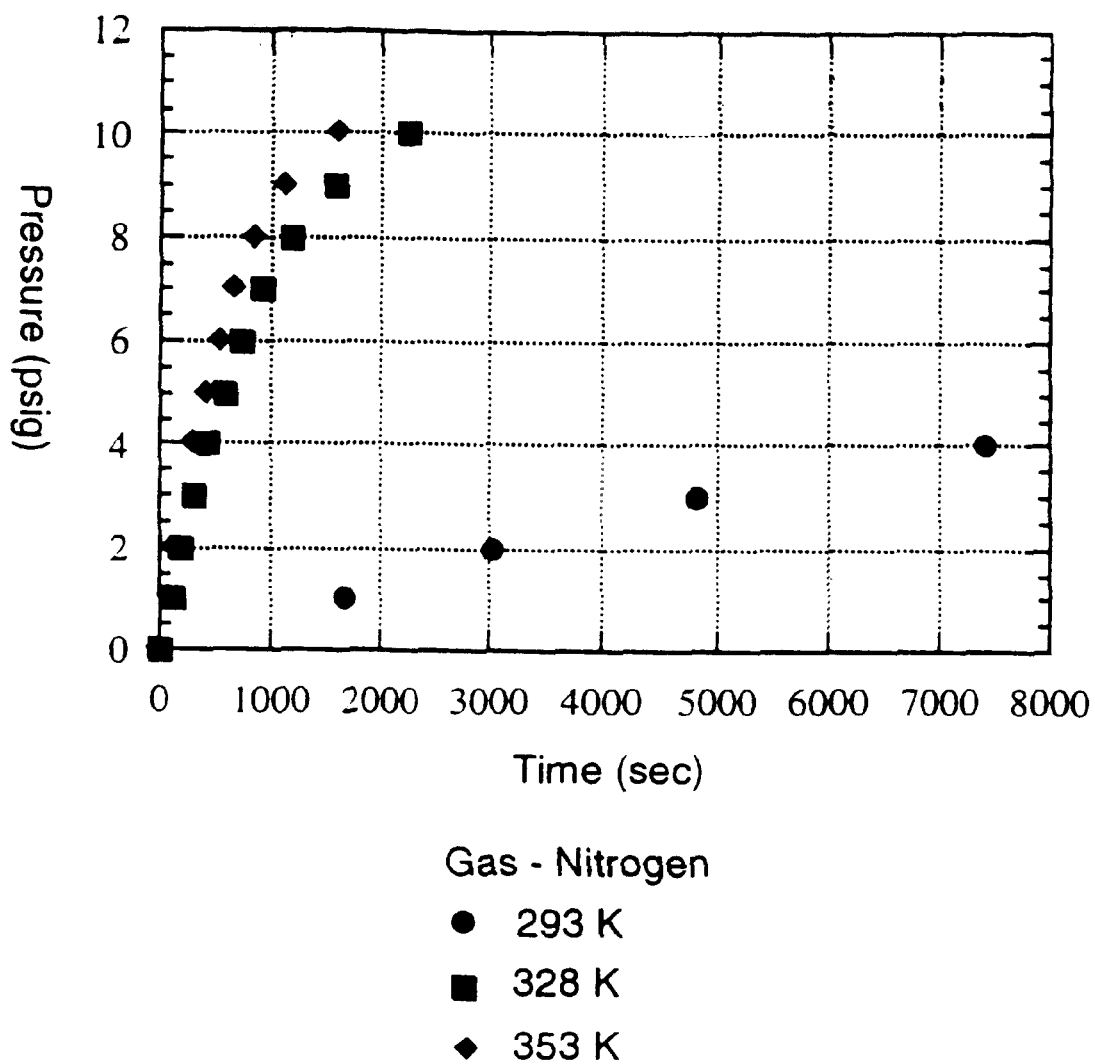
FIG. 20 is a plot of pressure vs. time for nitrogen at various temperatures using the disk membrane module formed at 600° C. in Example 2.
Figure 21:
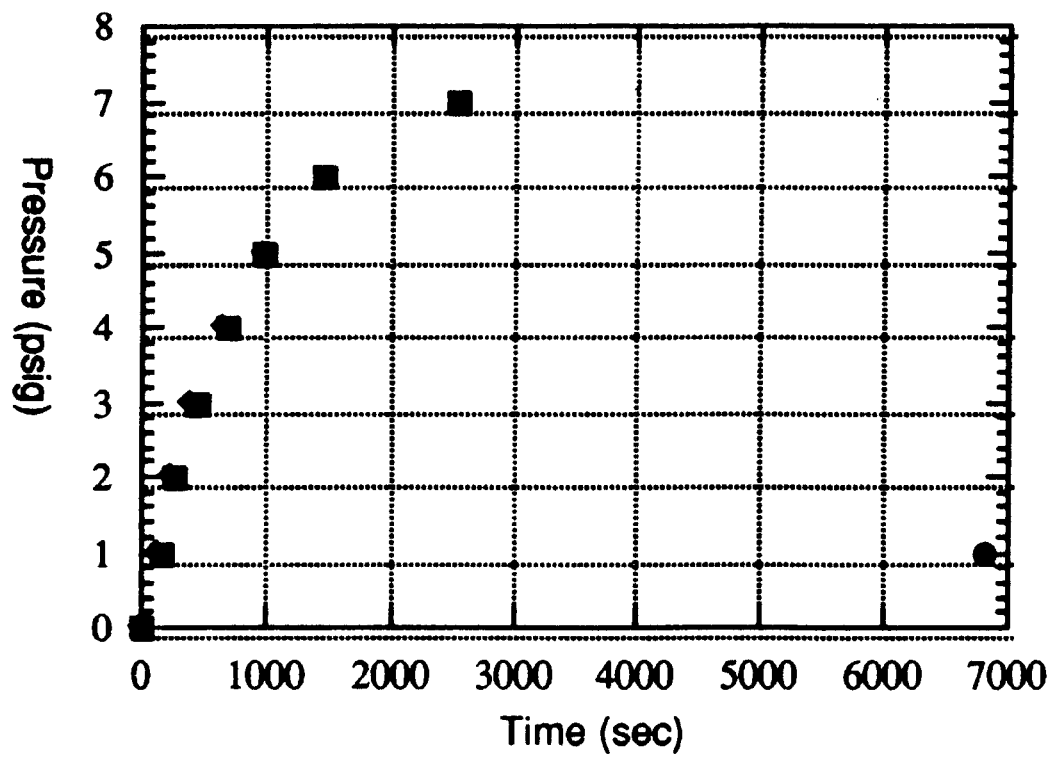
FIG. 21 is a plot of pressure vs. time for $SF_6$ at various temperatures using the disk membrane module formed at 600° C. in Example 2.

A rise time test experiment was performed on the disk supported membrane that was pyrolyzed at 600° C. (5 coats, 2 hr. soak time). A pressure gauge 39 was placed on the inlet and outlet tubes and the outlet tube was plugged. A valve was placed upstream of the inlet port to control the pressure in the module. Gas was flowed into the inlet port of the module and the pressure at the outlet port was monitored as a function of time. The results for various gases at 293 K is shown in FIG. 17. The results indicate a high degree of molecular sieving. The permeabilities were regressed from the data and the separation factors obtained are shown in Table 1.

TABLE 1

|  | Separation Factor |
| --- | --- |
| Hydrogen | 1 |
| Helium | 2.2 |
| Oxygen | 7.8 |
| Argon | 11.9 |
| Nitrogen | 27 |
| $SF_6$ | 110 |

Testing the Disk Membrane Modules—Temperature Dependent Permeability Test

The modules were the same as described above for the unsteady state test except that the module was wrapped in heating tape and then insulating tape. Two J-type thermocouples were attached to the system—one on the external surface of the module and one passing through the inlet of the flange and contacting the membrane surface. The entire module was heated to a certain temperature using a variac. During the ramp-up to the testing temperature (which was up to 1 hour in duration), helium was flowed over the surface of the membrane to prevent oxidation of the CMS material. For the testing of the gases, the helium flow was shut off and the inlet side of the membrane was filled with the probe gas at 30 psig pressure. The pressure on the outlet side of the module was then measured as a function of time.

Figure 22:
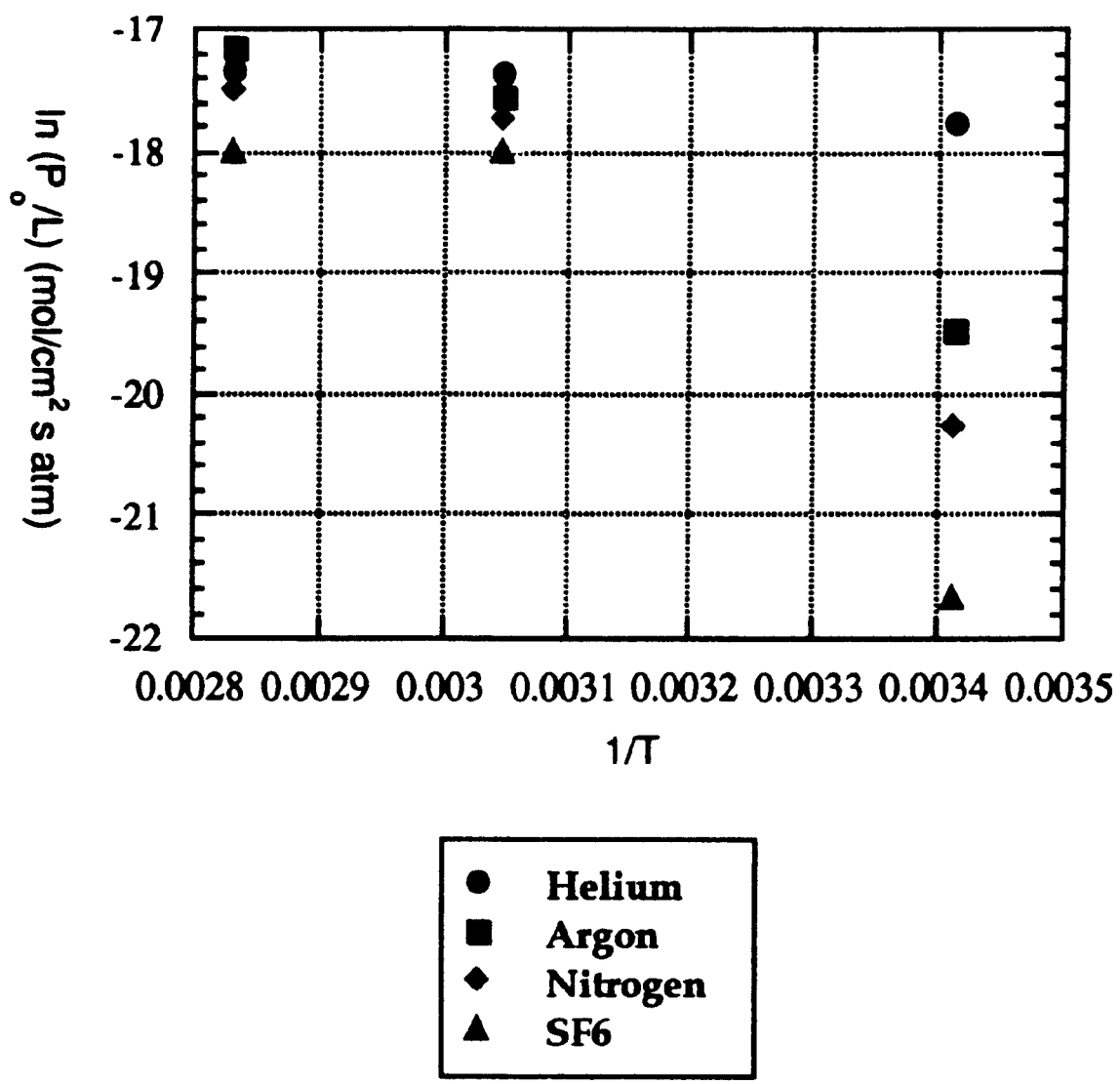
FIG. 22 is a plot of $\ln(P_o/L)$ vs. 1/T for various gases using the disk membrane module formed at 600° C. in Example 2.
Figure 23:
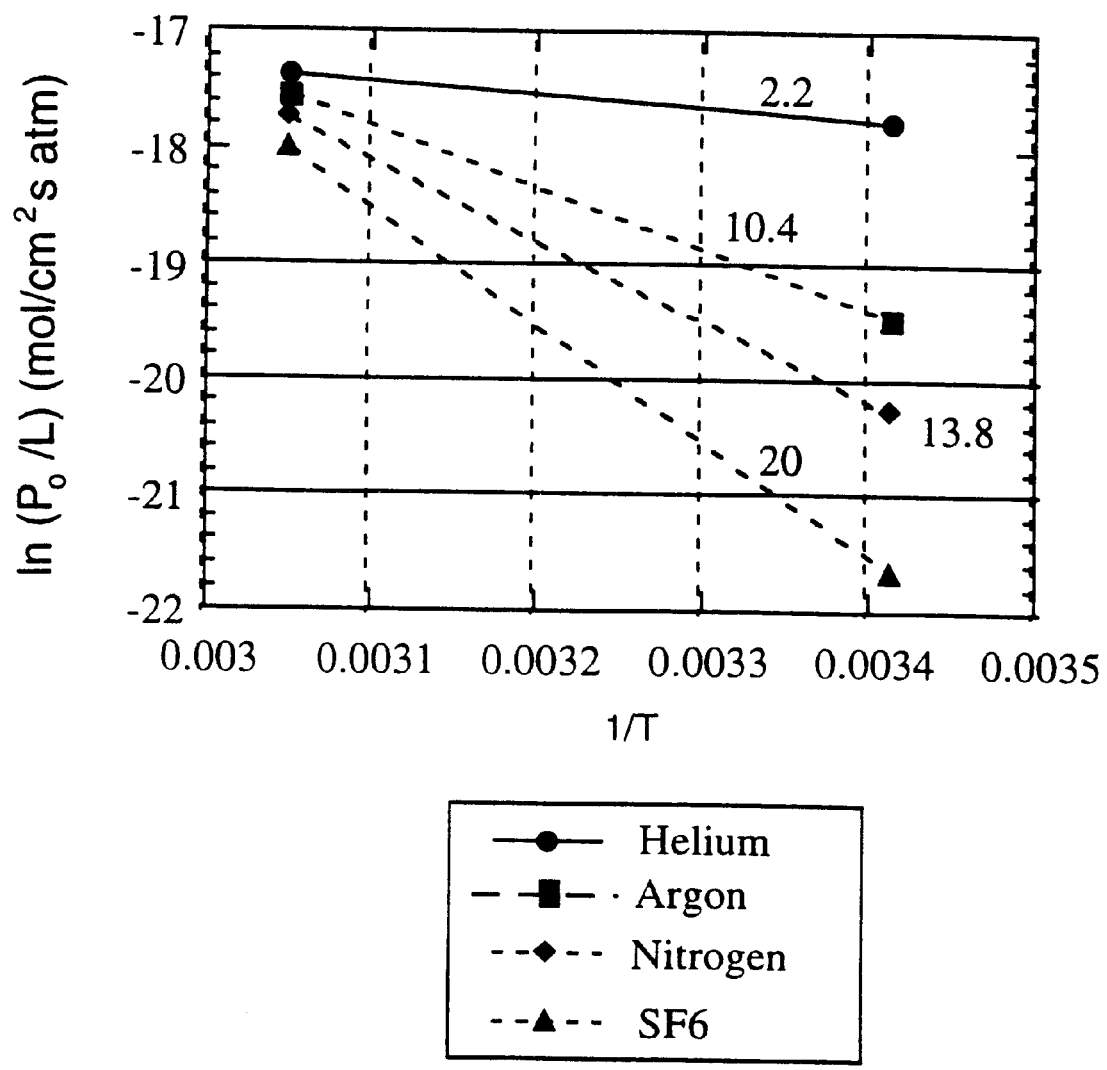
FIG. 23 is a plot of $\ln(P_o/L)$ vs. 1/T for various gases using the disk membrane module formed at 600° C. in Example 2.
Figure 24:
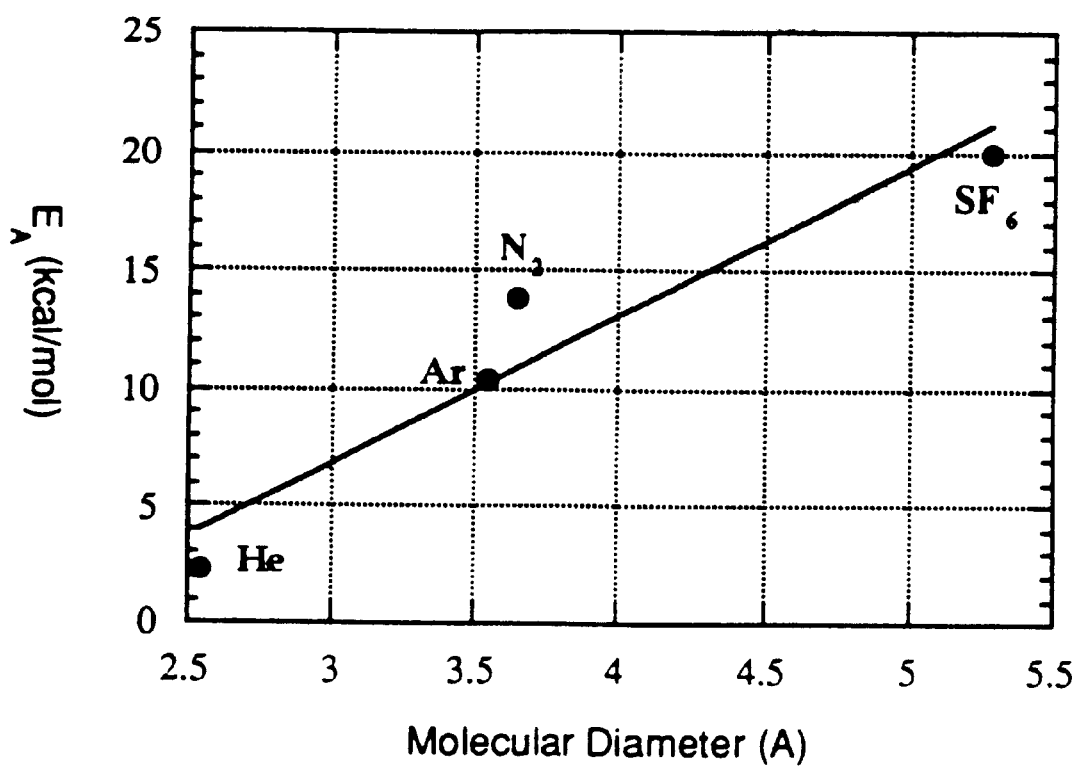
FIG. 24 is a plot of activation energy vs. molecular diameter for the gases listed in FIGS. 22 and 23.

The results for various gases are shown in FIGS. 18 through 21. The activation energies were regressed from FIGS. 22 and 23. The activation energy ($E_A$) as a function of molecular diameter is shown in FIG. 24 and conforms to the picture of micropores acting to restrict the entry of molecules into the micropores based on the size of the molecules.

EXAMPLE 3

Production of Disk Membrane

A disk-supported membrane was produced in the same manner as described in Example 2. The disk-supported membrane had 5 coatings of the furfuryl alcohol/acetone solution which were pyrolyzed at a temperature of 600° C.

Production of Disk Membrane Module

The module was produced in the same manner as in Example 2 except that the outer flanges were provided with both inlet and outlet ports so that gases could be flowed past each side of the membrane. A schematic of the setup is shown in FIG. 15 where the double sided flanges are shown as 32, the outer flanges are shown as 34, the disk-supported membrane is shown as 38, the downside inlet line is shown as 51, the downside outlet line is shown as 52, the topside inlet line is shown as 53 and the topside outlet line is shown as 54. The pressure on the topside and downside surfaces of the membrane were measured with pressure transducers 55. The downside inlet line 51 was connected to a mass flow controller 56 and an on-line gas chromatograph 57. The downside outlet line, the topside inlet line and the topside outlet line were also connected to the same on-line gas chromatograph 57. The gas chromatograph was a column packed with Molecular Sieve 45/60 (Supelco Inc., Bellefonte, Pa.) and was 5 meters long by ⅛" outer diameter. The load time for the gas chromatograph was 30 seconds. The gas chromatograph was calibrated to low concentrations of $O_2$ and $N_2$ in helium. Each of the gas stream lines was analyzed separately in the gas chromatograph after the previous gas had been purged from the chromatograph. Flowrates for each of the inlet and outlet lines were measured using bubble flowmeters (not shown in FIG. 15).

Testing the Module—Steady State Permeability of Binary Mixture of Oxygen and Nitrogen The experiments consisted of passing a mixture of oxygen and nitrogen at a constant flowrate (i.e., $N_2+O_2$ flowrate was about 0.57–0.58 cc/s) on the topside of the membrane and analyzing the composition of the permeate on the downside. A sweep of helium (helium flowrate was about 0.11–0.12 cc/s) was maintained and the pressure on the topside was varied from 2 to 6.2 atmospheres while the downside pressure was held constant at 1.06 atm.

The composition of the gas in the inlet line 53 of the topside was 46.5% oxygen and 53.5% nitrogen. The composition of the gas in the outlet line 52 of the downside was found to vary from 60 to 65% oxygen over the range of pressures used.

Figure 25:
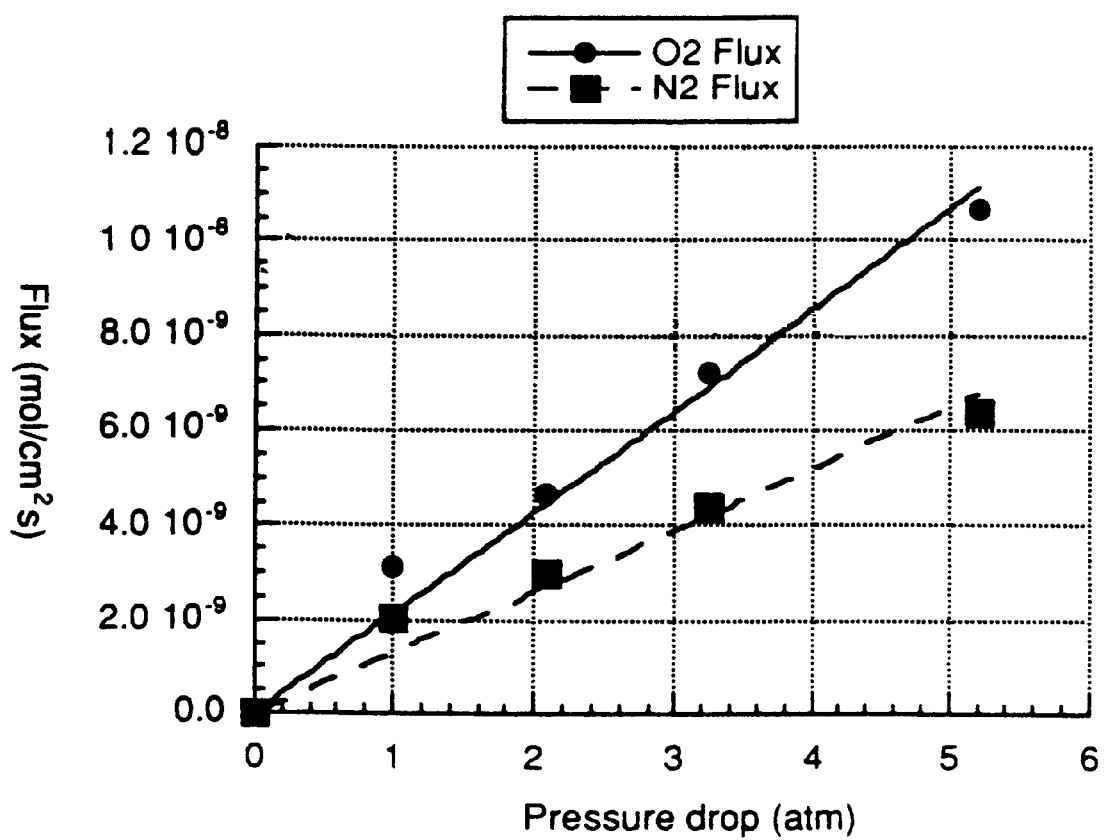
FIG. 25 is a plot of the molar flux of oxygen and nitrogen vs. the pressure drop using the disk membrane module formed in Example 3.

The molar flux of both oxygen and nitrogen was found to increase almost linearly with the pressure drop, as shown in FIG. 25. The flux was calculated from the following formula:

$J_i(\text{mol/cm}^2\text{s})$=(flowrate in downside outlet line 52 in $cc/s$–measured at atmospheric pressure)•(mole fraction of $i$ as analyzed by $GC$)•(concentration of air based on $GC$ area)/$RTA$ where $i$ refers to oxygen or nitrogen, $A$=cross-sectional area of the membrane, $$R = 82.059 \frac{\text{cm}^3 \text{atm}}{\text{mol K (proportionally constant)}}$$

and T=temperature K.

The permeability of the gases was calculated using both CSTR (continuous stirred tank reactor) and PFR (plug flow reactor) assumptions. The average composition of the inlet and outlet streams was considered in the PFR case. Due to the very small change in composition, both assumptions gave nearly identical values for the permeability. The expression for permeability is:

$P_{mi}=J_i(\text{mol/cm}^2\text{s})/$(partial pressure driving force of $i$)

Figure 26:
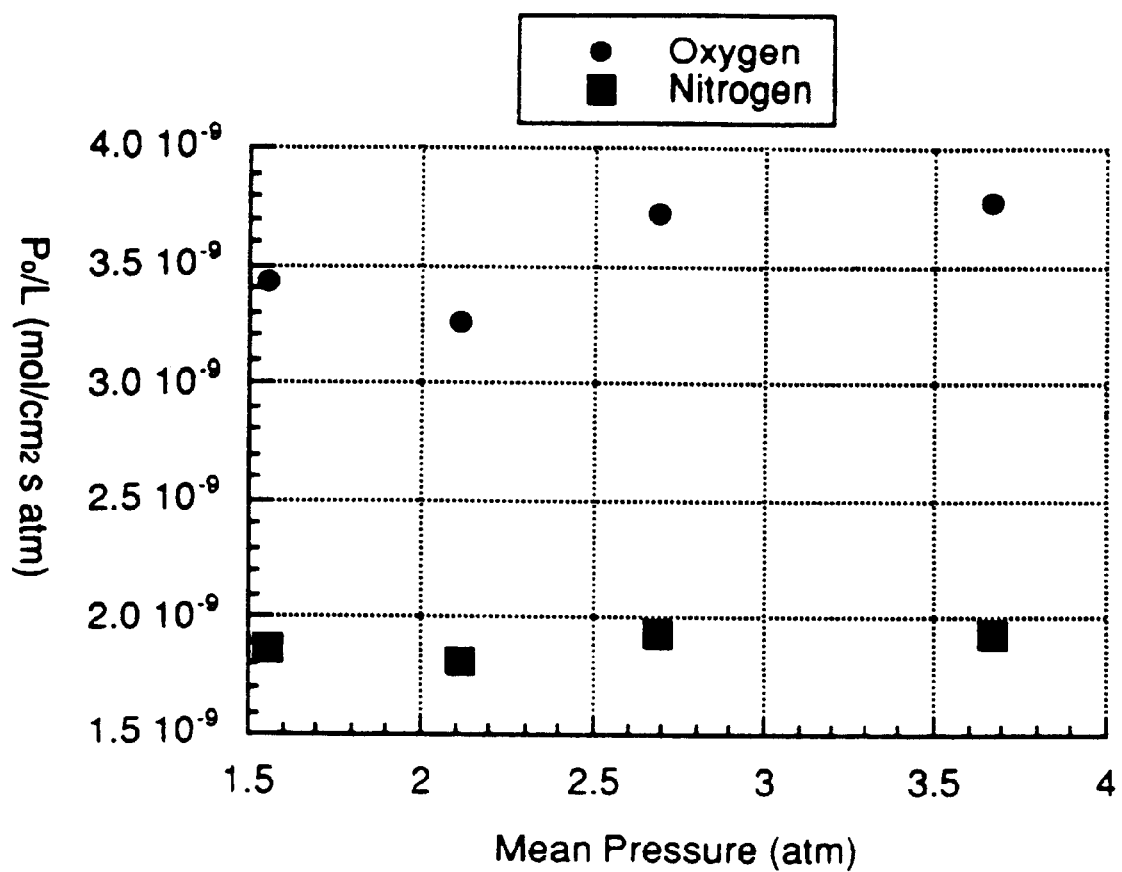
FIG. 26 is a plot of $P_o/L$ vs. mean pressure for oxygen and nitrogen using the disk membrane module formed in Example 3.

The permeability (mol/cm$^2$s atm) was nearly constant over the pressure range used, as shown in FIG. 26. The runs were carried out for up to 12 hours and the compositions and flowrates were constant. No fouling of the membrane, based on reduced separation factors, was observed.

A final experiment was performed in the absence of a helium sweep. The topside pressure was maintained at 6 atm and the flowrate on the topside of the membrane was very low (i.e., the flowrate was about 0.19 cc/s). The same composition mixture (i.e., 46.5% oxygen and 53.5% nitrogen) was fed on the topside and the downstream composition (i.e., in the outlet line 52 from the downside) was analyzed. Due to the very low flowrates, the GC load time was increased to 2 hours to obtain a meaningful analysis. The result is consistent with the experiments performed with a helium sweep. A composition of 61% oxygen was observed downstream after 22 hours.

The pressure independence of the permeabilities suggests that the membrane has very few cracks and is predominantly molecular sieving in nature. The separation factors are also independent of pressure, which is of considerable benefit, since fluxes increase at higher pressure drops.

The experiment performed in the absence of helium flow confirms that there is separation of oxygen and nitrogen and that the presence of a sweep gas does not interfere with the permeation.

The experiments described in this Example prove the effectiveness of the disk membrane in performing steady state separation of oxygen and nitrogen. The enhancement of oxygen was approximately 15–20%. The permeabilities and therefore the separation factors were constant at different pressures which is expected of a predominantly molecular sieving membrane. Despite the small difference in size of oxygen and nitrogen (0.2 Å), the membrane is able to block out nitrogen over a long period of time (up to 12 hours) thus indicating shape selective sieving.

EXAMPLE 4

Disk Shaped Platinum Containing Catalytic Membranes Membrane Synthesis

Disk shaped, catalytic membranes were prepared using a sintered metal 316 stainless steel support obtained from Mott Metallurgical Corp. (Mott Catalog Number 11005-1.875-0.039-0.2.) These supports were 1.875 in. in diameter and 0.039 in. in thickness. They possessed an average pore size of about 0.2 $\mu$m. Furfuryl alcohol resin (Monomer Polymer & Dajac Laboratories Inc., Lot A-1-143), was added to an equal amount by weight of an acetone solution containing 0.096% Pt (II) acetylacetonate ($Pt(C_5H_7O_2)_2$) (97% purity; Strem Chemicals.) The viscosity of this solution was observed to be stable at room temperature and could be stored and transported without significant cross-linking of the furfuryl alcohol resin.

Figure 27:
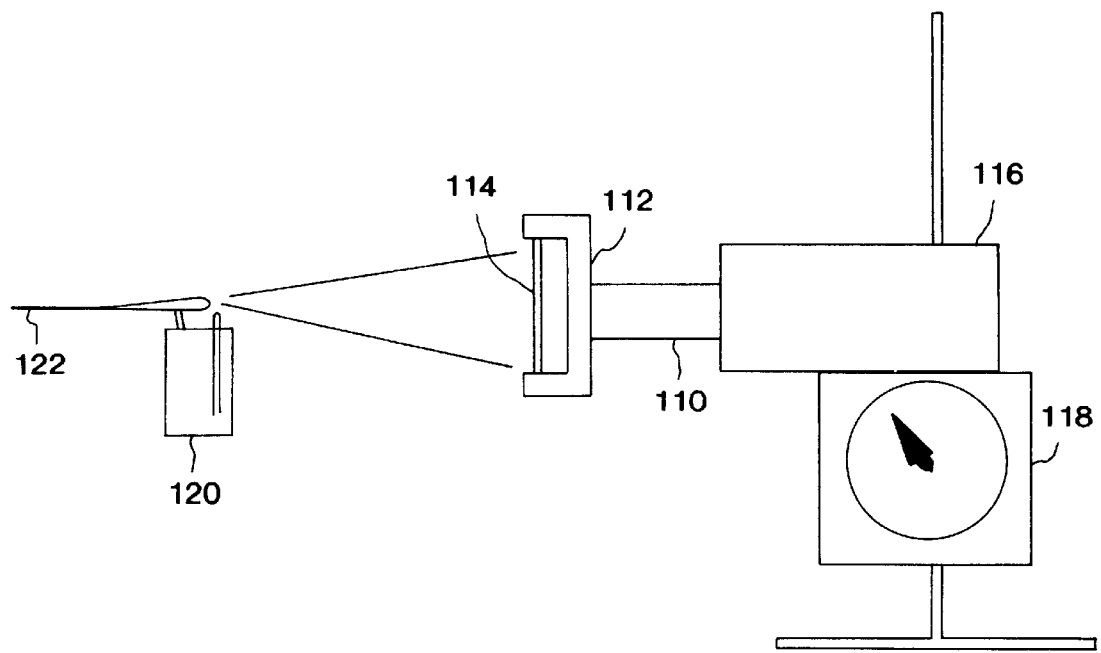
FIG. 27 is a diagram of the spray coating setup for disk shaped membranes formed in Examples 4 and 5.

The disk-shaped support 114 was attached to a motorized shaft 110 with an adjustable clamp 112 that fixed the disk shaped support in place vertically as shown in FIG. 27. The clamp 112 did not touch the external, flat surfaces of the supports and held only the outer edges. A motor 116 rotates the assembly, with the rotational speed controlled by a rpm controller 118. The rotation speed was set to 120 rpm.

The solution consisting of furfuryl alcohol resin/acetone/Pt (II) acetylacetonate was placed in a conventional spray gun 120 attached to an argon gas line 122 at 60 psig. This solution was sprayed on the rotating support and then allowed to dry until most of the acetone flashed off. This coating process deposited approximately 40 mg of the furfuryl alcohol resin/Pt (II) acetylacetonate solution.

The resulting coated support was subsequently pyrolyzed as described in Foley et al. U.S. patent application Ser. No. 08/671,698 (U.S. Pat. No. 5,972,079). Specifically, the coated support was placed in a furnace at ambient temperature, a stream of flowing He was introduced into the furnace and the temperature in the furnace was then ramped to 500° C. at a rate of 5° C. /min. The temperature in the furnace was held at 500° C. for 2 hours and then the furnace was allowed to cool to room temperature. The Helium gas stream was maintained in the furnace as it cooled to ambient temperature.

The coating and deposition process described above was repeated 3 times until a mass of 120 mg of nanoporous carbon of the desired thickness was obtained on the support as measured experimentally (see below in Effective Membrane Thickness section). Table 2 summarizes the typical parameters for the support and resulting carbon membrane.

TABLE 2

Membrane and Support Parameters

| | Support | |
|---|---|---|
| Material | 316 | Stainless Steel |
| External area | 11.4 | cm2 |
| Mean pore size | 0.2 | $\mu$m |
| Thickness | 0.8 | mm |
| Porosity | 0.6 | m$^3$ void/m$^3$ support |

TABLE 2-continued

Membrane and Support Parameters

| Membrane | | |
|---|---|---|
| Thickness | 12.5 | μm |
| Deposition mass | 5 | mg carbon/cm³ |
| Number of coats | 3 | coats |
| Catalytic loadings | 0.148 | % Pt/C |
| Density of carbon | 1.6 | g/cm³ |
| Synthesis temperature | 500 | ° C. |
| Soak time | 2 | hours |
| Heating ramp rate | 5 | ° C./min |
| He purge flow rate | 50 | sccm |

Previous methods of preparing metal on NPC aggregate (non-membrane) catalyst appearing in the literature were not directly adaptable to thin film formation. Aside from an inability to solublize furfuryl alcohol resin, Pt on nanoporous carbon precursors derived from chloroplatinic acid lead to viscous instability since the polymerization of furfuryl alcohol is known to be acid catalyzed. See Schmitt, J. L. and P. L. Walker (1971), *Carbon Molecular Sieve Supports for Metal Catalysts—I. Preparation of the System—Platinum Supported on Polyfurfuryl Alcohol Carbon, Carbon*, 9: 791–796.; Trimm, D. L. and B. J. Cooper (1973), *Propylene Hydrogenation over Platinum/Carbon Molecular Sieve Catalysts*, Journal of Catalysis, 31: 287–292. Similarly, direct contacting of particulate matter to the NPC precursor such as solid metal oxides on the micron length scale naturally leads to film defects as the membrane thickness is expected to be commensurate with this length scale. See e.g. Tachibana, M. (1990), *Porous, metal-containing carbonaceous material*, U.S. Pat. No. 4,970,189. By using a metal precursor that is soluble in a NPC polymeric precursor (such as PFA) co-solvent system, these disadvantages are avoided.

Physical Characterization

Scanning Electron Microscopy

Membrane cross sections were cut orthogonal to the carbon layer using a diamond-wafering saw. These sections were mounted in an epoxy resin, polished, and given a coating of Au for imaging with a Hitachi S-4000 field emission scanning electron microscope. Imaging and EDAX were performed on areas of this cross section external to and within the macroporosity of the stainless steel support and at various radii from the center of the disk shaped membranes.

Figure 28A:
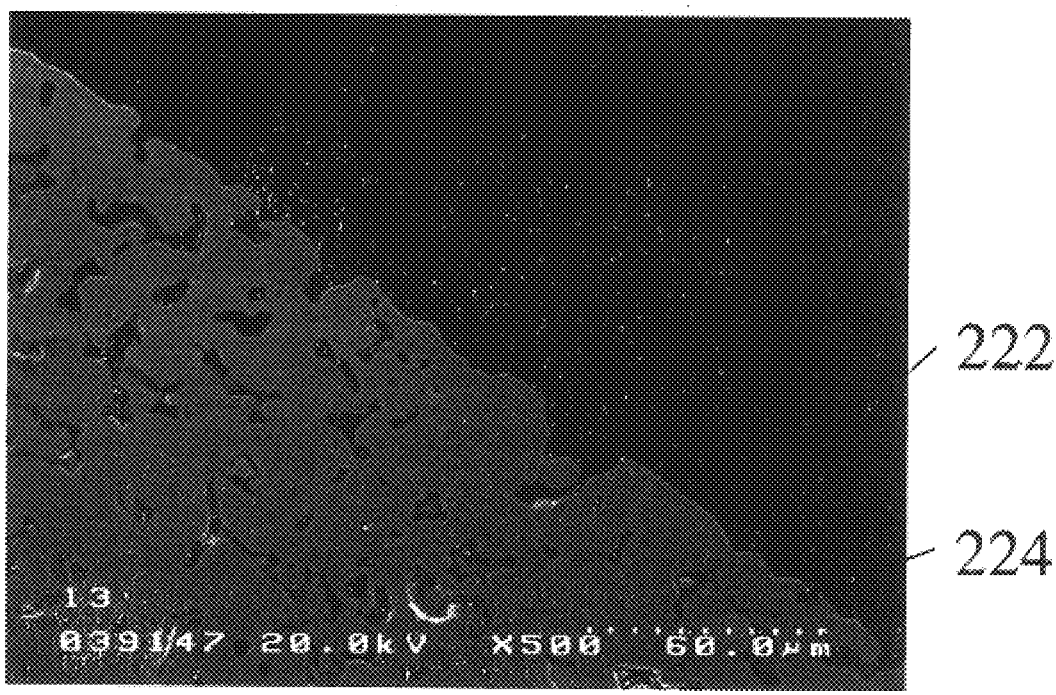
FIG. 28A is a SEM micrograph of a membrane cross section showing the membrane 22 on the macroporous support 24.
Figure 28B:
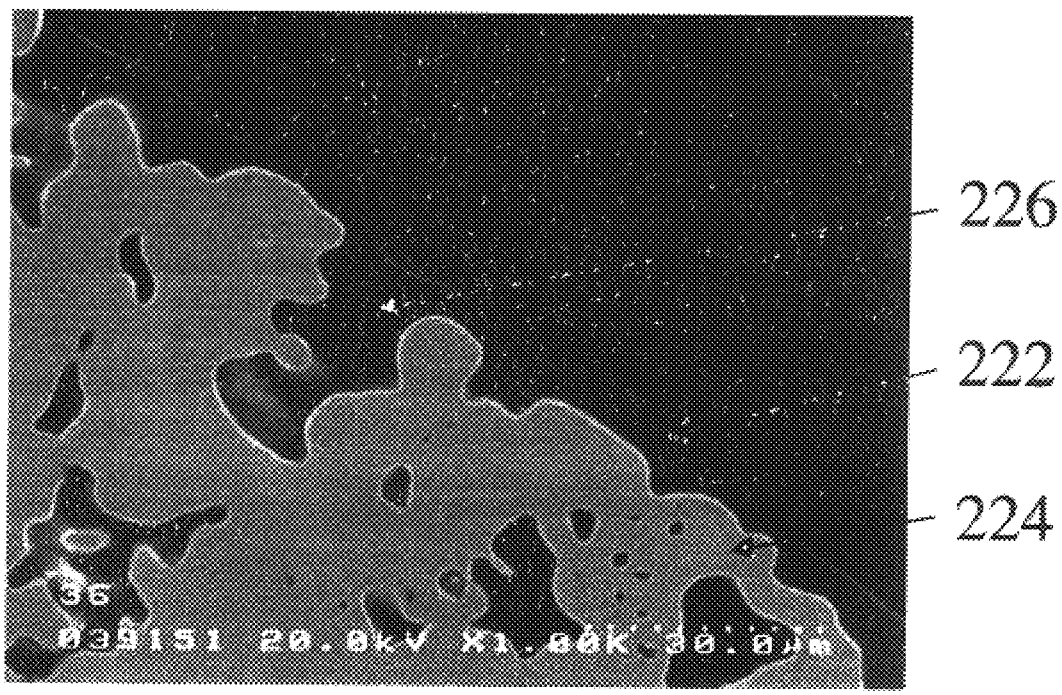
FIG. 28B is a SEM micrograph of a membrane cross section showing membrane 22 penetration into the macroporous, stainless steel support 24, with penetration into the macropores 26.

FIGS. 28A and 28B are scanning electron micrographs of a catalytic membrane cross section prepared as described above. The spray-coating methodology described above yields a fairly uniform surface coating 222 of carbon upon the support 224. FIG. 28B reveals that the carbon membrane film 222 extends into the macroporosity 226 of the stainless steel support 224 to a significant extent. The effective thickness of the selective layer cannot be determined by microscopic methods alone and a phenomenological definition has been shown to be more appropriate (see below).

Transmission Electron Microscopy

Aggregate Pt on carbon samples were also prepared by pyrolyzing the catalytic precursor in the absence of the stainless steel support and divided to ¹⁴⁰/₂₃₀ mesh. These granular samples were suspended in ethanol and deposited on TEM backings for imaging after evaporation of the solvent to more effectively determine metal size distributions.

Figure 29:
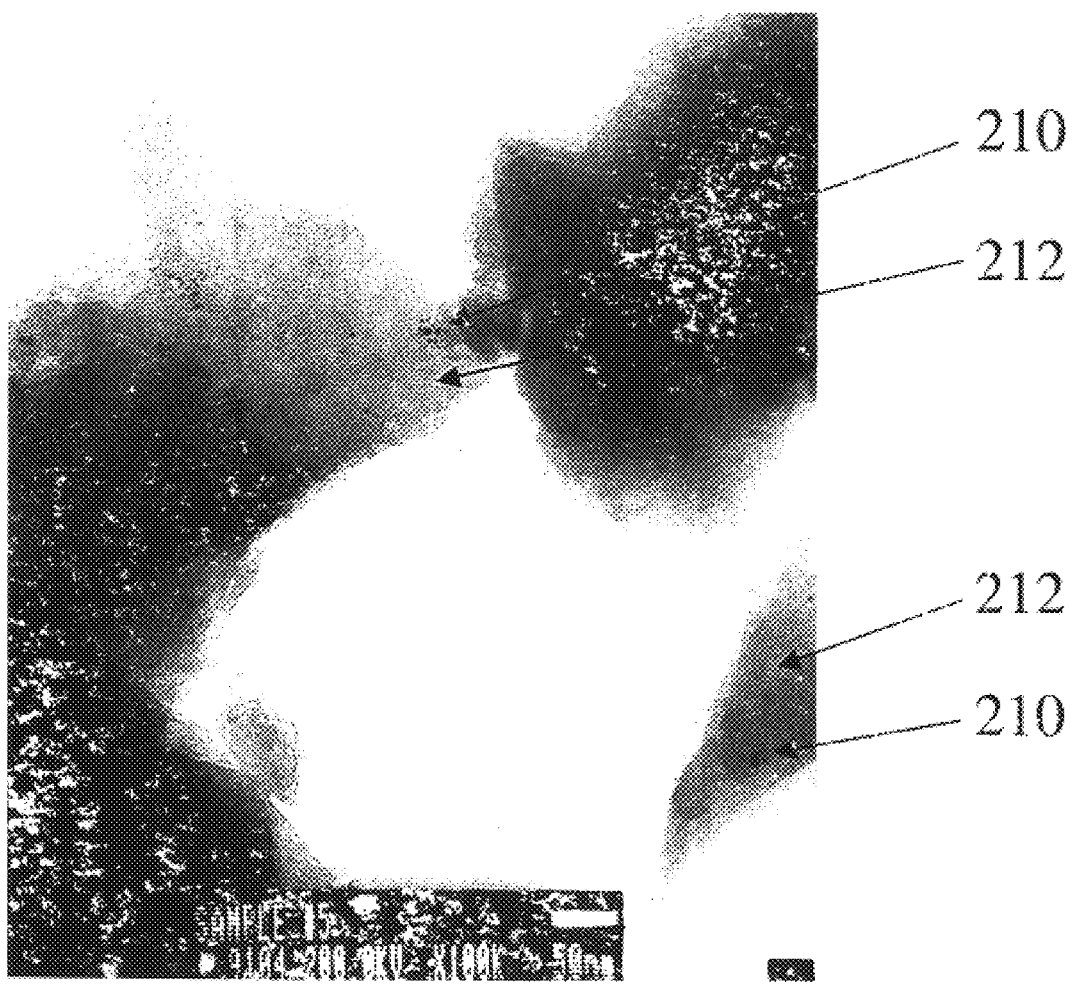
FIG. 29 is a TEM micrograph of the Pt/nanoporous carbon membrane material from Example 4 showing the dispersion of the catalytic Pt 10, within the NPC carbon matrix 12.
Figure 30:
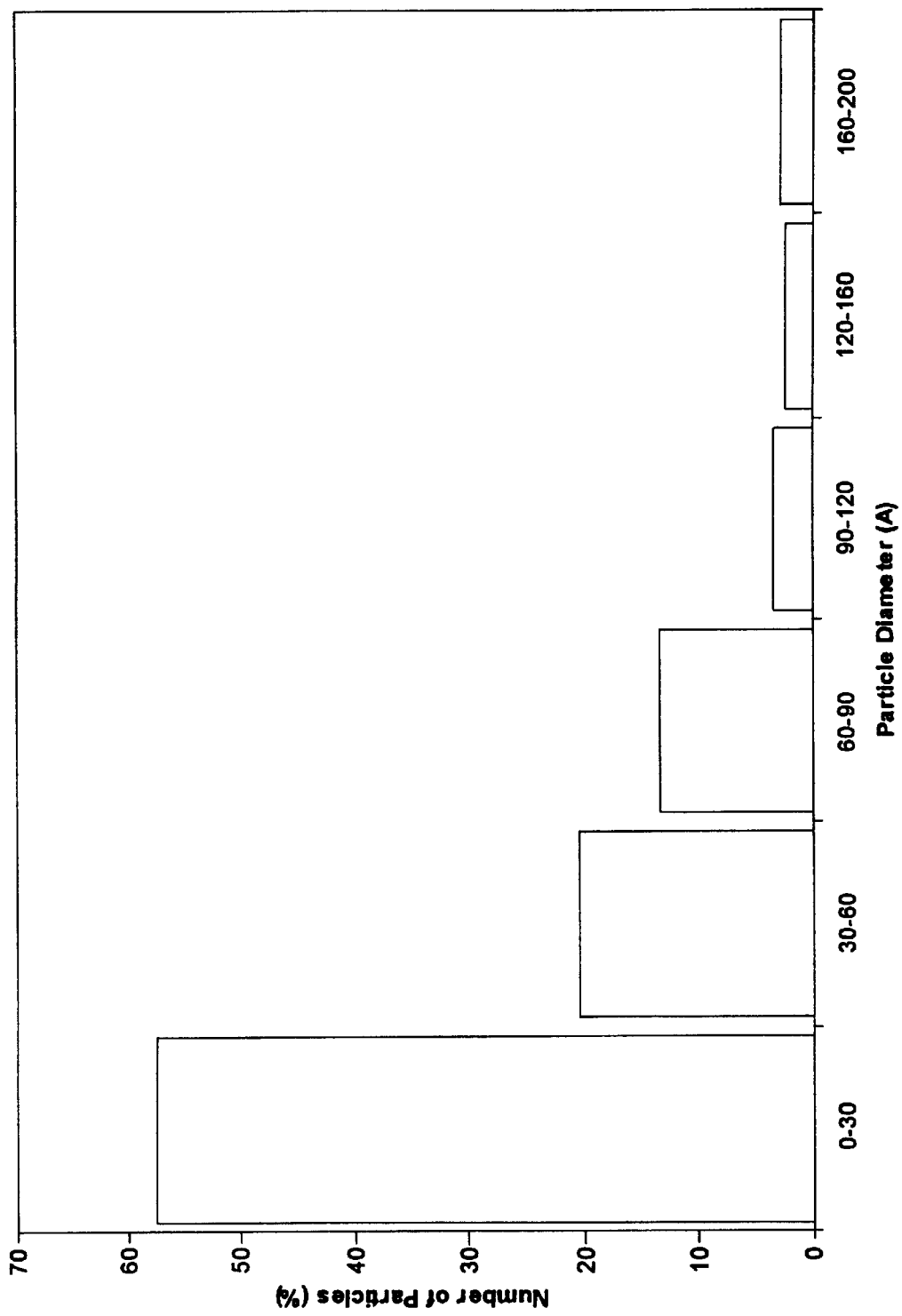
FIG. 30 is a histogram of catalytic Pt particle size distribution within the nanoporous carbon membrane from Example 4, the data obtained from a series of TEM images.

FIG. 29 is a transmission electron micrograph of the unsupported catalytic membrane material. The Pt metal particles 210, having diameters less than 10 nm, are visible within the carbon support 212 as indicated. A histogram of metal diameters was obtained from a series of such micrographs. The results obtained with a sampling of 200 particles are displayed in FIG. 30. The vertical axis represents the percentage of the 200 particles measured that fall within the size categories indicated on the horizontal axis. From left to right, particles having a measured diameter from 0 to 30 Å are shown in the first column. The second column shows the percentage of the 200 measured particles with diameters from 30 to 60 Å. The third column shows the percentage of measured particles with diameters from 60 to 90 Å. The fourth column shows the percentage of the 200 measured particles with diameters from 90 to 120 Å. The fifth column shows the percentage of the 200 measured particles from 120 to 160 Å. The last column shows the percentage of the 200 measured particles from 160 to 200 Å. From FIG. 30, it can be observed that the invention has a majority of the catalytic metal particles dispersed within the NPC membrane between 0 to 30 Å.

Defining a volume averaged mean diameter where n, and d, are the number and diameter of each particle in the sample set:

$$d_{vol} = \frac{\sum_i n_i d_i^3}{\sum_i n_i d_i^2} \qquad (1)$$

yields a volume-averaged mean catalytic metal particle diameter of 7.1 nm. As the number of measured particles is rather low, the calculated $d_{vol}$ yields only a rough indication of the actual mean particle size. The unweighted average of the distribution shown in FIG. 30 was calculated as 3.0 nm. The measured dispersion using the synthesis methodology above was observed to be consistently higher than that measured for a Pt/NPC material derived from $H_2PtCl_6$. Lafyatis measured an average Pt particle size of approximately 4.6 nm (unweighted average). Pt (II) acetylacetonate, being soluble in the PFA co-solvent, apparently does not agglomerate to the extent that the $H_2PtCl_6$ does, possibly because of the absence of the aqueous phase. See Lafyatis, D. S. (1992), *The Design and Synthesis of Carbon Molecular Sieve Catalysts for Shape Selective Catalysis*, Ph.D. Thesis, Department of Chemical Engineering, University of Delaware: 113–141. Although Reyes and co-workers studied a fundamentally different synthesis technique, they observed similar Pt precursor effects in the synthesis of Pt on alumina catalysts. See Reyes, P., M. Oportus, et al. (996), *Influence of the nature of platinum precursor on the surface properties and catalytic activity of alumina-supported catalysts*, Catalysis Letters 37: 193–197.

Molecular Probe Transport

Transport of $H_2$, He, $N_2$, and $O_2$ was used to characterize the selective porosity and integrity of carbon film. In FIG. 15, the disk shaped membrane 38 was sealed using Viton™ gaskets into a stainless steel module, comprising a pair of outer single-sided flanges 34 and a pair of double-sided inner flanges 32. This set up was used to measure the transport of a single gas through the membrane. At a time t=0, the probe gas is introduced to the top of an initially evacuated membrane at a pressure $p_o$. The permeate volume bounding the bottom of the membrane is sealed from vacuum at this time and the subsequent rise in pressure is used to evaluate the instantaneous derivative of the time dependent flux through the membrane:

$$\frac{V_{pc}}{RT}(P(t) - P_{init}) = A \int_0^t N(t') dt' \quad (2)$$

where $V_{pc}$ is the volume of the permeate chamber, $P_{init}$ is the initial pressure in the chamber at t=0, and A is the area of the membrane. This pressure is measured using an MKS Baratron pressure transducer 55 with 0–1000 torr range and recorded using an interfaced PC which also controls the start and duration of the experiment via electronically actuated solenoid valves (not shown). If the pressure rise in this volume is not permitted to exceed a minimum valves the driving force across the membrane is essentially equal to the pressure loading. In this way, the steady state flux of the molecular probe can be measured as a function of the driving force pressure, $P_o$.

Figure 31:
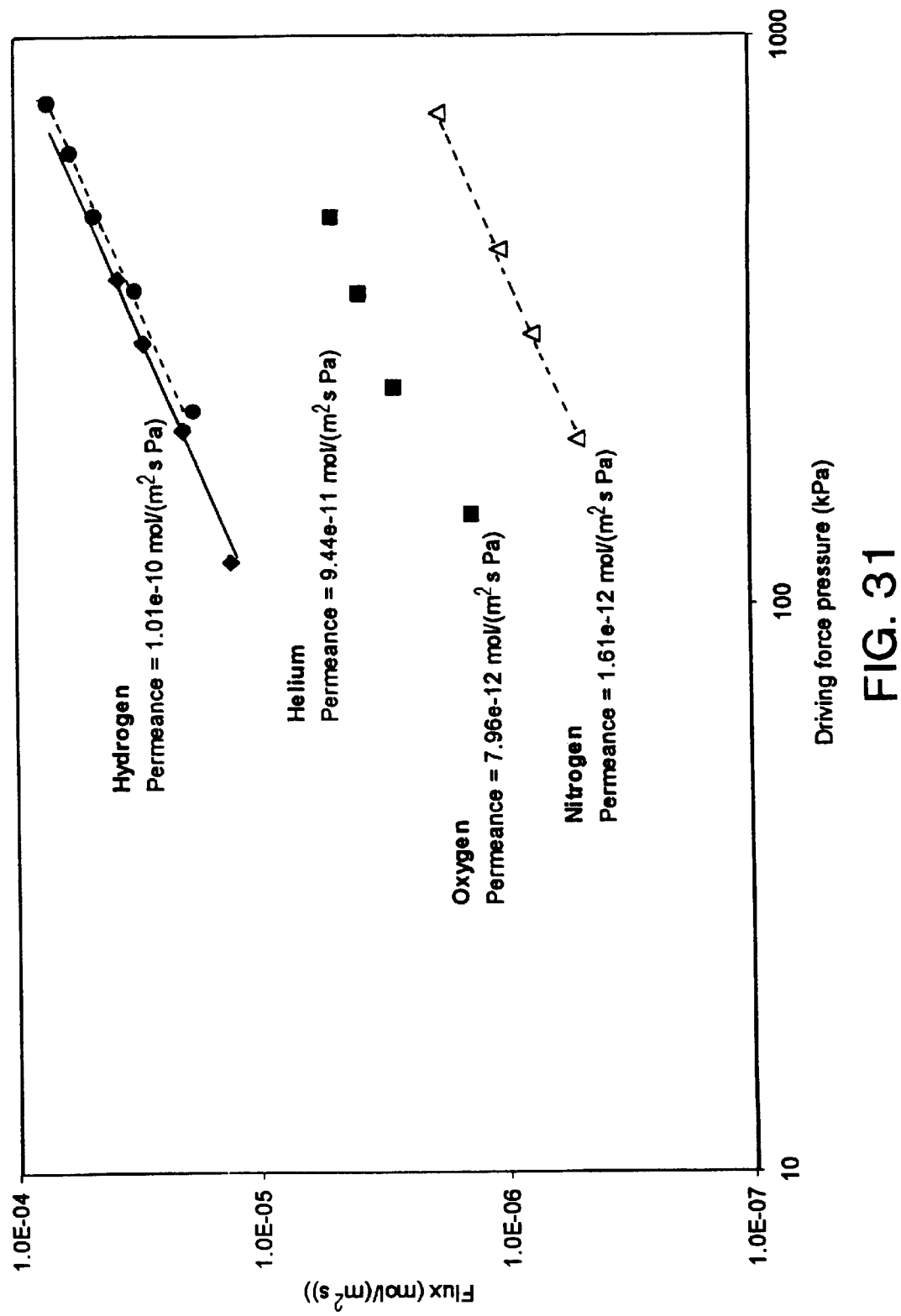
FIG. 31 is a plot of the steady state flux versus the driving force pressure for various molecular probes through the Pt/nanoporous carbon membrane from Example 4.

FIG. 31 presents the steady state fluxes versus driving force pressure across a catalytic membrane for $H_2$, He, $O_2$, and $N_2$. The linearity observed as well as the high ideal separation factors (calculated as the ratio of slopes) indicate that the membranes are defect free. Defects or surface cracks that span the thickness of the active layer reduce separation factors significantly and create a quadratic dependence of the flux versus pressure typical of viscous flow. As with their inert analogs, there is strong evidence of shape selective transport as the separation factors for these molecular probes are quite high (He—$N_2$=58.6; $O_2$—$N_2$=4.9) despite minimal differences in the kinetic diameter of the molecular probes.

Effective Membrane Thickness

The membrane layer exists partially external to and within the macroporosity of the stainless steel support and hence, has an effective thickness that cannot be determined directly through microscopy. As with other supported nanoporous membranes, the membrane/support interface is typically dominated by cracks and irregularities (see for example Yamamoto, M., K. Kusakabe, et al. (1997), *Carbon molecular sieve membrane formed by oxidative carbonization of a copolyimide film coated on a porous support tube*, Journal of Membrane Science, 133(2): 195–205; and van de Graaf, J. M., F. Kapteijn, et al. (1999), *Permeation of weakly adsorbing components through a silicalite-1 membrane*, Chemical Engineering Science, 54(8): 1081–1092. A phenomenological, effective thickness of the membrane layer can be measured using the method of Strano and Foley, see Strano, M. S. and Foley, H. C. (1999), *Deconvolution of Permeance in Supported Nanoporous Membranes*, AIChE Journal (in press). Assuming helium above 101 kPa and 298.15 K to be essentially non-adsorbing upon the nanoporosity of the membrane, the transient response of the permeate flux to a step change in He pressure loading can be used to calculate the effective thickness, δ, via:

$$\delta = \frac{6 N_{ss} \tau RT}{p_o} \quad (3)$$

Here $N_{ss}$ is the steady state flux of He through the membrane at a driving force pressure of $p_o$ and τ is the extrapolated time axis intercept of the transient integral molar flux at steady state. This thickness has been observed to be pressure independent and typically less than ⅓ of the thickness calculated from the mass deposition of carbon due to cracks. See Strano (1999). Using He permeation at 298 K, an average value of 8.2 s was measured for the time intercept at 561, 350 and 740 kPa driving forces and 1.01e–10 mol/m²/s for the He permeance. This corresponds to an effective thickness of about 12.5 μm using Equation 3 above.

Catalytic Testing

Selective hydrogenation of olefins has been used by several authors to characterize the shape selective catalytic behavior of metal on NPC catalysis.

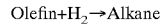

Figure 32:
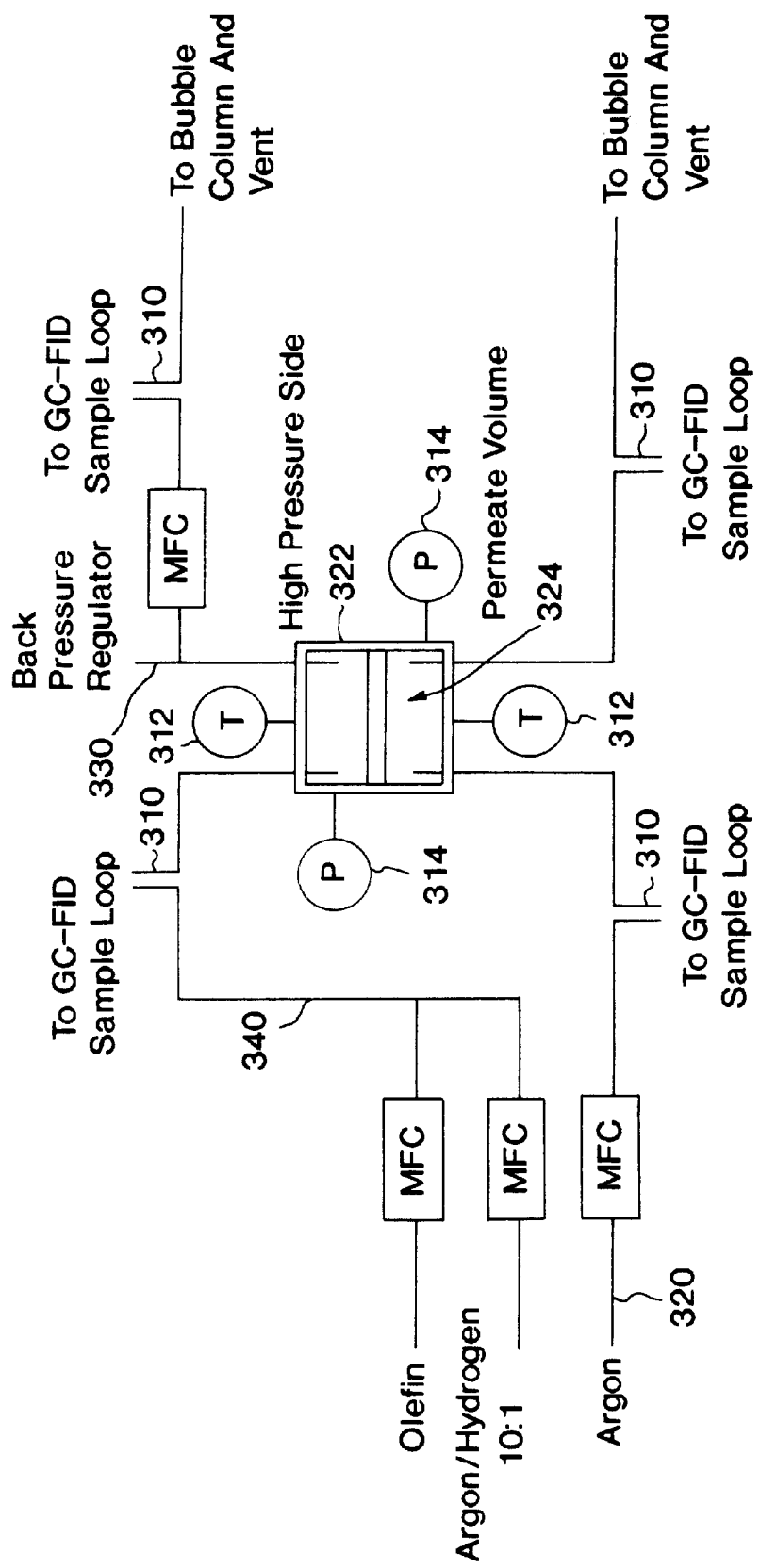
FIG. 32 is a diagram of the reactor used to selectively hydrogenate mono-olefins using the catalytic membrane from Example 4.

FIG. 32 is a diagram of the experimental setup used to benchmark the catalytic membranes using this particular reaction system. A feed stream 340 containing 100:10:1 mixture of argon:hydrogen:olefin was fed to the high-pressure side of the membrane 322 while an argon sweep 320 carried the permeate fluxes (z=δ) from the temperature and back pressure-controlled permeate volume 324 of the reactor. Back pressure was controlled using a back-pressure regulator 330. Temperature on both sides of the membrane was measured by thermocouples 312 and pressure measured with transducers 314. The use of an argon diluent in the feed and as a sweep gas suppresses its driving force across the membrane and hence allows the total flux through the membrane to be dominated by only the species of interest for dilute reactants and products. All streams entering and exiting the reactor module could be sampled using a Varian 3700 Gas Chromatograph with an FID detector and a 23% SP-1700 on 80/100 Chromosorb P AW column (310). The conversion can be defined as:

$$x_{olefin} = \frac{A_{alkane} R_{alkane}}{A_{alkane} R_{alkane} + A_{olefin} R_{olefin}} \quad (4)$$

where A and R are the measured area and response factor of the species indicated exiting the reactor in the permeate sweep.

The catalytic membrane was initially reduced in a flowing stream of an 80 sccm argon/hydrogen mixture (10:1) at 200 C. for 12 hours. The catalytic activity of the membrane was stable and constant with respect to increasing reduction time for exposure times much less than 12 hours. This extended treatment had the additional advantage of purging the membrane of any adsorbed hydrocarbons trapped within the porosity of the membrane in between hydrogenation runs.

Hydrocarbons strongly adsorb onto NPC carbon and display transport that is strongly temperature dependent. Generally, the Fickian diffusivity of strongly adsorbing species decreases to a minimum in the limit of an infinitely dilute adsorbed phase loading. This non-linearity in the transport creates a time scale of steady state through the membrane that is on the order of 8–32 hours for the olefins and conditions considered in this work.

Using a pulse injection batch reactor, Trimm and Cooper have observed that temperatures in excess of 600 C. are required to desorb residual hydrocarbons completely from Pt on NPC catalysts. See Trimm, D. L. and B. J. Cooper (1973), *Propylene Hydrogenation over Platinum/Carbon Molecular Sieve Catalysts*, Journal of Catalysis, 31: 287–292. Using the method described above for purging the NPC membrane coupled with the exaggerated time scale for steady state to be attained, essentially no hysterisis was observed in the generation of conversion data with increasing and decreasing temperature and reproducibility was within acceptable limits. The background activity of the stainless steel support, which is comprised of Fe among other catalytically-active metals, was checked using a non-catalytic NPC membrane exposed to similar reactive conditions. It was concluded that the relative active surface areas of these metals were negligible compared to the Pt within the NPC layer.

Figure 33:
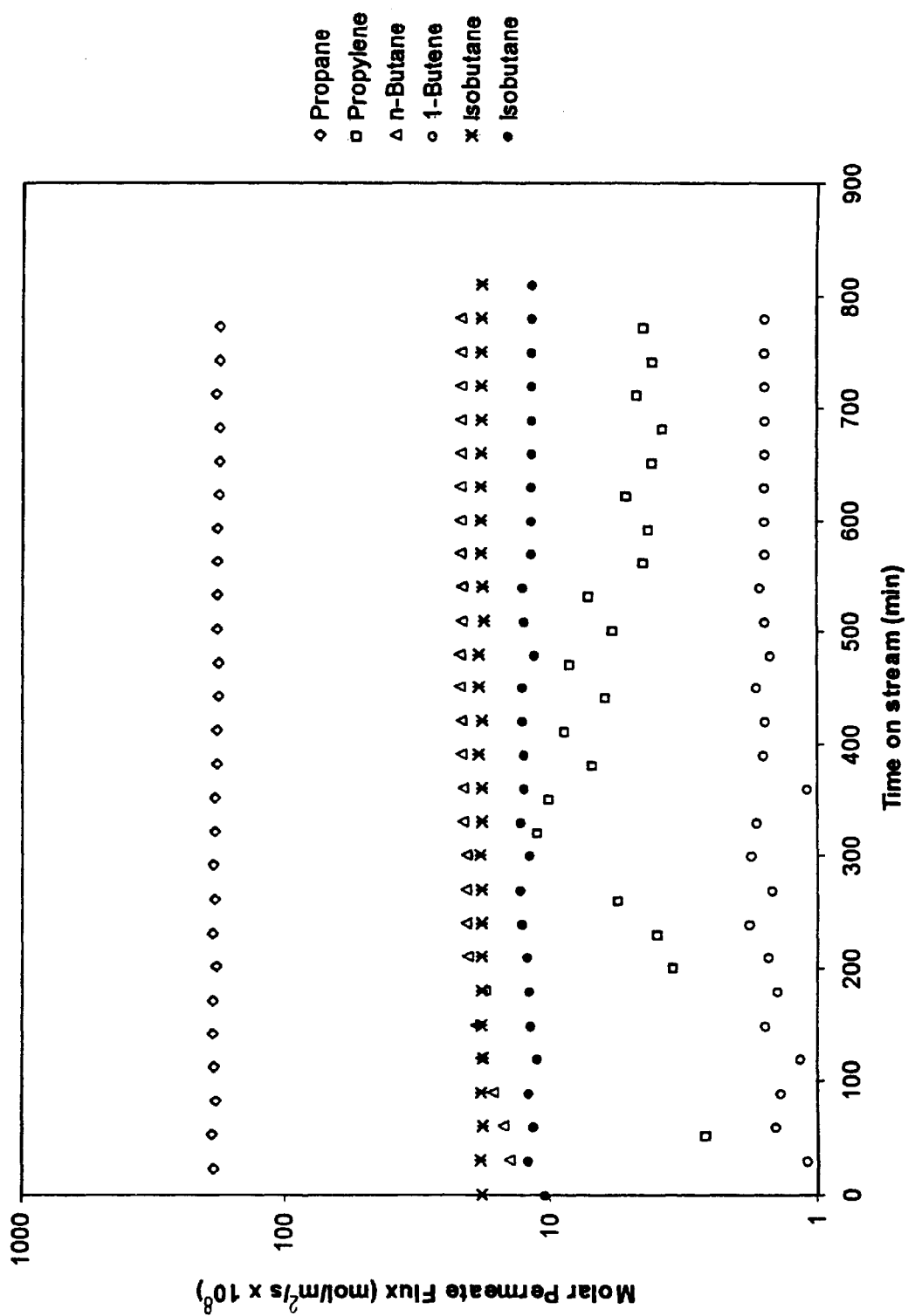
FIG. 33 is a plot of the time on stream permeate fluxes for $C_3$ and $C_4$ olefins and product alkanes showing the stable catalytic activity of the membrane produced in Example 4.

FIG. 33 presents the time on stream behavior of the catalytic membrane permeate fluxes after achieving steady state conditions at 125 C. and 102 kPa total pressure. Propane is the favored hydrogenation product with almost complete conversion and a selectivity ratio of 28.9:3.2:1 for propane: n-butane: isobutane. This Figure confirms the absence of irreversible membrane fouling or catalyst deactivation over a time scale of 800 minutes. The same conclusion was reached for all data points over the temperature range tested. The variability in the propylene and 1-butene permeate fluxes is attributed only to detector noise as conversions for these two reactants were exceedingly high.

Figure 34:
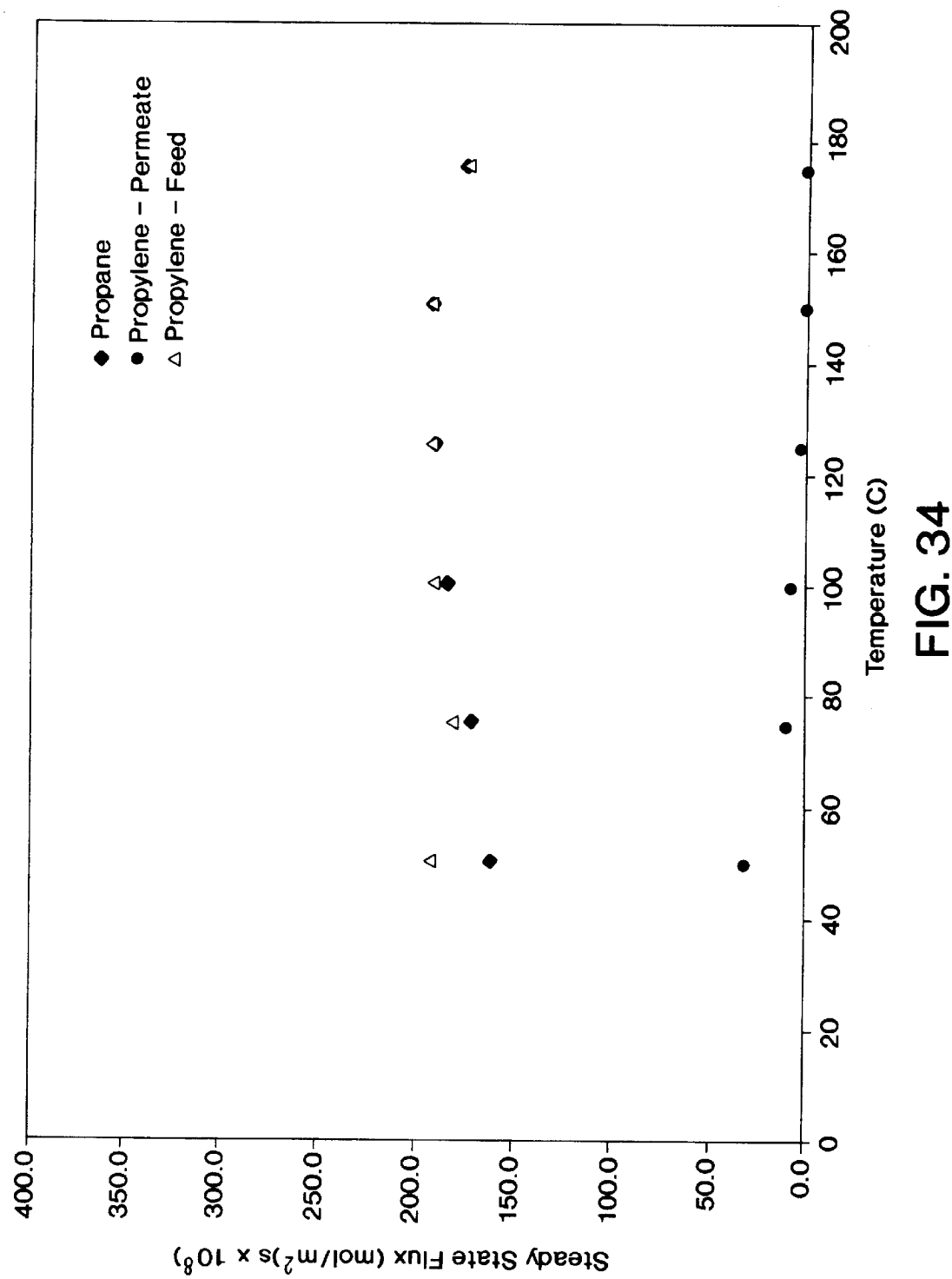
FIG. 34 is a plot of propylene hydrogenation fluxes from the permeate side of the reactor as a function of membrane temperature.
Figure 35:
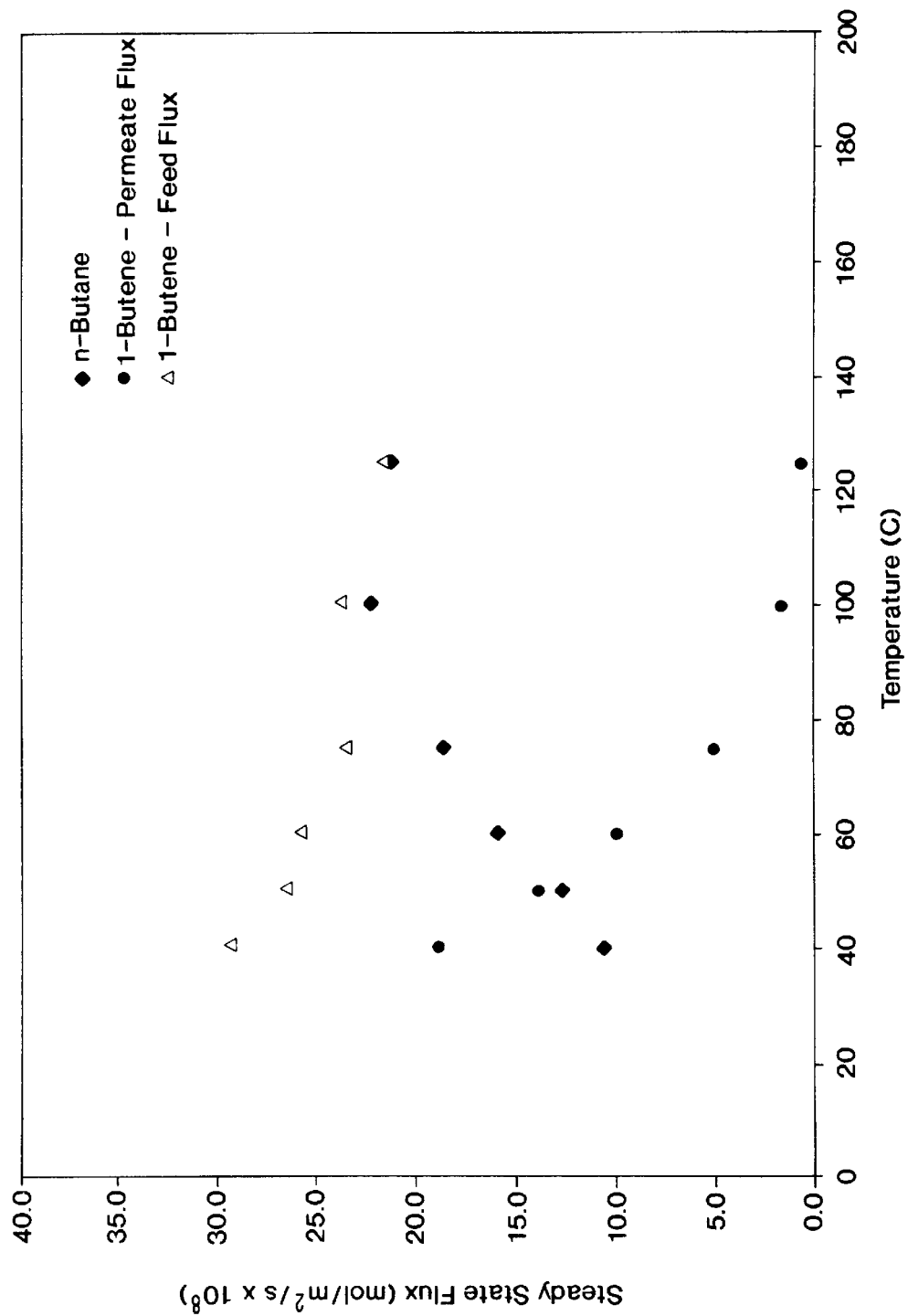
FIG. 35 is a plot of 1-butene hydrogenation fluxes from the permeate side of the reactor as a function of membrane temperature.
Figure 36:
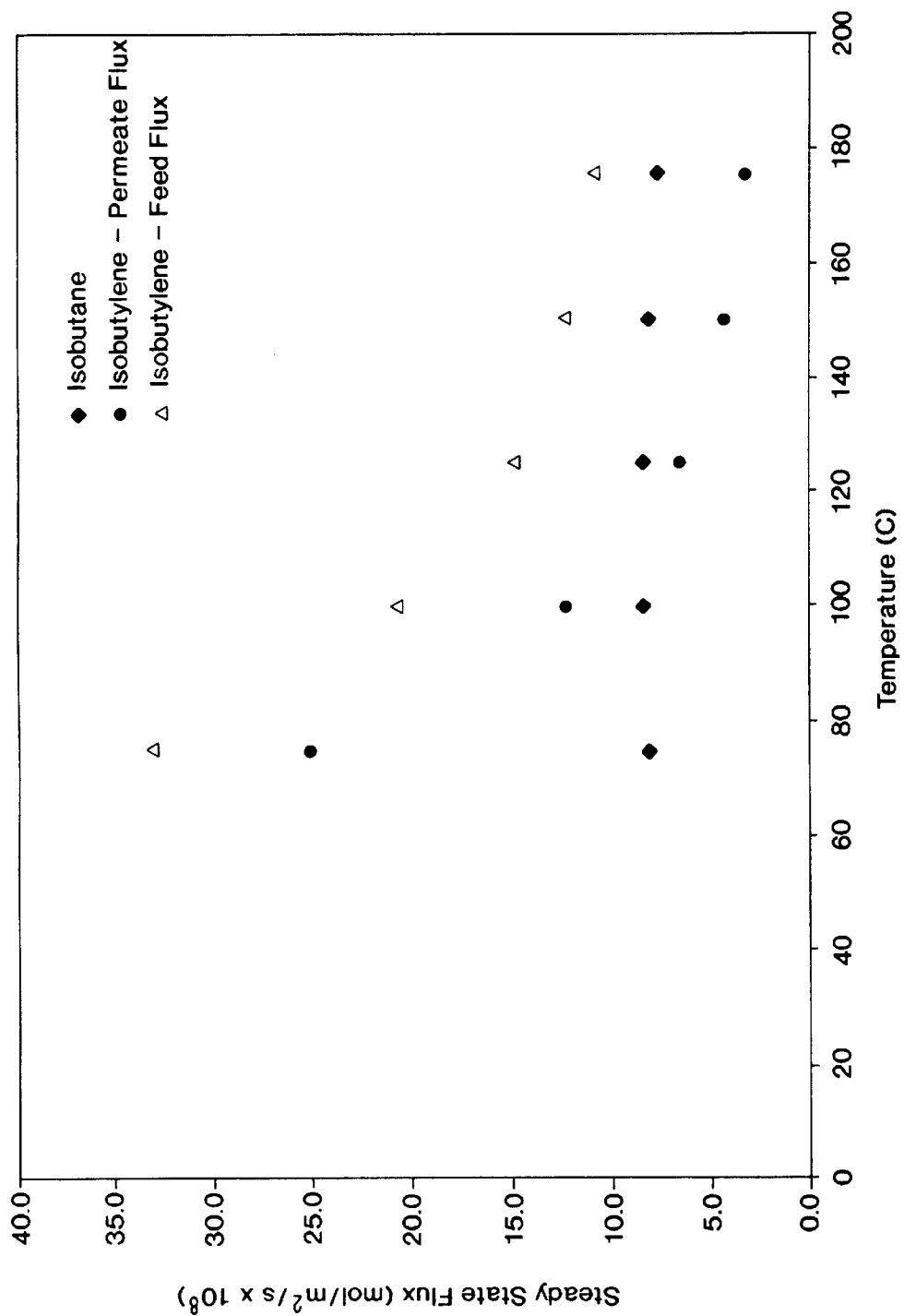
FIG. 36 is a plot of isobutylene hydrogenation fluxes from the permeate side of the reactor as a function of membrane temperature.

FIGS. 34, 35, and 36 show the resulting feed and permeate fluxes from hydrogenation over a range of temperatures from 303 to 448° K. at a partial pressure of 1.0 kPa of olefin to the feed side of the CMR. In FIG. 35, it can be seen that at temperatures above 398° K., 1-butene isomerization to cis and trans-2-butene occurs at conversions greater than 1% and for this reason, the 1-butene hydrogenation data ranges only from 303 to 398° K. The propylene and propane fluxes are generally about an order of magnitude higher than the $C_4$ components as is evident from a comparison of FIGS. 34 with 35 and 36. It is also apparent that propylene and 1-butene conversions to the product alkane are higher than that of isobutylene over the entire temperature range.

EXAMPLE 5
Disk Shaped Ruthenium Containing Catalytic Membranes
Membrane Synthesis Disk shaped, Ruthenium containing catalytic membranes were prepared using the sintered metal 316 stainless steel support obtained from Mott Metallurgical Corp. (Mott Catalog Number 11005-1.875-0.039-0.2.) as described earlier. These supports were also 1.875 in. in diameter and 0.039 in. in thickness and possessed an average pore size of about 0.2 μm. Furfuryl alcohol resin (Monomer Polymer & Dajac Laboratories Inc., Lot A-1-143), was added to an equal amount by weight of an acetone solution containing 3% Ru (III) acetylacetonate ($Ru(C_5H_7O_2)_3$) (99% purity; Strem Chemicals.) Again, the viscosity of this solution was observed to be stable at room temperature and could be stored and transported without significant cross-linking of the furfuryl alcohol resin.

The disk-shaped supports 114 were attached to a motorized shaft 110 with an adjustable clamp 112 that fixed the disk shaped support in place vertically as shown in FIG. 27. The clamp 112 did not touch the external, flat surfaces of the supports and held only the outer edges. A motor 116 rotates the assembly, with the rotational speed controlled by a rpm controller 118. The rotation speed was set to 120 rpm.

The solution consisting of furfuryl alcohol resin/acetone/Ru (III) acetylacetonate was placed in a conventional spray gun attached to an argon gas line at 60 psig. This solution was sprayed on the rotating support and then allowed to dry until most of the acetone flashed off. This coating process deposited approximately 40 mg of furfuryl alcohol resin/Ru (III) acetylacetonate solution.

The resulting coated support was subsequently pyrolyzed as described in Foley et al., U.S. patent application Ser. No. 08/671,698 (U.S. Pat. No. 5,972,079) and in Example 4. The coating and deposition process described above was repeated 3 times until a mass of 120 mg of nanoporous carbon of the desired thickness was obtained on the support ( measured as described earlier).

Physical Characterization

Transmission Electron Microscopy

Aggregate Ru on carbon samples were prepared by pyrolyzing the catalytic precursor in the absence of the stainless steel support and subsequently dividing the Ru containing nanoporous carbon catalytic material to a size where 100% of the particles pass through a 140 mesh sieve and are retained on a 230 mesh sieve. These granular samples were suspended in ethanol and deposited on TEM backings for imaging after evaporation of the solvent to more effectively determine metal size distributions.

Figure 37A:
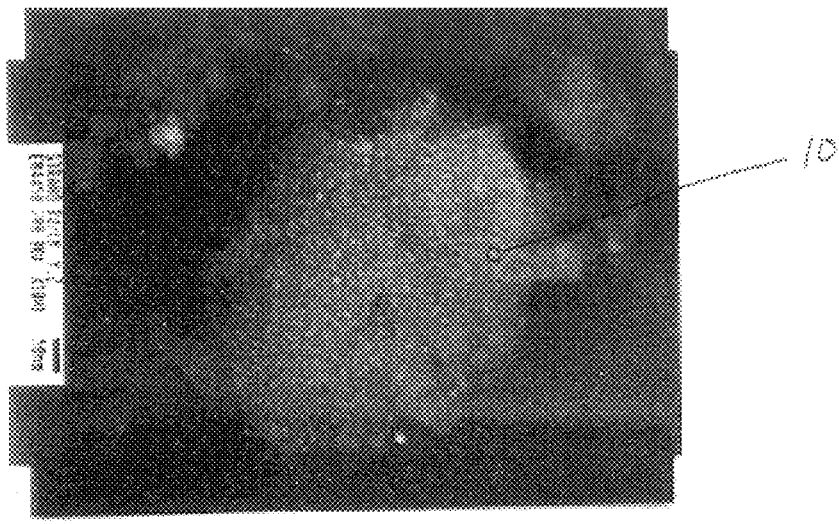
FIGS. 37A and 37B are transmission electron micrographs of the Ru/nanoporous carbon membrane material from Example 5 clearly showing the Ru metal particles within the nanoporous carbon matrix.
Figure 37B:
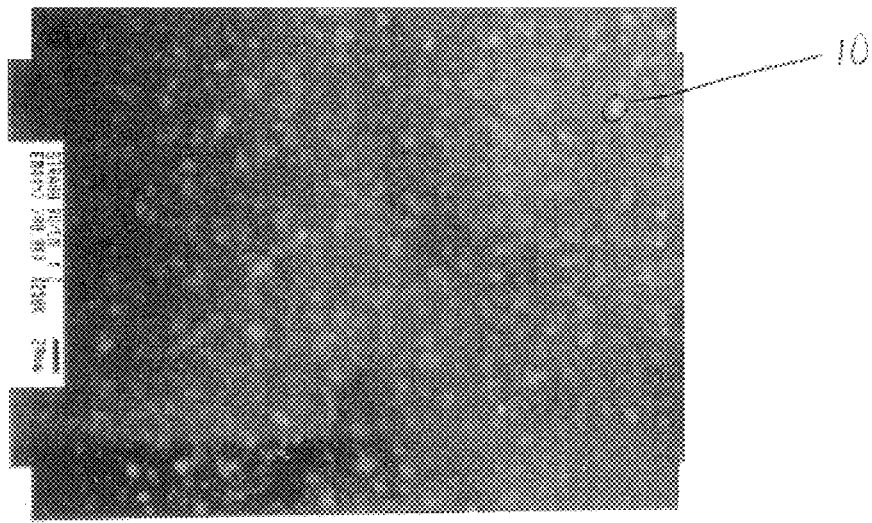
Figure 38:
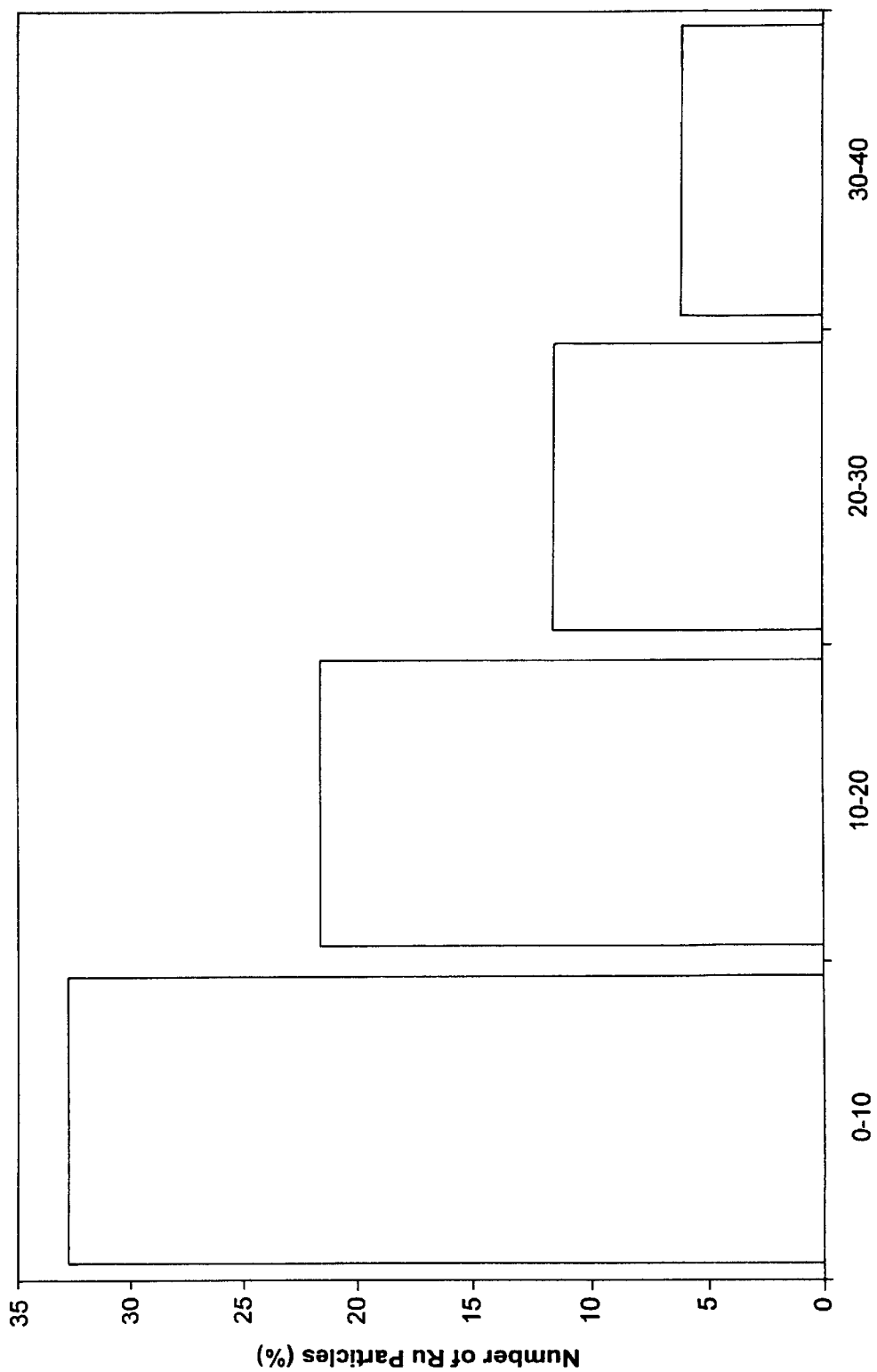
FIG. 38 is a histogram of Ru particle size distribution within the nanoporous carbon membrane from Example 5 taken from a series of TEM images.

FIGS. 37A and 37B are transmission electron micrographs of the Ru/nanoporous carbon material. The increased precursor loading (3% metal/acetone compared to 0.096% metal/acetone for the Pt case) is evident as a greater amount of metal surface area is visible by comparing FIG. 37A with FIG. 29 (the figures have similar scale). The Ru/nanoporous carbon material is also fairly well dispersed and uniform compared to the Pt/nanoporous carbon case. The Ru metal particles 410, having diameters generally less than 5 nm, are visible within the carbon support. A histogram of metal diameters was obtained from a series of such micrographs. FIG. 38 shows a histogram of metal diameters was obtained from a series of such micrographs. The results obtained with a sampling of 140 particles are displayed in FIG. 38. The vertical axis represents the percentage of the 140 particles measured that fall within the size categories indicated on the horizontal axis. From left to right, particles having a measured diameter from 0 to 10 Å are shown in the first column. The second column shows the percentage of the 140 measured particles with diameters from 10 to 20 Å. The third column shows the percentage of measured particles with diameters from 20 to 30 Å. The last column shows the percentage of the 200 measured particles with diameters from 30 to 40 Å. From FIG. 38, it can be observed that in the catalytic membranes of the present invention, the majority of catalytic metal particles dispersed within the NPC membrane have a diameter between 0 and 10 Å.

Defining a volume averaged mean diameter where $n_i$ and $d_i$ are the number and diameter of each particle in the sample set from Equation 1 above, yields a value of 2.6 nm. As the number of particles is rather low, $d_{vol}$ yields only a rough indication of the mean particle size as stated earlier. The unweighted average of the distribution was calculated as 3.4 nm. The estimated value for $d_{vol}$ is considerably less than that of the Pt case where the volume averaged diameter of 7.2 was measured.

EXAMPLE 6
Tubular Shaped Catalytic Membranes
Membrane Synthesis

Tubular catalytic membrane supports were prepared using tubular sintered metal 316 stainless steel obtained from Mott Metallurgical Corp. These tubes had an inner diameter of 0.125 in. and an outer diameter of 0.250 in. The average pore size was 0.2 μm. One inch segments were cut and welded to two 6.5 in. sections creating a 0.25 in. O.D. tube with a 1 in. porous walled center. Furfuryl alcohol resin (Monomer Polymer & Dajac Laboratories Inc., Lot A-1-1 43), was added to an equal amount by weight of an acetone solution containing 0.1% Pt (II) acetylacetonate (Pt(C5H7O2)2) (97% purity; Strem Chemicals) The properties of this solution were similar to that used for Examples 4 and 5 above.

The supports were attached to a motorized shaft with an adjustable chuck that held the tube shaped support at one end in a horizontal position. The rotation speed was 30 rpm. Masking tape was placed over the areas adjacent to the porous stainless steel to ensure that only this portion would be coated.

The solution consisting of furfuryl alcohol resin/acetone/Pt (II) acetylacetonate was placed in a syringe which was mounted on a syringe pump. This mixture was fed using the pump to an ultrasonic sprayer which passed over the rotating tube 4 times at approximately 5 seconds per pass. The tube was allowed to rotate to dry off all of the remaining acetone. This coating process deposited approximately 10 mg of the furfuryl alcohol resin/Pt (II) acetylacetonate solution.

The resulting coated tube shaped support was subsequently pyrolyzed according to the method described in Foley et al. U.S. patent application Ser. No. 08/671,698 (U.S. Pat. No. 5,972,079). Specifically, the coated support was placed in a furnace at ambient temperature, a stream of flowing He was introduced into the furnace and the temperature in the furnace was then ramped to 450° C. at a rate of 5° C./min. The temperature in the furnace was held at 450° C. for 2 hours and then the furnace was allowed to cool to room temperature. The helium gas stream was maintained in the furnace as it cooled to ambient temperature. The tube was rotated at 30 rpm in the furnace to prevent surface irregularities from forming on the surface.

This coating and deposition process described above was repeated 4 times until a mass of 30 mg of nanoporous carbon of the desired thickness was obtained on the support as measured by SEM. Table 3 summarizes the typical parameters for the support and resulting carbon membrane in this geometry.

TABLE 3

Membrane and Support Parameters

| Support | | |
|---|---|---|
| Material | 316 | Stainless Steel |
| External area | 4.13 | cm$^2$ |
| Mean pore size | 0.2 | μm |
| Thickness | 0.125 | in. |
| Porosity | 0.6 | m$^3$ void/m$^3$ support |
| Membrane | | |
| Thickness (SEM) | 1–20 | μm |
| Deposition mass | 5 | mg carbon/cm$^3$ |
| Number of coats | 3 | coats |
| Catalytic loadings | 0.15 | % Pt/C |
| Density of carbon | 1.6 | g/cm$^3$ |
| Synthesis temperature | 450 | ° C. |
| Soak time | 2 | hours |
| Heating ramp rate | 5 | ° C./min |
| He purge flow rate | 50 | sccm (standard cubic centimeters per minute) |

Physical Characterization

Molecular Probe Transport

Transport of He, $N_2$, $O_2$, Ar, $CO_2$ and $SF_6$ was used to characterize the selective porosity and integrity of the tubular carbon film. The disk shaped membranes were sealed using graphite ferrules into a stainless steel module, see FIG. 3, set up to measure the transport of a single gas through the membrane. The method of testing was similar to that described above in Example 1. In FIG. 5, the shell side of the tube was used as the permeate volume, with the membrane 13 inside the shell 15, and the test gases were fed to the tube side $T_1$. A pressure transducer was attached to $S_2$. $T_2$ and $S_1$ were sealed.

Figure 39:
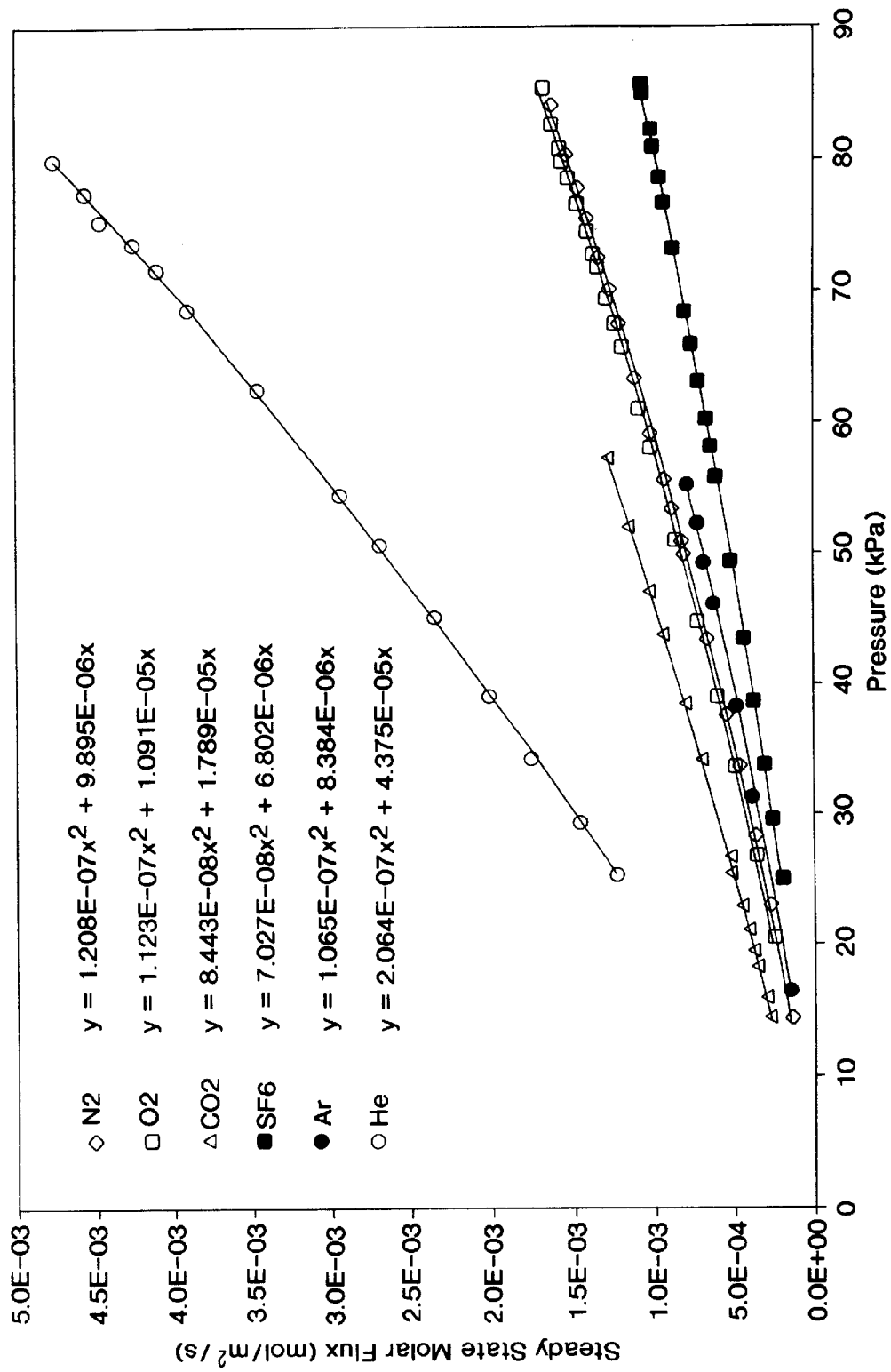
FIG. 39 is a plot of the steady state fluxes versus driving force pressure through the catalytic membrane of Example 6 for various molecular probes.

FIG. 39 presents the steady state fluxes versus driving force pressure across a catalytic membrane for He, $N_2$, $O_2$, Ar, $CO_2$ and $SF_6$. The non-linearity observed in this Figure was not expected. The separation factors are higher than Knudsen (calculated as the ratio of average slopes through these curves) and yet a quadratic dependence on pressure indicative of viscous flow is clearly demonstrated. More than likely, a new transport regime that represents the convolution of viscous and molecular sieving mechanism is being demonstrated. Defects or surface cracks that span the thickness of the active layer reduce separation factors to Knudsen or less than Knudsen selectivity. Hence, these membranes, while exhibiting an atypical flux versus pressure dependence, are defect free.

While the invention has been particularly shown and described with reference to preferred embodiments thereof, it will be understood by those skilled in the art that various changes in form and details may be made without departing from the spirit and scope of the invention as defined in the appended claims.

We claim:

1. A catalytically-active nanoporous carbon membrane which comprises:
   a. a support having at least one pore;
   b. a nanoporous carbon membrane which is attached to a surface of the support and comprises a nanoporous carbon material having pores which have a smaller diameter than the diameter of the at least one pore of the support; wherein at least one of the pores of the membrane communicates with at least one pore of the support; and
   c. a catalytic metal highly dispersed within the nanoporous carbon membrane.

2. The catalytically-active nanoporous carbon membrane of claim 1 wherein the catalytic metal is homogenously dispersed within the nanoporous carbon material.

3. The catalytically-active nanoporous carbon membrane of claim 1 wherein said support has at least two pores that have diameters that are larger than the diameter of the pores of the membrane and each of said pores of the support communicate with at least one of the pores of the membrane.

4. The catalytically-active nanoporous carbon membrane of claim 1, wherein said support is essentially metal.

5. The catalytically-active nanoporous carbon membrane of claim 1 wherein said catalytic metal is selected from the group comprising: Cadmium, Copper, Cerium, Chromium, Cobalt, Gallium, Gold, Indium, Iridium, Iron, Lanthanum, Lutetium, Magnesium, Molybdenum, Nickel, Palladium, Platinum, Potassium, Rhodium, Rubidium, Ruthenium, Scandium, Selenium, Silver, Tin, Thallium, Vanadium, Zinc, Ytterbium, and Yttrium.

6. The catalytically-active nanoporous carbon membrane of claim 5, wherein said catalytic metal has a volume-averaged mean particle size of about 0.5 to 7 nm.

7. A The catalytically-active nanoporous carbon membrane of claim 1, wherein said catalytic metal is Platinum.

8. The catalytically-active nanoporous carbon membrane of claim 1, wherein said catalytic metal is Ruthenium.

9. The catalytically-active nanoporous carbon membrane of claim 1, wherein said catalytic metal has a volume-averaged mean particle size of about 0.2 to 20 nm.

10. The catalytically-active nanoporous carbon membrane of claim 1, wherein said catalytic metal has a volume-averaged mean particle size of about 0.2 to 10 nm.

11. A method of processing hydrocarbons, wherein the method comprises the step of contacting the hydrocarbons with the catalytically active nanoporous carbon membrane of claim 1.

12. A method of selectively hydrogenating olefins, wherein the method comprises the step of contacting the olefins with the catalytically-active nanoporous carbon membrane of claim 1.

13. A method of separating hydrocarbons, wherein the method comprises the step of contacting a volume of gas containing the hydrocarbons with the catalytically-active nanoporous carbon membrane of claim 1.

14. A process for making a catalytically active nanoporous carbon membrane which comprises:
  a. coating a portion of a porous support with a homogenous solution comprising:
     (i) a nanoporous carbon polymeric precursor;
     (ii) an organometallic precursor of a catalytic metal; and
     (iii) a non-polar solvent; and
  b. pyrolyzing the coating on the support.

15. The process for making a catalytically-active nanoporous carbon membrane of claim 14 wherein, the organometallic precursor of a catalytic metal contains a catalytic metal selected from the group comprising: Cadmium, Copper, Cerium, Chromium, Cobalt, Gallium, Gold, Indium, Iridium, Iron, Lanthanum, Lutetium, Magnesium, Molybdenum, Nickel, Palladium, Platinum, Potassium, Rhodium, Rubidium, Ruthenium, Scandium, Selenium, Silver, Tin, Thallium, Vanadium, Zinc, Ytterbium, and Yttrium.

16. The process for making a catalytically-active nanoporous carbon membrane of claim 15, wherein the organometallic precursor is Pt (II) acetylacetonate ($Pt(C_5H_7O_2)_2$).

17. The process for making a catalytically-active nanoporous carbon membrane of claim 15, wherein the organometallic precursor is Ru (III) acetylacetonate ($Ru(C_5H_7O_2)_3$).

* * * * *

UNITED STATES PATENT AND TRADEMARK OFFICE
CERTIFICATE OF CORRECTION

PATENT NO. : 6,471,745 B1
DATED : October 29, 2002
INVENTOR(S) : Foley et al.

It is certified that error appears in the above-identified patent and that said Letters Patent is hereby corrected as shown below:

<u>Column 32,</u>
Line 46, delete "A".

Signed and Sealed this

Twenty-fifth Day of February, 2003

JAMES E. ROGAN
*Director of the United States Patent and Trademark Office*